(12) United States Patent
Minelly

(10) Patent No.: US 9,140,873 B2
(45) Date of Patent: Sep. 22, 2015

(54) SYSTEM AND METHOD FOR COMPENSATING FOR DISTORTIONS IN OPTICAL FIBERS

(71) Applicant: Lockheed Martin Corporation, Bethesda, MD (US)

(72) Inventor: John D. Minelly, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/307,338

(22) Filed: Jun. 17, 2014

(65) Prior Publication Data

US 2015/0043879 A1 Feb. 12, 2015

Related U.S. Application Data

(60) Division of application No. 13/013,765, filed on Jan. 25, 2011, now Pat. No. 8,755,660, which is a division
(Continued)

(51) Int. Cl.
*G02B 6/02* (2006.01)
*H01S 3/067* (2006.01)
(Continued)

(52) U.S. Cl.
CPC .......... *G02B 6/4478* (2013.01); *C03B 37/0122* (2013.01); *C03B 37/01222* (2013.01);
(Continued)

(58) Field of Classification Search
CPC ............ H01S 3/06729; H01S 3/06754; G02B 6/02009; G02B 6/02376; G02B 6/02023
See application file for complete search history.

(56) References Cited

U.S. PATENT DOCUMENTS 3,980,459 A 9/1976 Li
4,264,347 A 4/1981 Shintani et al.
(Continued)

FOREIGN PATENT DOCUMENTS

EP 0 048 855 A2 4/1982
JP 2001-033638 A 4/1982
JP 10-239551 9/1998

OTHER PUBLICATIONS

Di Teodoro, Fabio, et al., "MW peak-power, mJ pulse energy, multi-kHz repetition rate pulses", "Proc. of SPIE", 2006, pp. 61020K.1-61020K.8, vol. 6102.
(Continued)

*Primary Examiner* — Eric Bolda
(74) *Attorney, Agent, or Firm* — Charles A. Lemaire; Jonathan M. Rixen; Lemaire Patent Law Firm, P.L.L.C.

(57) ABSTRACT

An apparatus and method for compensating for mode-profile distortions caused by bending optical fibers having large mode areas. In various embodiments, the invention microstructures the index of refraction in the core and surrounding areas of the inner cladding from the inner bend radius to the outer bend radius in a manner that compensates for the index changes that are otherwise induced in the index profile by the geometry and/or stresses to the fiber caused by the bending. Some embodiments of an apparatus and method include a fiber having a plurality of substantially parallel cores, the fiber including a straight section and a curved section; guiding signal light primarily in a second core in the straight section; guiding the signal light from the second core into a first core between the straight section and the curved section; and guiding the signal light primarily in the first core in the curved section.

20 Claims, 22 Drawing Sheets

Related U.S. Application Data of application No. 12/184,243, filed on Jul. 31, 2008, now Pat. No. 7,876,495, which is a continuation-in-part of application No. 12/169,628, filed on Jul. 8, 2008, now Pat. No. 7,924,500.

(60) Provisional application No. 60/953,203, filed on Jul. 31, 2007, provisional application No. 60/951,193, filed on Jul. 21, 2007.

(51) Int. Cl.
| | |
|---|---|
| G02B 6/44 | (2006.01) |
| C03B 37/012 | (2006.01) |
| G02B 6/028 | (2006.01) |
| G02B 6/036 | (2006.01) |
| H01S 3/106 | (2006.01) |
| H01S 3/16 | (2006.01) |

(52) U.S. Cl.
CPC ............ *G02B6/028* (2013.01); *G02B 6/02042* (2013.01); *G02B 6/0283* (2013.01); *G02B 6/02295* (2013.01); *G02B 6/02333* (2013.01); *G02B 6/02371* (2013.01); *G02B 6/036* (2013.01); *G02B 6/449* (2013.01); *H01S 3/06716* (2013.01); *H01S 3/06737* (2013.01); *H01S 3/06741* (2013.01); *C03B 2201/08* (2013.01); *C03B 2201/31* (2013.01); *C03B 2201/32* (2013.01); *C03B 2201/36* (2013.01); *C03B 2203/12* (2013.01); *C03B 2203/18* (2013.01); *C03B 2203/22* (2013.01); *C03B 2203/42* (2013.01); *H01S 3/06704* (2013.01); *H01S 3/06758* (2013.01); *H01S 3/1067* (2013.01); *H01S 3/1618* (2013.01); *H01S 2301/02* (2013.01); *H01S 2301/04* (2013.01)

(56) References Cited

U.S. PATENT DOCUMENTS

| | | | |
|---|---|---|---|
| 4,668,263 A | 5/1987 | Yokota et al. | |
| 5,479,551 A | 12/1995 | DiGiovanni et al. | |
| 5,818,630 A | 10/1998 | Fermann et al. | |
| 5,949,941 A | 9/1999 | DiGiovanni | |
| 6,288,835 B1 | 9/2001 | Nilsson et al. | |
| 6,360,045 B1 * | 3/2002 | Shoval et al. | 385/123 |
| 6,389,187 B1 | 5/2002 | Greenaway et al. | |
| 6,429,963 B1 | 8/2002 | Berkey et al. | |
| 6,496,301 B1 | 12/2002 | Koplow et al. | |
| 6,539,155 B1 | 3/2003 | Broeng et al. | |
| 6,563,995 B2 | 5/2003 | Keaton et al. | |
| 6,625,363 B2 | 9/2003 | Carter et al. | |
| 6,711,918 B1 | 3/2004 | Kliner et al. | |
| 6,826,343 B2 | 11/2004 | Davis et al. | |
| 6,831,934 B2 | 12/2004 | Wang et al. | |
| 6,845,204 B1 | 1/2005 | Broeng et al. | |
| 6,856,742 B2 | 2/2005 | Broeng et al. | |
| 6,954,575 B2 | 10/2005 | Fermann et al. | |
| 6,996,316 B2 | 2/2006 | Bailey et al. | |
| 7,138,621 B2 | 11/2006 | Wang | |
| 7,167,621 B2 | 1/2007 | Manyam et al. | |
| 7,199,924 B1 | 4/2007 | Brown et al. | |
| 7,209,619 B2 | 4/2007 | Dong et al. | |
| 7,233,721 B2 * | 6/2007 | Gaeta et al. | 385/28 |
| 7,272,287 B2 * | 9/2007 | Bise et al. | 385/123 |
| 7,391,561 B2 | 6/2008 | Di Teodoro et al. | |
| 7,400,807 B2 | 7/2008 | Minelly et al. | |
| 7,457,498 B2 | 11/2008 | Miyadera et al. | |
| 7,526,167 B1 * | 4/2009 | Minelly | 385/126 |
| 7,531,803 B2 | 5/2009 | Mittleman et al. | |
| 7,570,856 B1 | 8/2009 | Minelly et al. | |
| 7,760,771 B2 * | 7/2010 | Salokatve et al. | 372/6 |
| 7,764,854 B2 | 7/2010 | Fini | |
| 8,280,212 B2 | 10/2012 | Goell et al. | |
| 2003/0059195 A1 | 3/2003 | Brennan, III et al. | |

OTHER PUBLICATIONS

Di Teodoro, Fabio, et al., "Very large-core, single-mode Yb-doped photonic-crystal rod for multi-", "Proc. of SPIE", 2006, pp. 61020D.1-61020D.5, vol. 6102.

Dong, Liang, et al., "Bend-resistant fundamental mode operation in ytterbium-doped leakage channel fibers with effective areas up to 3160um2", "Optics Express", Nov. 27, 2006, pp. 11512-11519, vol. 14, No. 24.

Farrow, Roger L., et al., "Design of refractive-index and rare-earth-dopant distributions for large-mode-area fibers used in coiled high-power ampl", "Proc. of SPIE", 2007, pp. 64531C.1-64531C.11, vol. 6453.

Fini, John M., "Bend-resistant design of conventional and microstructure fibers with very large mode area", "Optics Express", Jan. 9, 2006, pp. 69-81, vol. 14, No. 1.

Fini, John M., "Design of Large-Mode-Area Amplifier Fibers Resistant to Bend-Induced Distortion", "Optical Society of America", Aug. 2007, pp. 1669-1676, vol. 24, No. 8.

Liu, Anping, "Suppressing stimulated Brillouin scattering in fiber amplifiers using nonuniform fiber and temperature gradient", "Optics Express", Feb. 5, 2007, pp. 977-984, vol. 15, No. 3.

Lu, Yi Bin, et al., "Gain Flattening by Using Dual-Core Fiber in Erbium-Doped Fiber Amplifier", "IEEE Photonics Technology Letters", Dec. 2000, pp. 1616-1617, vol. 12, No. 12.

Malomed, Boris A., et al., "Nonlinear-optical amplifier based on a dual-core fiber", "Optics Letters", Mar. 1, 1996, pp. 330-332, vol. 21, No. 5.

Mortensen, et al., "Low-loss criterion and effective area considerations for photonic crystal fibres", "J. Opt. A: Pure Appl. Opt.", 2003, pp. 163-167, vol. 5.

Nielsen, et al., "Low-loss photonic crystal fibers for transmission systems and their dispersion properties", "Optics Express", 2004, pp. 1372-1376, vol. 12, No. 7.

Poulin, Anne C., et al., "Optical bandpass filter from a curved segment of a detuned two-core fiber", "Applied Optics", Jul. 20, 1997, pp. 5064-5071, vol. 36, No. 21.

* cited by examiner

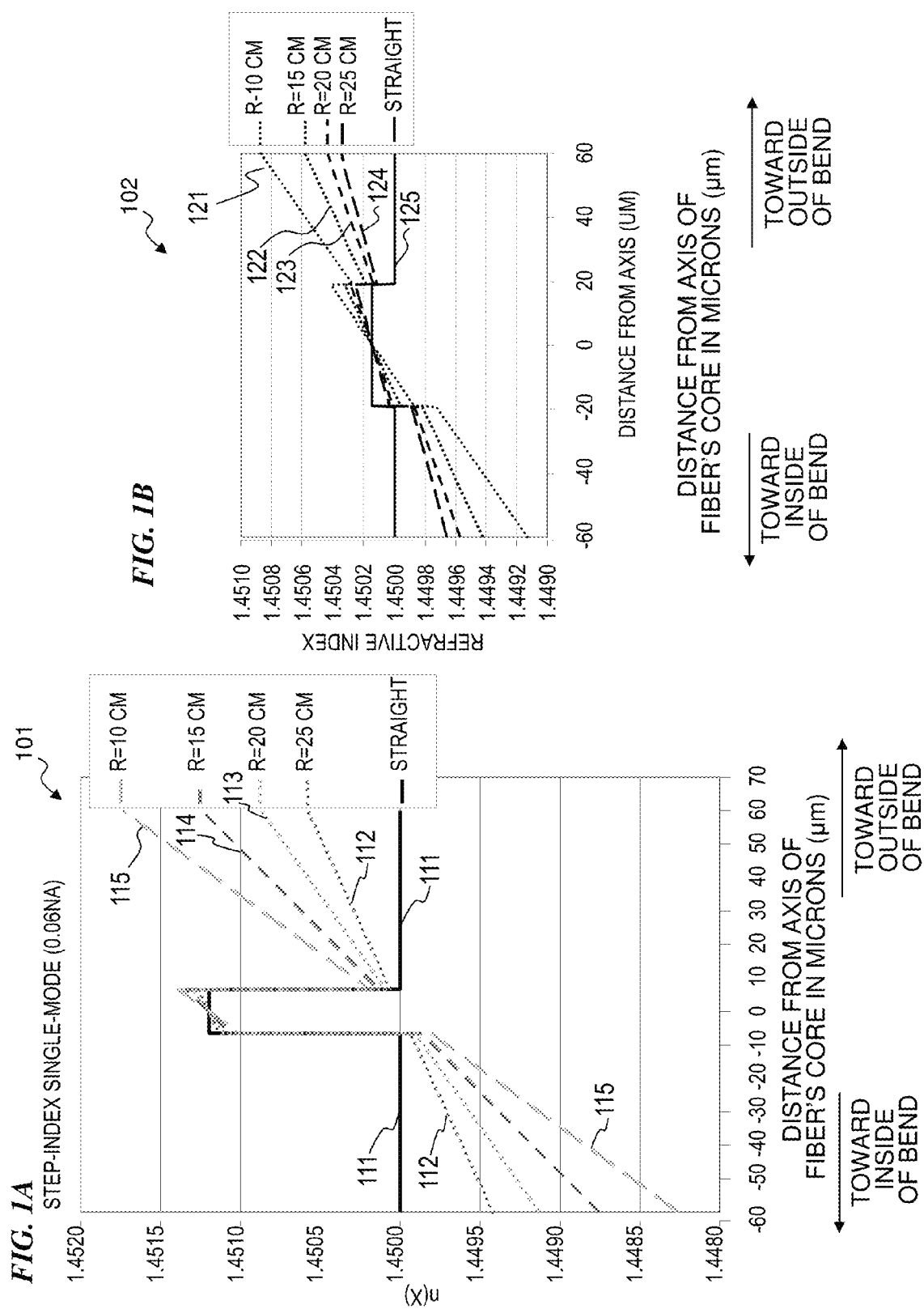

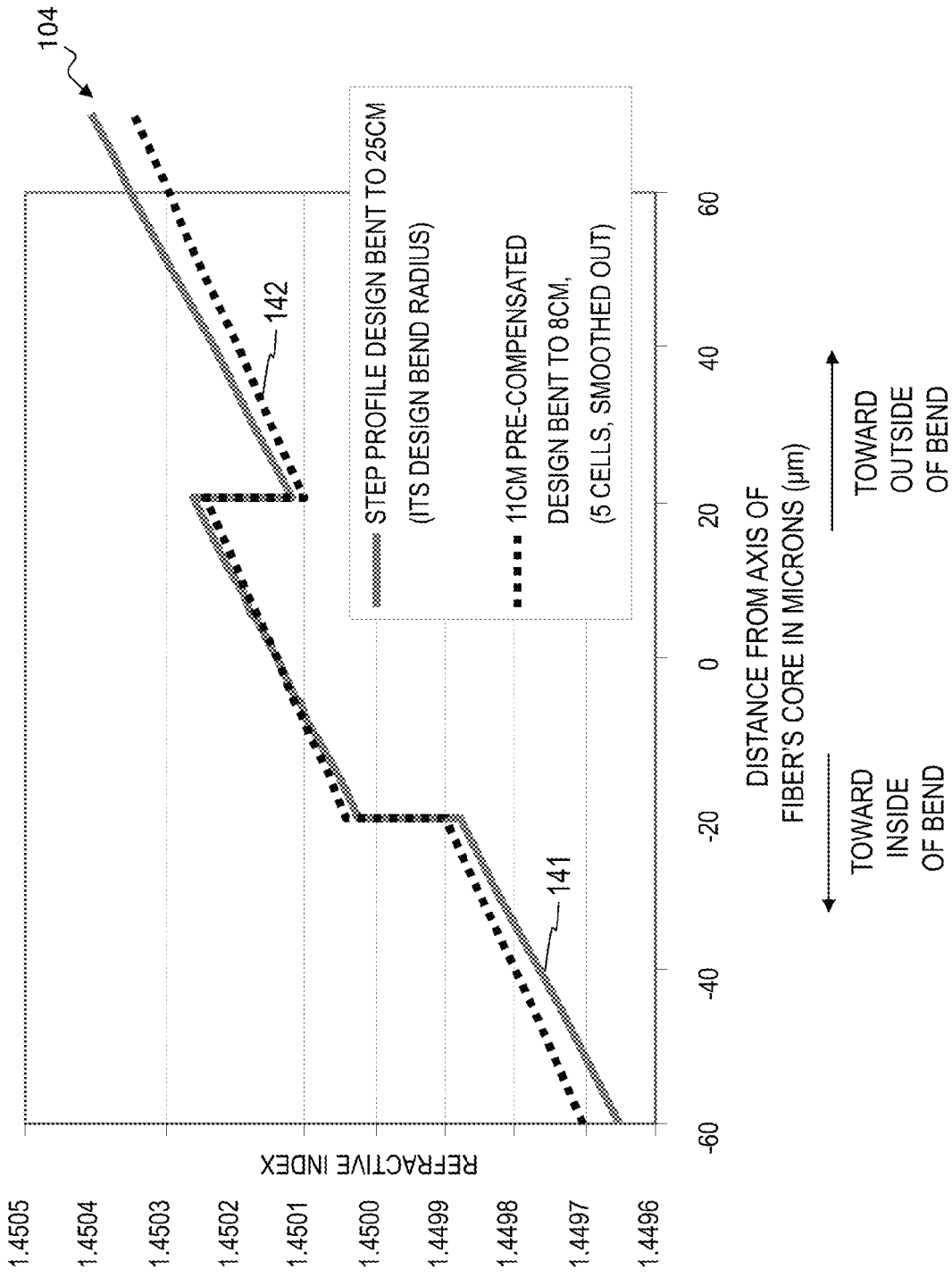

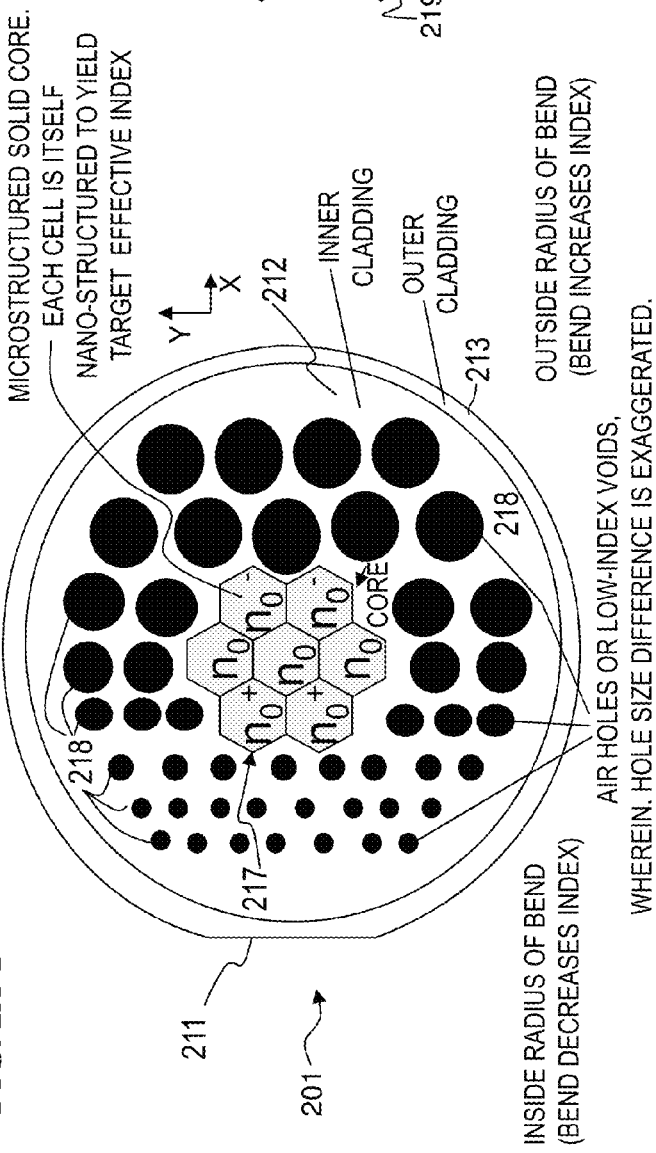
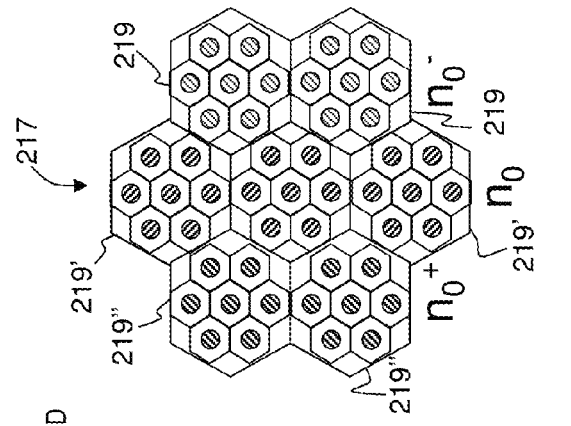
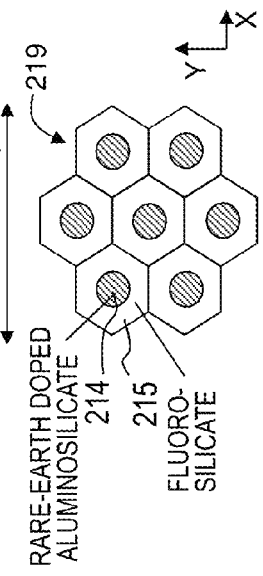
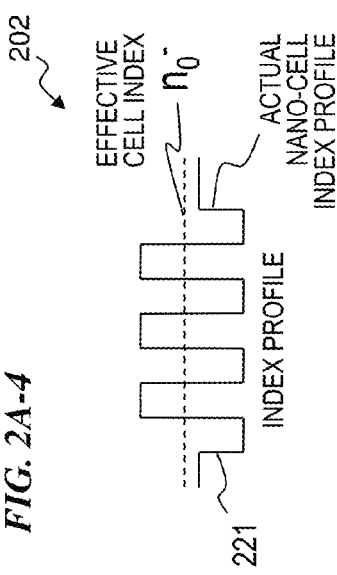

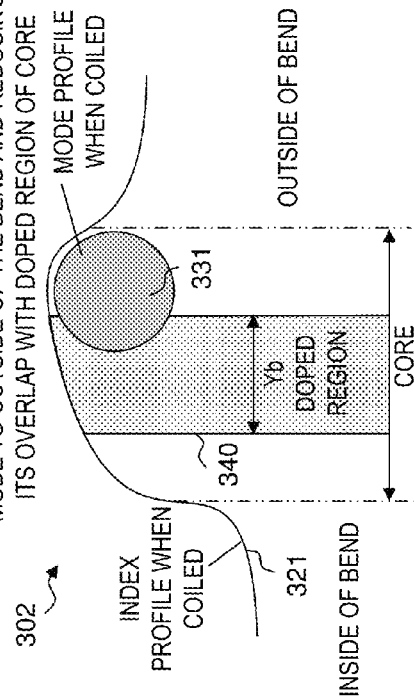

FIG. 3A  
PRIOR ART  CONVENTIONAL FIBER STARTS WITH CORE INDEX AND DOPED REGION CENTERED TO ONE ANOTHER

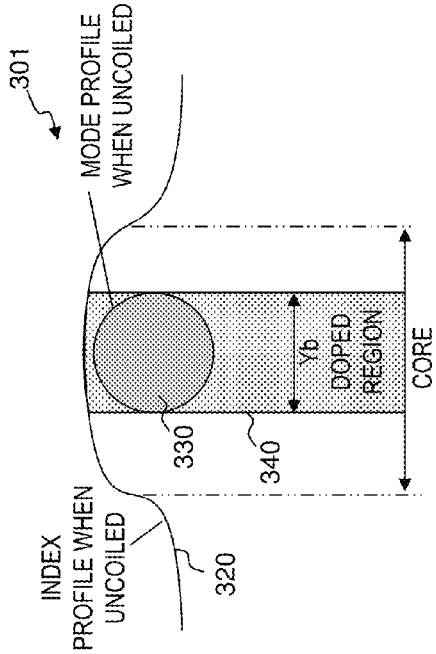

FIG. 3B  
PRIOR ART  COILING DISPLACES MODE OF CONVENTIONAL FIBER DUE TO GEOMETRY OF FIBER, INCREASING INDEX ON OUTER DIAMETER OF BEND, SHIFTING MODE TO OUTSIDE OF THE BEND AND REDUCING ITS OVERLAP WITH DOPED REGION OF CORE

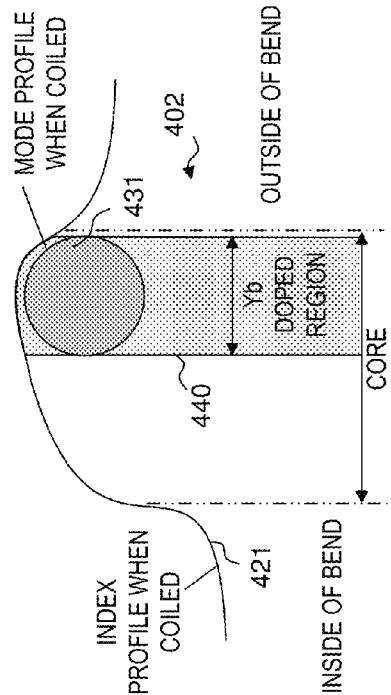

FIG. 4A  ALTERNATIVE EMBODIMENT OF PRESENT INVENTION WITH A GRADED PROFILE AND RARE-EARTH DOPING OFFSET RELATIVE TO CENTER OF UN-BENT FIBER'S CORE GRADED INDEX PROFILE

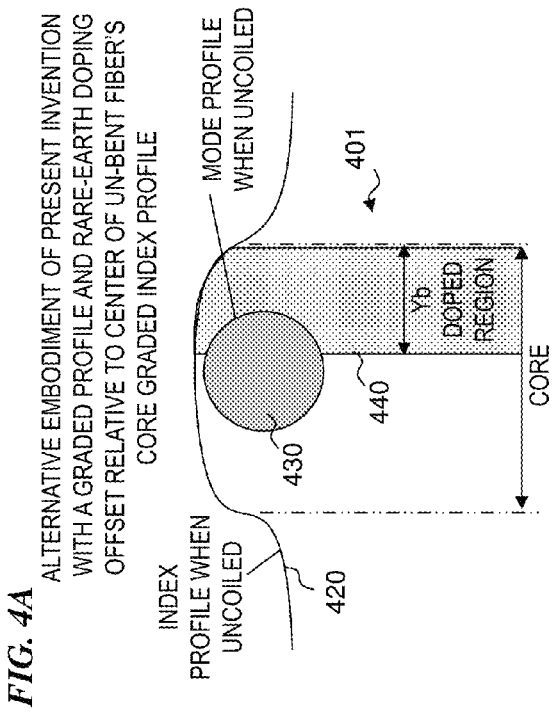

FIG. 4B  COILING OF FIBER OF PRESENT INVENTION AT ITS DESIGN RADIUS MOVES MODE TO Yb-DOPED REGION OF CORE

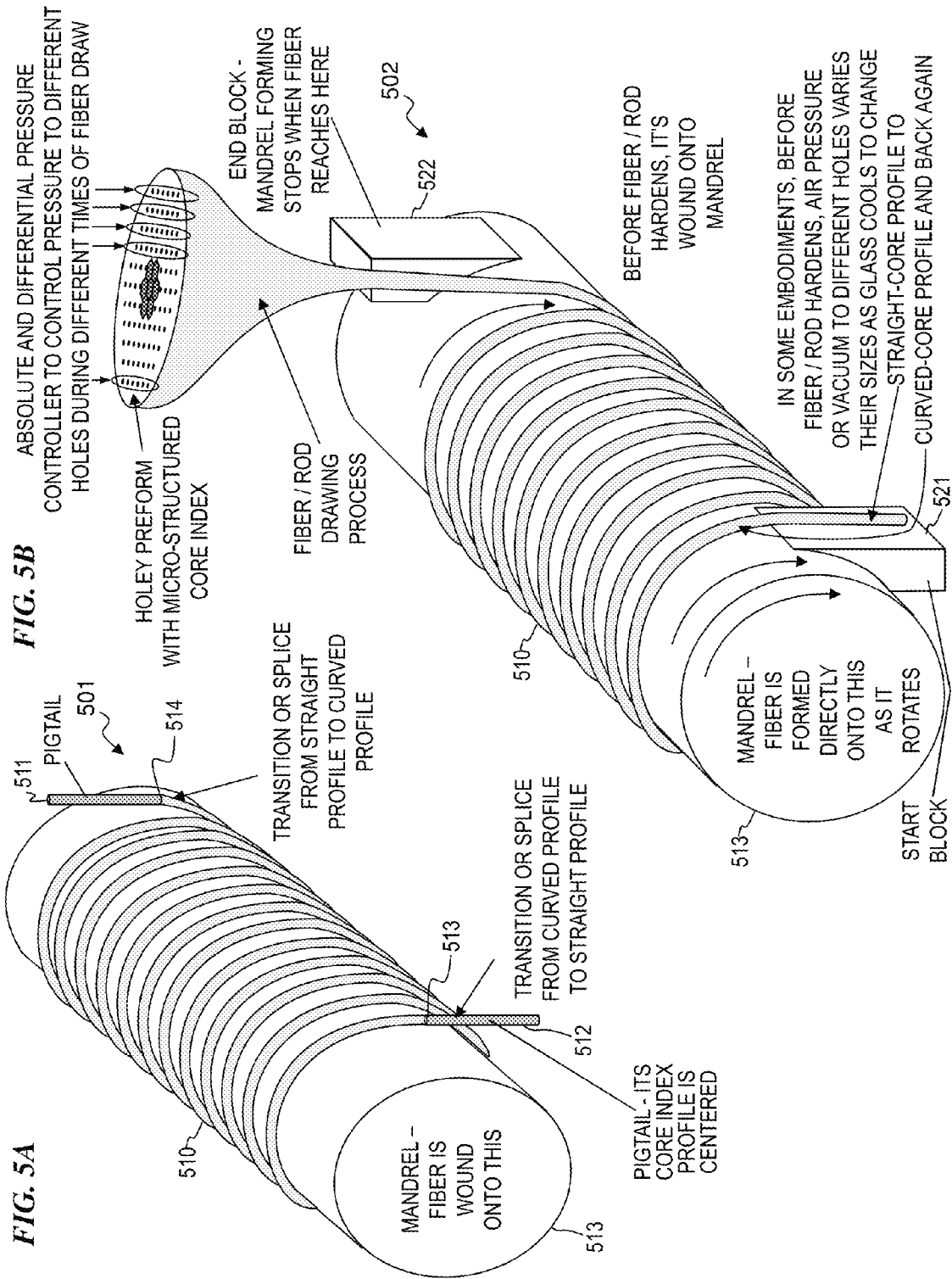

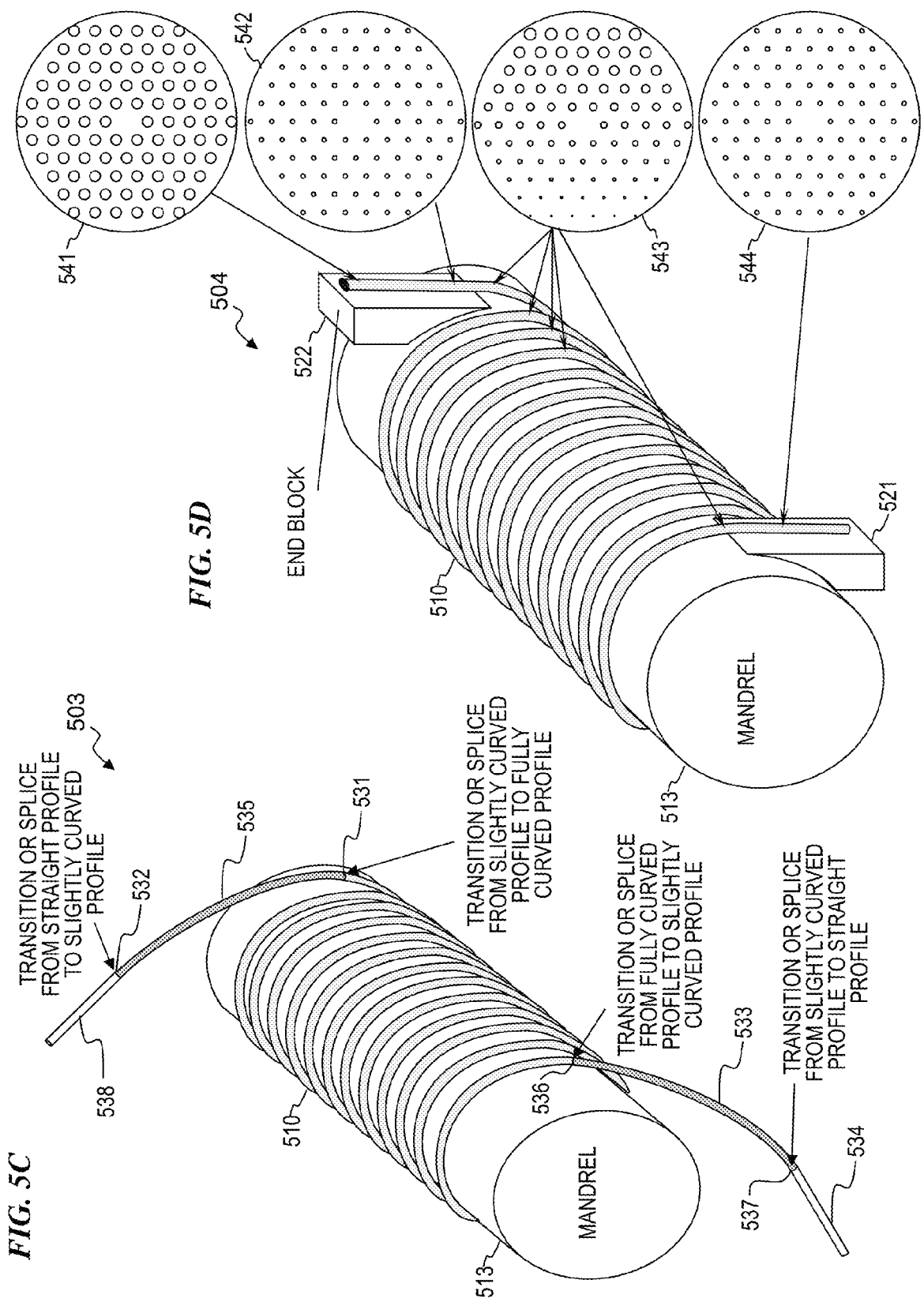

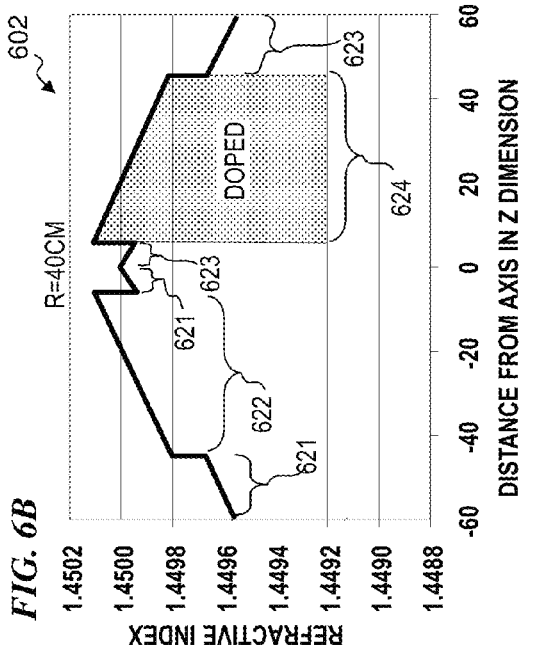
FIG. 6B
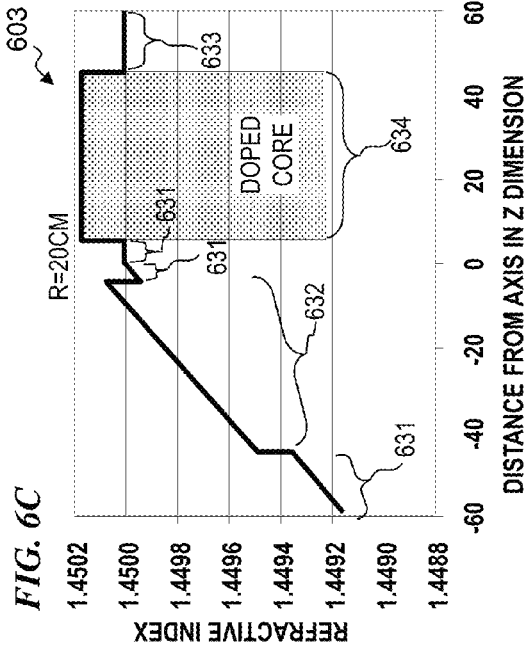
FIG. 6C
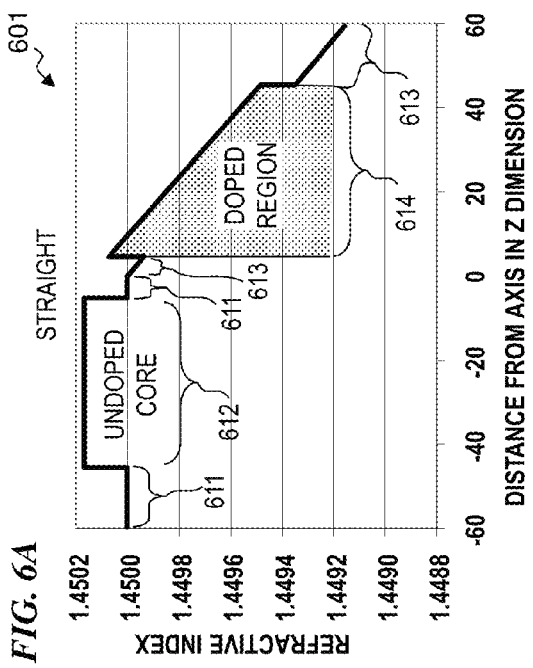
FIG. 6A
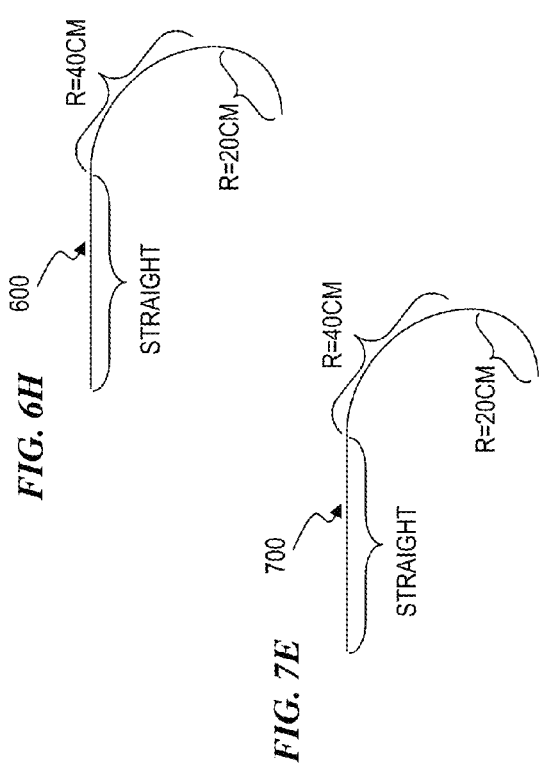
FIG. 6H
FIG. 7E

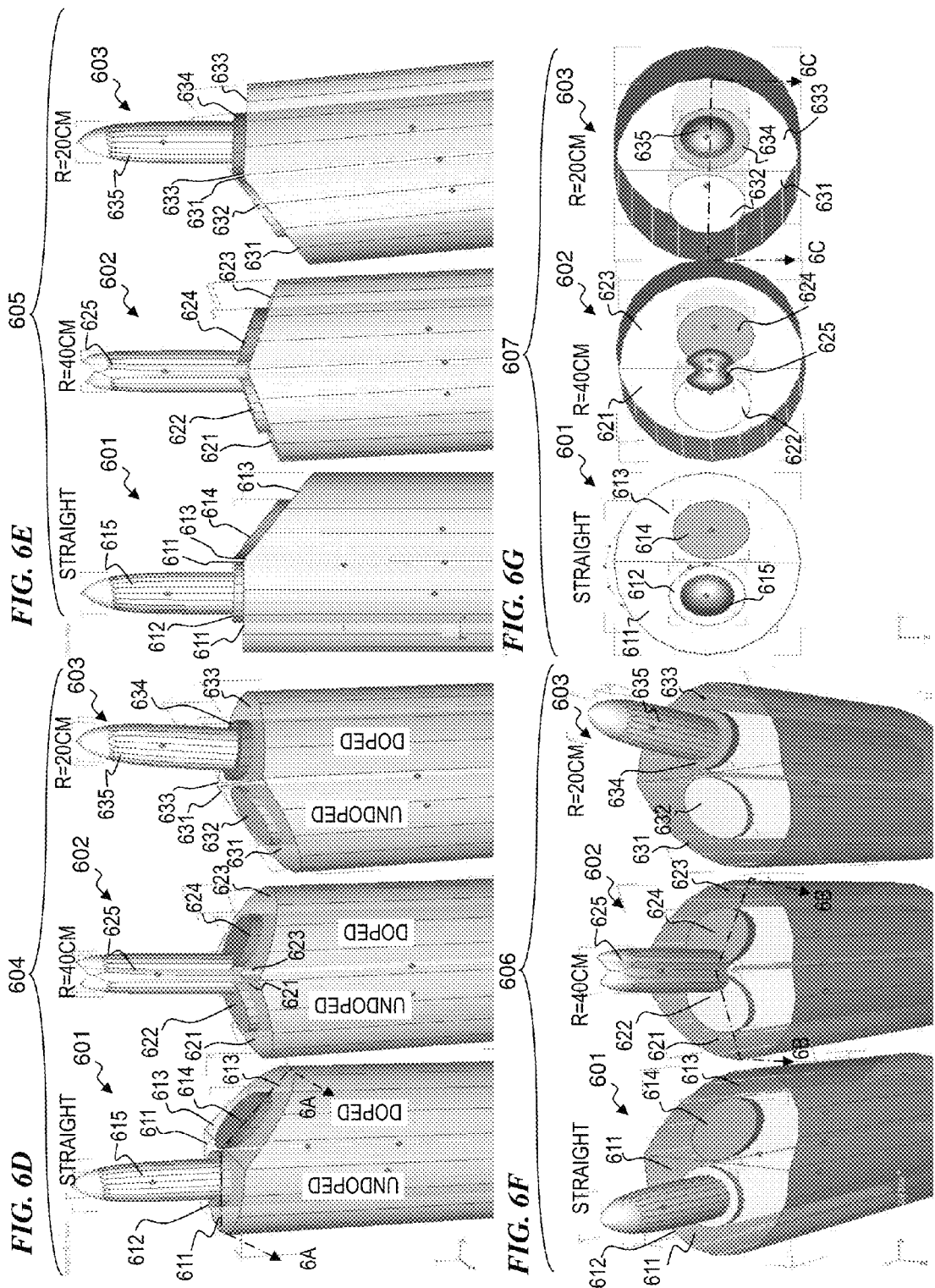

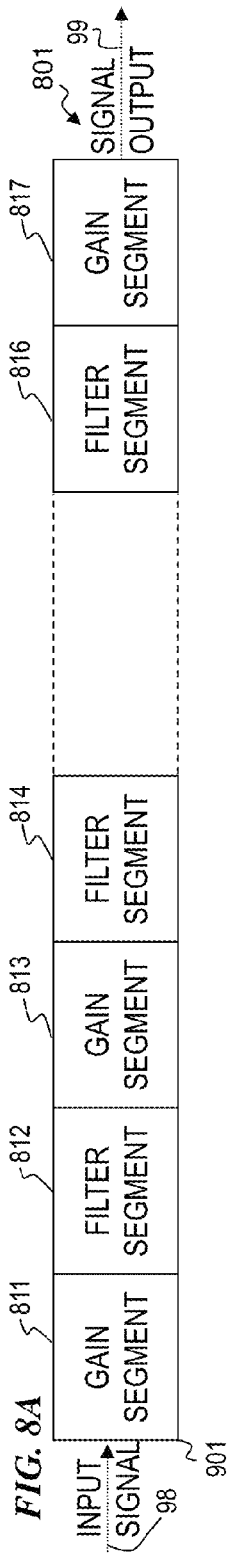
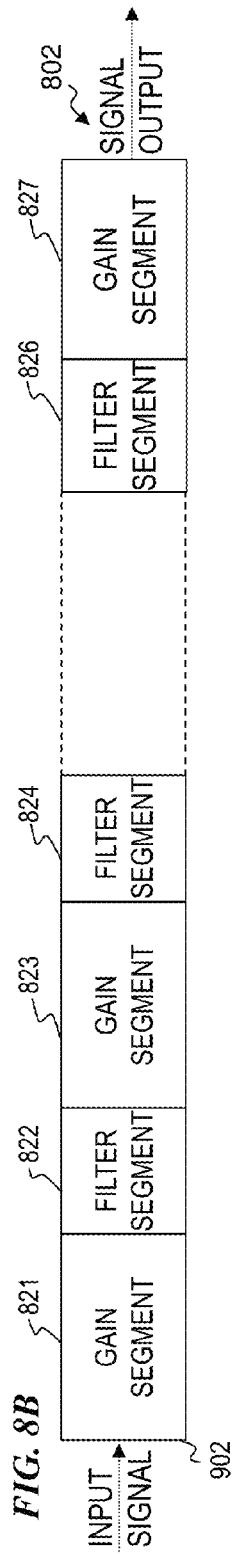
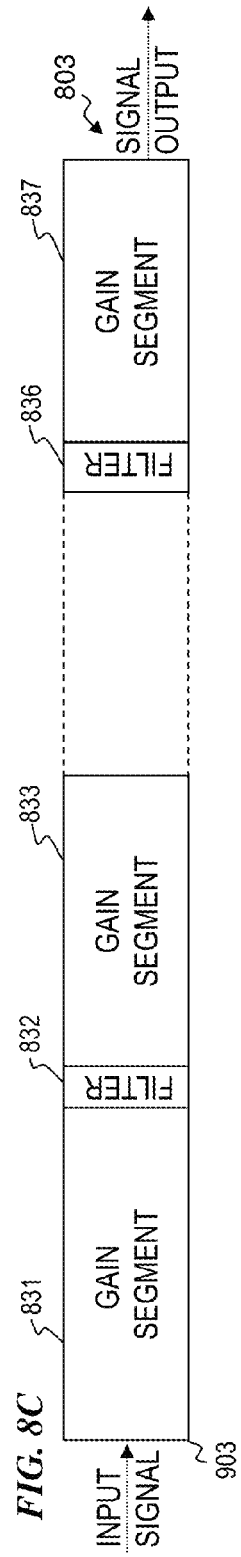
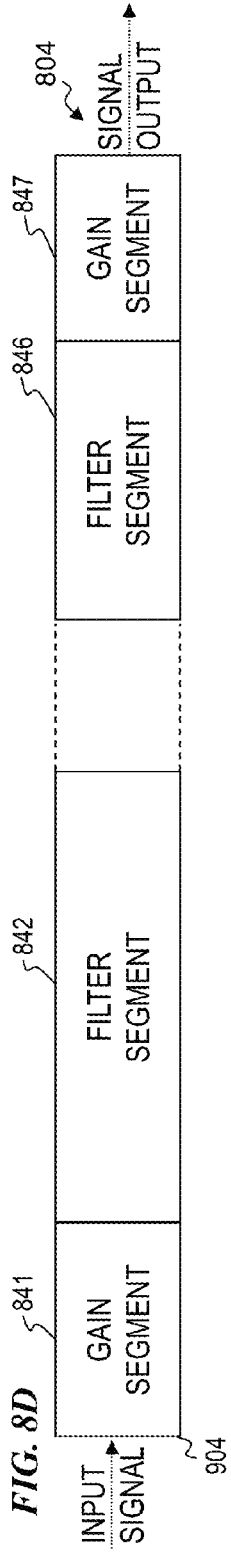

SYSTEM AND METHOD FOR COMPENSATING FOR DISTORTIONS IN OPTICAL FIBERS

CROSS-REFERENCE TO RELATED APPLICATIONS

This is a divisional of and claims benefit of U.S. patent application Ser. No. 13/013,765 filed Jan. 25, 2011, titled "METHOD AND APPARATUS FOR COMPENSATING FOR AND USING MODE-PROFILE DISTORTIONS CAUSED BY BENDING OPTICAL FIBERS" (which issued as U.S. Pat. No. 8,755,660 on Jun. 17, 2014), which is a divisional of U.S. patent application Ser. No. 12/184,243 filed Jul. 31, 2008, titled "APPARATUS AND METHOD FOR COMPENSATING FOR AND USING MODE-PROFILE DISTORTIONS CAUSED BY BENDING OPTICAL FIBERS" (which issued as U.S. Pat. No. 7,876,495 on Jan. 25, 2011), which claims priority to U.S. Provisional Patent Application No. 60/953,203 filed on Jul. 31, 2007, titled "MICRO-STRUCTURED FIBER PROFILES FOR MITIGATION OF BEND-LOSS AND/OR MODE DISTORTION IN LMA FIBER AMPLIFIERS, INCLUDING DUAL CORE EMBODIMENTS," and which is a continuation in part of U.S. patent application Ser. No. 12/169,628 filed on Jul. 8, 2008, titled "MICRO-STRUCTURED FIBER PROFILES FOR MITIGATION OF BEND-LOSS AND/OR MODE DISTORTION IN LMA FIBER AMPLIFIERS INCLUDING DUAL-CORE EMBODIMENTS" (which issued as U.S. Pat. No. 7,924,500 on Apr. 12, 2011), which claims priority both to U.S. Provisional Patent Application No. 60/953,203 filed on Jul. 31, 2007, titled "MICRO-STRUCTURED FIBER PROFILES FOR MITIGATION OF BEND-LOSS AND/OR MODE DISTORTION IN LMA FIBER AMPLIFIERS, INCLUDING DUAL CORE EMBODIMENTS," and to U.S. Provisional Patent Application No. 60/951,193 filed on Jul. 21, 2007, titled "MICRO-STRUCTURED FIBER PROFILES FOR MITIGATION OF BEND-LOSS AND/OR MODE DISTORTION IN LMA FIBER AMPLIFIERS," each of which is incorporated herein by reference in its entirety.

This invention is related to U.S. Pat. No. 7,400,807 that issued on Jul. 15, 2008 to John Minelly (the inventor of the present application) et al., which is incorporated herein by reference in its entirety.

FIELD OF THE INVENTION

The invention relates generally to optical-fiber amplifiers and more particularly to devices and methods of operation and apparatus and methods to make and use large-mode-area (LMA) fiber amplifiers and devices using LMA fiber amplifiers that are coiled but include a fiber structure that mitigates bend-loss and/or mode distortion in the core.

BACKGROUND OF THE INVENTION

There is a need for improved high-power pulse generation for a number of applications, including LIDAR (light detection and ranging) and in particular LADAR (laser detection and ranging) for detecting objects (particularly flying objects) at great distances, as well as for medical treatments and materials processing. There is also a need for high average power continuous-wave (CW) sources capable of narrow-line operation for applications such as directed energy.

Optical amplifying fibers can have very high gain. When pumping such fibers to very high powers, the high power per area in the core causes substantial non-linear effects such as stimulated Brillouin scattering (SBS) and four-wave mixing.

In recent years, fiber lasers have deployed in applications requiring increasing average power, peak power and pulse energy, often while also requiring near-diffraction-limited beam quality. Large-mode-area fibers (LMA) have been the key enabling technology. These fibers are usually intrinsically multimode but operate on the lowest-order mode based on a combination of fundamental-mode excitation (as described in U.S. Pat. No. 5,818,630 titled "Single-mode amplifiers and compressors based on multi-mode fibers" to Fermann et al., which is incorporated herein by reference) and preferential bend-loss for higher-order modes (HOMs) (as described in U.S. Pat. No. 6,496,301 titled "Helical fiber amplifier" to Koplow et al., which is incorporated herein by reference). Alternatively, photonic crystal fibers or otherwise micro-structured fibers enable genuine single-mode operation of LMA designs (Mortensen et al, "Low-loss criterion and effective area considerations for photonic crystal fibres," J. Opt. A: Pure Appl. Opt. Vol. 5 163-167 (2003); Nielsen et al., "Low-loss photonic crystal fibers for transmission systems and their dispersion properties," OPTICS EXPRESS Vol. 12, No. 7 pp. 1372-1376 (2004); DiTeodoro et al., "MW peak-power, mJ pulse energy, multi-kHz repetition rate pulses from Yb-doped fiber amplifiers," Proceedings of SPIE—Vol. 6102, *Fiber Lasers III: Technology, Systems, and Applications*, Andrew J. W. Brown, Johan Nilsson, Donald J. Harter, Andreas Tünnermann, Editors, 61020K (published online Feb. 23, 2006) (Photonics West 2006)). The price of this single-mode operation is fundamental mode bend-loss, so conventional extreme micro-structured designs have evolved into rods (Di Teodoro et al., "Very large-core, single-mode Yb-doped photonic crystal rod for multi-MW peak power generation," Proceedings of SPIE—Vol. 6102, *Fiber Lasers III: Technology, Systems, and Applications*, Andrew J. W. Brown, Johan Nilsson, Donald J. Harter, Andreas Tünnermann, Editors, 61020D (published online Feb. 23, 2006)).

An optical glass "preform" is the source material from which an optical fiber is drawn, typically by heating the preform and pulling glass from the bottom to form the optical fiber. One method of preform fabrication is the "rod-in-tube" method such as is described in U.S. Pat. Nos. 4,668,263 and 4,264,347, which are incorporated herein by reference. A rod of glass that will form the core of the fiber is inserted into a thick-walled tube (or a plurality of concentric tubes) that will become the cladding(s), and these are fused together at high temperature to form the preform. When the fiber is drawn from the heated preform, the relative dimensions of the core and cladding in the drawn fiber are identical to those of the original preform, which takes its shape from those of the rod and tube(s). Such methods do not allow one side of the cladding to have a different index than another side of the cladding, nor do they allow one side of the core to have a different refractive index or active-species doping than another side of the core.

U.S. Pat. No. 6,711,918 titled "Method of bundling rods so as to form an optical fiber preform" issued to Kliner and Koplow on Mar. 30, 2004, and is incorporated herein by reference. This patent describes one way for fabricating fiber-optic glass preforms having complex refractive-index configurations and/or dopant distributions in a radial direction with a high degree of accuracy and precision. Their method teaches bundling together a plurality of glass rods of specific physical, chemical, or optical properties and wherein the rod bundle is fused in a manner that maintains the cross-sectional composition and refractive-index profiles established by the positions of the rods. This patent does not describe sloping the refractive index from one side of the cladding to another side of the cladding, nor having a different refractive index or active-species doping profiles on one side of the core than another side of the core.

U.S. Pat. No. 7,209,619 titled "Photonic bandgap fibers" to Dong et al., U.S. Pat. No. 5,818,630 titled "Single-mode amplifiers and compressors based on multi-mode fibers" to Fermann et al., and U.S. Pat. No. 6,496,301 titled "Helical fiber amplifier" to Koplow et al., are each incorporated herein by reference. These describe apparatus and methods that may be combined and/or modified using the teachings of the present invention.

U.S. patent application Ser. No. 11/426,302 (now U.S. Pat. No. 7,526,167) titled "APPARATUS AND METHOD FOR A HIGH-GAIN DOUBLE-CLAD AMPLIFIER" was filed Jun. 23, 2006 by John D. Minelly, and is incorporated herein by reference. U.S. patent application Ser. No. 11/567,740 (now U.S. Pat. No. 7,570,856) titled "APPARATUS AND METHOD FOR AN ERBIUM-DOPED FIBER FOR HIGH PEAK-POWER APPLICATIONS" was filed Dec. 7, 2006 by John D. Minelly et al., and is incorporated herein by reference. U.S. patent application Ser. No. 11/556,658 (now U.S. Pat. No. 7,400,807) titled "APPARATUS AND METHOD FOR A WAVEGUIDE WITH AN INDEX PROFILE MANIFESTING A CENTRAL DIP FOR BETTER ENERGY EXTRACTION" was filed Nov. 3, 2006 by John D. Minelly et al., and is incorporated herein by reference. U.S. patent application Ser. No. 11/420,729, now—U.S. Pat. No. 7,391,561 titled "Fiber- or rod-based optical source featuring a large-core, rare-earth-doped photonic-crystal device for generation of high-power pulsed radiation and method" issued to Fabio Di Teodoro et al. Jun. 24, 2008, and is incorporated herein by reference. U.S. Pat. No. 7,199,924 titled "Apparatus and method for spectral-beam combining of high-power fiber lasers" issued to Andrew Brown et al. Apr. 3, 2007, and is incorporated herein by reference. Each of these patents and applications are assigned to the assignee of the present invention. Each describes various features of high-power optical-fiber amplifiers that, in some embodiments, are combined with some embodiments of the present invention. Some of the various embodiments of the above-described inventions describe large-mode-area (LMA) cores in optical fibers or rods that support single-mode signals, but wherein the fibers or rods must be kept very straight to avoid bend losses.

Improved apparatus and methods are needed to generate high-power optical pulses from curved, coiled, and/or bent waveguides, such as optical fibers.

SUMMARY OF THE INVENTION

This invention provides improved amplification characteristics in an optical-fiber amplifier having a large mode area (LMA) (e.g., a large core that supports a single-mode signal), but where the fiber is bent or curved (e.g., around a mandrel that can be used as a cooling heat sink for the amplifier). Conventional single-mode fibers having LMA cores have been built to have very low numerical apertures (which can be obtained by having a very small index-of-refraction increment for the core relative to the inner cladding) in order that only the single primary mode stays within the core and that larger-order modes exit the core and are not amplified, and such fibers have to be kept very straight. In contrast, waveguides of the present invention have an asymmetry imposed on the index of refraction (herein also referred to as the index), the active-species doping profile (e.g., of one or more rare-earth metals), or both index profile and doping profile. This asymmetry compensates for the index-of-refraction changes that are introduced by bending or coiling the waveguide, which for an initially symmetric index profile, will increase the index toward the outside of the bend, and the signal mode will move to the higher index. In other words, for a transverse cross-section through the fiber that is bent (around a radius) or coiled, the effective index of refraction from inside of the curve side of the fiber cross-section toward the outside of the curve is decreased along a slant or gradient that slopes down (decreased index) toward the outside-of-curve side of the fiber cross section, relative to the index of refraction of the same cross section when the fiber is straight. This sloped-index effect is particularly noticeable when the core of a fiber is a large-mode area core formed having a small incremental index delta relative to the innermost cladding surrounding the core, and thus the fiber has a small numerical aperture. In some such embodiments, the core is defined by a photonic-crystal structure in the fiber (e.g., by a pattern to longitudinal holes surrounding the core, and thus very slightly lowering the index of the material surrounding the core (the core in such a fiber can be made to have a relatively large diameter (e.g., more than 40 microns, more than 50 microns, more than 75 microns, more than 100 microns, more than 150 microns, more than 200 microns, more than 250 microns, or, in some embodiments, even larger diameters) while supporting only the lowest-order mode of the signal wavelength (e.g., a single-mode fiber with a large-mode area core). Such a core can be undoped and merely guide the signal mode, or can be doped in order to amplify the signal.

In some embodiments, the desired path for the signal mode is down the center of the core (or one of the cores if more than one core is provided), so the index is reduced (by changing the material composition or index doping) on the radial portions of the fiber to the outside of the bend and/or increased on the radial portions of the fiber to the inside of the bend. In some embodiments, the combined increase in the index due to bending and the compensating decrease in the index due to the varied-composition-caused index profile will balance one another, such that the signal mode (e.g., the primary mode or single mode in a single-mode large-mode-area (LMA) core (e.g., a core having a diameter of 40 microns or more (in some embodiments, the LMA core diameter is 50 microns or more, 60 microns or more, 70 microns or more, 80 microns or more, 90 microns or more, 100 microns or more, 120 microns or more, 140 microns or more, 160 microns or more, 180 microns or more, or 200 microns or more))) is radially symmetric and centered in the core of the curved section of the waveguide.

In some embodiments, the side-to-side gradient or slant in the overall fiber index profile is set during fiber draw from its preform, with an indicia of which side has the lower index (such as a flat on the side of the fiber (which could be on the inside, outside, top or any other convenient side of the fiber)), such that the fiber orientation can be maintained during coiling the fiber to get the effective index profile (based on the combination of the composition index and the bending index) correct.

In other embodiments, a fiber that has an initially radially symmetric index profile is coiled such that the index is increased to the outside of the coil, and the doping profile of the core is fabricated to be on the outside of the core in the coiled portion of the fiber (i.e., the doping will be where the primary mode will be in the coiled section—on the side of the core to the outside of the curve). Because the doping is located only where the primary mode is, other modes that could be in the core of the LMA core are not amplified and are thus suppressed.

In contrast to the "rod-in-tube" method such as is described in U.S. Pat. Nos. 4,668,263 and 4,264,347, some embodiments of the present invention include manufacturing a "preform" consisting of a bundle construction of glass-fiber rods assembled in co-axial fashion—a center rod (or group of rods) of the bundle having one particular index of refraction, then a first ring of glass rods (and/or tubes, wherein the tubes provide the holes if generating a photonic-band-gap fiber, also called a "holey" fiber) is circled about the core rod(s), each glass rod in this first ring having a common second particular index of refraction, then a second ring of glass rods is located concentrically around the first ring or layer, with each of the glass rods of this second ring of glass rods having a common third particular index of refraction, and so on, with additional concentric rings of glass rods layered onto the bundle, each added concentric ring constituted of glass rods having their own particular common index of refraction. The bundle of glass rods assembled in this fashion are typically heated and fused to one another to generate the preform, which is then heated at one of its ends to a point where the preform just starts to melt. As it is melting while being heated, the melted end of the preform is pulled by a motor, in a fashion that draws out the heated, melted-together glass rods into a single, solid-glass fiber if drawn from a solid-glass preform, or into a single holey fiber if drawn from a preform that included tubes. In some embodiments, the fiber drawn out in this fashion is collected in a coil for later use. This method of fabrication creates a solid-glass fiber having a graded index of refraction in a manner that is much simpler than attempting to manufacture in its own right, a single glass fiber that has graded indices of refraction within it.

In some embodiments, the present invention uses bundled glass rods to generate the preform, but selects an arrangement of glass rods that generate a sloped index of refraction of both the core and the cladding by selecting rods of different indexes (e.g., gradually changing indexes from one side of the preform to the other) and/or different sizes or relative numbers (e.g., glass rods having an index selected from two or three different indexes, and combined in proportions that create the gradually-changing index from one side of the fiber to the other of both the core and the cladding(s)) and/or including glass tubes having differing hole diameters (to create photonic-bandgap fibers having the gradually-changing index from one side of the fiber to the other of both the core and the cladding(s)).

BRIEF DESCRIPTION OF THE DRAWINGS

FIG. 1A is a graph 101 of the perturbation of index-of-refraction profiles at various bend radii for a single-mode fiber at the practical limit for modified chemical vapor deposition (MCVD) corresponding to NA=0.06.

FIG. 1B is a graph 102 of the perturbation of index-of-refraction profiles at various bend radii for a for a single-mode fiber at a reduced numerical aperture (NA) of 0.02 which can easily be achieved by micro-structuring.

FIG. 1D is a graph 104 showing the effective index-of-refraction profile 142 for an 11-cm-design radius fiber over-bent to a bend radius of eight centimeters (8 cm) compared to the effective index-of-refraction profile 141 for a step-index fiber bent to a designed-for bend radius of twenty-five centimeters (25 cm).

FIG. 2A-1 is a schematic cross-section view of a photonic-crystal fiber 201 having a core 217 defined by micro-structuring and/or longitudinal holes 218 or regions of lower index of refraction.

FIG. 2A-2 is a schematic cross-section view of core 217 having seven micro-structured cells 219 of three different average indices of refraction.

FIG. 2A-3 is a schematic cross-section view of a micro-structured cell 219 having seven subcells defined by micro-structuring.

FIG. 2A-4 is a graph 202 of an as-designed stepped index-of-refraction profile 221 for a core cell 219 for mitigation of bending in a waveguide design.

FIG. 3A is a schematic graph 301 of the index of refraction and mode profile across a cross-section of a conventional fiber having a graded-index core with symmetrical index changes in all directions from the axis of the core when the conventional fiber is in a straight (unbent and uncoiled) state.

FIG. 3B is a schematic graph 302 of the index of refraction and mode profile across a cross-section of the conventional fiber when the conventional fiber is in a bent and/or coiled state.

FIG. 4A is a schematic graph 401 of the index of refraction and mode profile across a cross-section of a fiber according to some embodiments of the invention having a graded-index core with its doped region to the outside of the core with symmetrical index changes in all directions from the axis of the core when the conventional fiber is in a straight (unbent and uncoiled) state.

FIG. 4B is a schematic graph 402 of the index of refraction and mode profile across a cross-section of the fiber of the invention when the fiber is in a bent and/or coiled state, which forces the mode of the laser light to the outside of the core, thus overlapping the doped region.

FIG. 5A shows a schematic perspective view of a fiber 501 of the present invention that includes a curved-fiber portion 510 coiled around a mandrel 513 and spliced to transitional or conventional pigtails at each end in order to transition from an index profile suited for straight runs of fiber to an index profile that is compensated for being bent or coiled.

FIG. 5B shows a schematic perspective view of a fiber 502 of the present invention that includes a curved-fiber portion 510 being drawn and coiled around a mandrel before hardening.

FIG. 5C shows a schematic perspective view of a fiber 503 of the present invention that includes a curved-fiber portion 510 coiled around a mandrel and spliced to transitional slightly-curved pigtails 533 and 535 at each end 536 and 531, respectively, which are then spliced to straight fibers 534 and 538, respectively, at splices 537 and 532, respectively, in order to transition from an index profile suited for straight runs of fiber to an index profile that is compensated for being bent or coiled.

FIG. 5D shows a schematic perspective view of a fiber 504 of the present invention, wherein the fiber's holes have been expanded and/or contracted (e.g., by gas pressure and/or vacuum during the heating and drawing of the fiber and or afterward when the fiber is already wrapped around the mandrel) in order to provide a high NA initial section (represented by the uppermost cross-section with identical large holes (which provide low effective index, and thus a larger step down from the core index) surrounding the core (the center location with no hole)). This is transitioned to a section having a very low NA (represented by the mid-upper cross-section with identical small holes (which provide low effective index, and thus a larger step down from the core index) surrounding the core (the center location with no hole)). This is transitioned to a section having a sloped index wrapped or coiled around the mandrel (represented by the mid-lower cross-section with graduated-sized holes (small to the inside of the coil and larger to the outside of the coil (which provide sloped as-drawn index but an even effective index when wrapped on the mandrel) surrounding the core (the center location with no hole)). This is then transitioned to a section having a very low NA (represented by the lower-most cross-section with identical small holes (which provide low effective index, and thus a larger step down from the core index) surrounding the core (the center location with no hole)).

FIG. 6A is a lateral-cross-section graph 601 of an as-designed dual-core index-of-refraction profile for a dual-core waveguide fiber 600 (shown in FIG. 6H) useful for filtering and/or mitigation of bending loss, wherein this profile corresponds to a cross-section of a straight portion of the fiber 600 (shown in FIG. 6H).

FIG. 6B is a lateral-cross-section graph 602 of an index-of-refraction profile for a dual-core waveguide fiber 600 (shown in FIG. 6H), wherein this profile corresponds to a cross-section of a portion of fiber 600 bent to a bend radius of 40 cm.

FIG. 6C is a lateral-cross-section graph 603 of an index-of-refraction profile for a dual-core waveguide fiber 600 (shown in FIG. 6H), wherein this profile corresponds to a cross-section of a portion of fiber 600 bent to a bend radius of 20 cm.

FIG. 6D is a 3-D side perspective-view graph 604 of the indices-of-refraction profiles and schematic mode profiles for a dual-core waveguide fiber 600 useful for filtering and/or mitigation of bending loss, wherein profile 601 corresponds to a straight portion of the fiber 600, profile 602 corresponds to a portion of fiber 600 bent to a bend radius of 40 cm, and profile 603 corresponds to a portion of fiber 600 bent to a bend radius of 20 cm.

FIG. 6E is a 3-D side-view graph 605 of the indices-of-refraction profiles and schematic mode profiles for dual-core waveguide fiber 600 useful for filtering and/or mitigation of bending loss, wherein profile 601 corresponds to a straight portion of the fiber 600, profile 602 corresponds to a portion of fiber 600 bent to a bend radius of 40 cm, and profile 603 corresponds to a portion of fiber 600 bent to a bend radius of 20 cm.

FIG. 6F is a 3-D end-side-perspective-view graph 606 of the indices-of-refraction profiles and schematic mode profiles for dual-core waveguide fiber 600 useful for filtering and/or mitigation of bending loss, wherein profile 601 corresponds to a straight portion of the fiber 600, profile 602 corresponds to a portion of fiber 600 bent to a bend radius of 40 cm, and profile 603 corresponds to a portion of fiber 600 bent to a bend radius of 20 cm.

FIG. 6G is a 3-D end-view graph 607 of the indices-of-refraction profiles and schematic mode profiles for dual-core waveguide fiber 600 useful for filtering and/or mitigation of bending loss, wherein profile 601 corresponds to a straight portion of the fiber 600, profile 602 corresponds to a portion of fiber 600 bent to a bend radius of 40 cm, and profile 603 corresponds to a portion of fiber 600 bent to a bend radius of 20 cm.

FIG. 6H is a plan-view schematic of an exemplary fiber 600 having straight, radius=40-cm, radius=20-cm sections connected to one another.

FIG. 7E is a plan-view schematic of an exemplary fiber 700 having a straight section connected to a radius=40-cm section, which is then connected to a radius=20-cm section.

FIG. 8A is a block functional diagram 801 of a distributed-gain-filtering optical fiber 901 (see FIG. 9A) having medium-length filter segments.

FIG. 8B is a block functional diagram 802 of a distributed-gain-filtering optical fiber 902 (see FIG. 9B) having short-length filter segments.

FIG. 8C is a block functional diagram 803 of a distributed-gain-filtering optical fiber 903 (see FIG. 9C) having very-short-length filter segments.

FIG. 8D is a block functional diagram 804 of a distributed-gain-filtering optical fiber 904 (see FIG. 9D) having long-length filter segments.

DETAILED DESCRIPTION

Figure 1C:
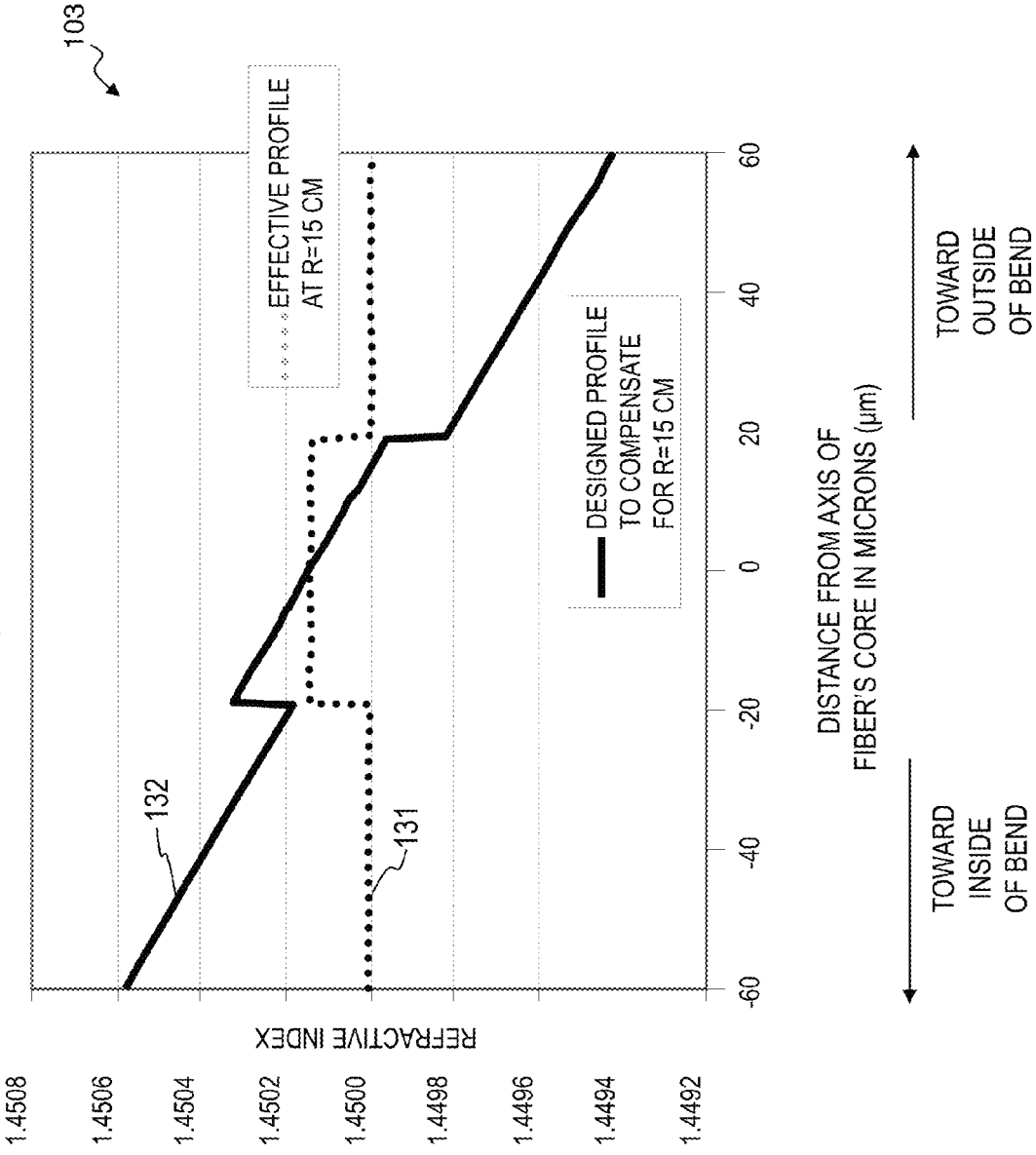
FIG. 1C is a graph 103 showing an as-designed index profile 132 (the profile of the fiber when it is straight) whose shape is a mirror of the bend-induced profile 131, used for providing bend compensation, and showing the effective index-of-refraction profile of the fiber when it is bent to a bend radius of 15 centimeters.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

In some embodiments, the present situation is well-described by:
(i) Conventional LMA fibers are intrinsically multimode due to the minimum practical numerical aperture of 0.06. When such fibers are bent the refractive index profile is distorted leading to shrinkage of the fundamental mode. (For step-profile fibers having a core diameter greater than about 25 microns (μm) this is of increasing concern.)

(ii) Micro-structured fibers have enabled record effective areas for fundamental-mode operation but the "fibers" have evolved into glass rods with consequential difficulty in packaging.

Fini et al. at OFS (J. M. Fini, "Design of large-mode-area amplifier fibers resistant to bend-induced distortion," J. Opt. Soc. Am. B 24, 1669-1676 (2007)) and Farrow et al. at Sandia National Labs (Farrow et al., "Design of refractive-index and rare-earth dopant distributions for large-mode area fibers used in coiled high power amplifiers," Proc SPIE Vol. 6453 64531C) have proposed modified profiles for conventional LMA fibers, and modeling suggests that the limits of the step-index approach can be extended by introducing a degree of grading to the profile. Introducing a grade to a multimode fiber typically shrinks the initial mode field, but the grading mitigates the distortion when the fiber is bent. Dong et al. from IMRA (Dong et al., "Bend-resistant fundamental mode operation in ytterbium-doped leakage channel fibers with effective areas up to 3160 μm²," OPTICS EXPRESS, Vol. 14, No. 24, pp. 11512-11519) have designed bend-loss-mitigating micro-structured fibers, but these leakage-channel waveguides share the property of step-index LMA fibers in that the mode-field shrinks in the bend.

One of the problems is that the refractive-index profiles (if stress-producing rods in polarization-maintaining (PM) versions are excluded) of conventional step- or graded-index LMA fibers are cylindrically symmetric, whereas the bend-induced distortion is asymmetric with respect to the original fiber axis. photonic-crystal fibers (PCFs) and micro-structured fibers have to date also been symmetric in design.

Fini suggests that an initially asymmetric profile could compensate for the distortion induced by a bend, but states that such a structure is impractical due to the cylindrical symmetry of a typical deposition process (J. M. Fini, "Bend-resistant design of conventional and microstructure fibers with very large mode area," Optics Express, Vol. 14, Issue 1, pp. 69-81 (Jan. 9, 2006)).

In some embodiments, the current invention uses micro-structuring fabrication techniques to design a bend-compensated profile which would be applicable to either multimode or single-mode LMA designs. The technique may also be beneficial in the packaging of rod-fibers. Opposition to deployment of these structures often highlights the packaging issue for a rigid glass rod when it becomes longer than a practical limit (imposed, e.g., by packaging and form-factor considerations) of, say, 50 cm.

If a rod (or fiber with effective area currently only supported by a rod) can be bent without significant loss or mode-distortion, then packaging is facilitated and the rod can also be lengthened, thus increasing the useable range of operation (e.g., high average powers with less heat/length).

In some embodiments, the present invention uses micro-structuring (or nano-structuring within one or more of the cells) stack-and-draw fabrication techniques to realize a refractive-index profile with an asymmetric profile which can compensate for bend-induced distortion and/or loss. One such technique used in some embodiments of the present invention is described in the above-mentioned U.S. Pat. No. 6,711,918, which is incorporated herein by reference. In some embodiments, the present invention modifies the preform structure described in U.S. Pat. No. 6,711,918, by instead bundling together a plurality of glass rods of various specific physical, chemical, or optical properties that, when fused together and drawn into a fiber, provide bend-compensating sloping of the refractive index from one side of the cladding to another side of the cladding, and/or having a different refractive-index or active-species-doping profiles on one side of the core than another side of the core.

In other embodiments, the present invention uses a graded refractive-index profile (which may be multimode) in which the rare-earth dopant is placed asymmetrically with the fiber oriented so that the dopant is on the outside of the bend. In this case advantage can be gained even if the original refractive-index profile is symmetric. In some embodiments, the present invention modifies the preform structure described in U.S. Pat. No. 6,711,918, by instead bundling together a plurality of glass rods of various specific physical, chemical, or optical properties that, when fused together and drawn into a fiber, provide the desired dopant profile (e.g., with the active dopant only on, or more concentrated on, the side of the core that faces the outside of the bend).

U.S. Pat. Nos. 4,668,263, 4,264,347, and 6,711,918 are incorporated herein by reference. Each of these describes techniques and structures for preforms and optical-fiber formation that are combined with the details described herein to form some embodiments of the invention.

U.S. patent application Ser. No. 11/426,302 (now U.S. Pat. No. 7,526,167) and Ser. No. 11/567,740 (now U.S. Pat. No. 7,570,856), and U.S. Pat. Nos. 7,199,924, 7,391,561 and 7,400,807 are incorporated herein by reference. Each of these patents and applications describes various features of high-power optical-fiber amplifiers that, in some embodiments, are combined with some embodiments described herein to form some embodiments of the present invention. For example, the various fiber structures and cladding-and-core-index profiles and core-doping profiles described in these patents and patent applications are modified as described herein in order to provide compensation for bend-induced index sloping, and in order to have a plurality of cores, each having a different index and/or doping profile, wherein the designer can transfer the signal-wavelength light mode from one core to another core by simply bending the fiber to one or another of its design bend radii. Each one of a plurality of different cores in the same fiber can have different effects on the signal mode, such as guiding, filtering, mode shaping, and/or amplifying. The fiber can be wound on adjacent cooling cylinders of different radii, wherein as the fiber transitions from one bend radius on one cooling cylinder to another bend radius on another cooling cylinder, the signal mode is moved from one core to another core. Further, the transition radius where the signal is between core regions can be used to form a resonant structure that is tuned to propagate only a very narrow band of signal wavelengths and to radiate or reject other wavelengths, thus filtering the wavelength of the signal mode.

In other embodiments, the present invention combines a certain amount of index asymmetry and dopant asymmetry that are utilized together to engineer an optimized solution for a coiled or curved optical-amplifier waveguide.

Bend-Induced Profile Distortion

The effective refractive-index profile of a bent or curved fiber can be described by an effective-profile formula:

$$n^2(x,y) = n_0^2(x,y)[1+2x/R]$$

where $n_0(x, y)$ is the original profile of the straight fiber; R is the radius of curvature; and x=distance from fiber axis in the plane of the bend.

Consider a number of different profiles and the effect of bending:

Case (i): Step-index single-mode fiber, NA=0.06, core diameter=13 microns (μm). This may be considered the practical limit for a single-mode fiber made by MCVD. The refractive index profiles before and after bending are shown in FIG. 1A. FIG. 1A shows a graph 101 of the perturbation of various index profiles for a single-mode fiber at the practical limit for MCVD corresponding to NA=0.06 (index profile 111 for straight fiber, index profile 112 for 25-cm radius curved fiber, index profile 113 for 20-cm radius curved fiber, index profile 114 for 15-cm radius curved fiber, and index profile 115 for 10-cm radius curved fiber). In this case the fiber profile is perturbed such that the mode-field is shifted laterally but the relatively small diameter of the core means that the local guidance in the perturbed region is still too weak to "capture" the mode, so in this case the lateral shift is not accompanied by any appreciable mode-shrinkage. At sharp bend diameters the outer cladding on the outside of the bend can have higher index than the effective index of the mode, so increased leakage is expected.

Case (ii): Single mode fiber with NA=0.02, core diameter 38 microns (μm), representative of state-of-the-art for micro-structured fibers (as opposed to rods.) In this case the perturbed profiles show a much more dramatic change between the straight and bent cases. In all cases, the cladding index exceeds the index of the edge of the core at a distance of 2 core radii or less. It may be surmised that bend-loss (through tunneling (frustrated total internal reflection)) would be a limiting factor in these cases. Therefore the potential advantage of the micro-structured fibers being single-mode by design is diluted by the intrinsic bend-loss. In order to demonstrate clear performance advantage over conventional fibers the micro-structured gain fibers have evolved into rods. In this case the rigidity limits the macro-bend and micro-bend impairments in extreme single-mode-fiber geometries.

FIG. 1B shows a graph 102 of the perturbation of index-of-refraction profiles at various bend radii (index profile 125 for straight fiber, index profile 124 for 25-cm radius curved fiber, index profile 123 for 20-cm radius curved fiber, index profile 122 for 15-cm radius curved fiber, and index profile 121 for 10-cm radius curved fiber) for a single-mode fiber at a reduced NA of 0.02, which can easily be achieved by micro-structuring.

The fabrication techniques employed in the manufacture of micro-structured fibers (such as, e.g., U.S. Pat. No. 6,711,918 to Kliner et al., which is incorporated herein by reference) offer an additional degree of freedom which has not been exploited to date, namely the ability to engineer asymmetric profiles. If the goal is to engineer a certain perturbed profile at a given design bend radius, then the original unperturbed profile should be the mirror image of the perturbed step profile. This is shown in FIG. 1C.

FIG. 1C shows a profile whose shape is a mirror, i.e., a side-to-side sloped grading of the index-of-refraction function that is in the opposite side-to-side direction of the bend-induced index-of-refraction profile, and which is used, in some embodiments, for providing bend compensation. A linear ramp to the index profile 132 across the diameter of the fiber in the plane of the bend results in an effective step index when the fiber is then bent to the correct designed-for radius.

In some embodiments, the fiber has a certain amount of tolerance built in. In fact, bending beyond the design radius of this fiber would have less impact than bending beyond the much-stricter design radius of an initial step-index fiber of comparable bend radius.

To illustrate this, consider a practical example: The largest practical fiber (as opposed to a rod) is represented by a 41/200 photonic-crystal fiber (PCF) from Crystal Fibre A/S—Blokken 84, 3460 Birkerod, Denmark. The polarization-maintaining (PM) version of this fiber has a design bend radius of 25 cm. This fiber has an effective NA=0.02, corresponding to an index step of 0.00014 (i.e., the refractive index of the core is 0.00014 higher than the refractive index of the inner cladding). In some embodiments, the 41/200 fiber has five rows of micro-structure cells (e.g., rows of 3, 4, 5, 4, and 3 cells each, respectively across the core) across the center of the core. In some embodiments, a fiber is designed with each row of cells decreasing in index by 0.00014 relative to the previous row of cells (thus sloping the refractive index lower, as the rows progress from the side of the core facing the inside of the bend to the side of the core facing the outside of the bend); this corresponds to an index change across the core of 0.00056. In some embodiments, this fiber would approximate the design for mitigating a bend radius of 11 cm. (In other embodiments, more rows of smaller cells can be used, wherein each row has a refractive index that differs from that of adjacent rows by a smaller amount, thus providing a finer granularity to the index slope.)

If the perturbed profile is calculated for the 11-cm-bend-radius-mitigation design, in some embodiments, the fiber is bent (or curved) to a bend radius of 8 cm to achieve the same perturbed profile as the uniform profile bent to a bend radius of 25 cm. This is illustrated in FIG. 1D. Essentially this means that if a step profile has allowable bend radii from 25 cm to infinite (straight), then the 11-cm-bend-radius-mitigation fiber (for example) has an allowable bend radius in a range from 8 cm to 14 cm. In some embodiments, this is a good tradeoff.

FIG. 1D is a graph that shows effective index-of-refraction profiles of an 11-cm-design-radius fiber overbent to an 8-cm radius. The "penalty" for overbending this fiber is equivalent to bending an original step fiber to a bend radius of 25 cm. This is the design bend radius for the Crystal Fibre A/S 41/200 PM fiber. This indicates a significant amount of built-in tolerance to the compensated fiber design. It suggests that the pre-compensation not only enables the practical use of extremely large mode areas, but also introduces improved tolerances to coil optimization.

Figure 1E:
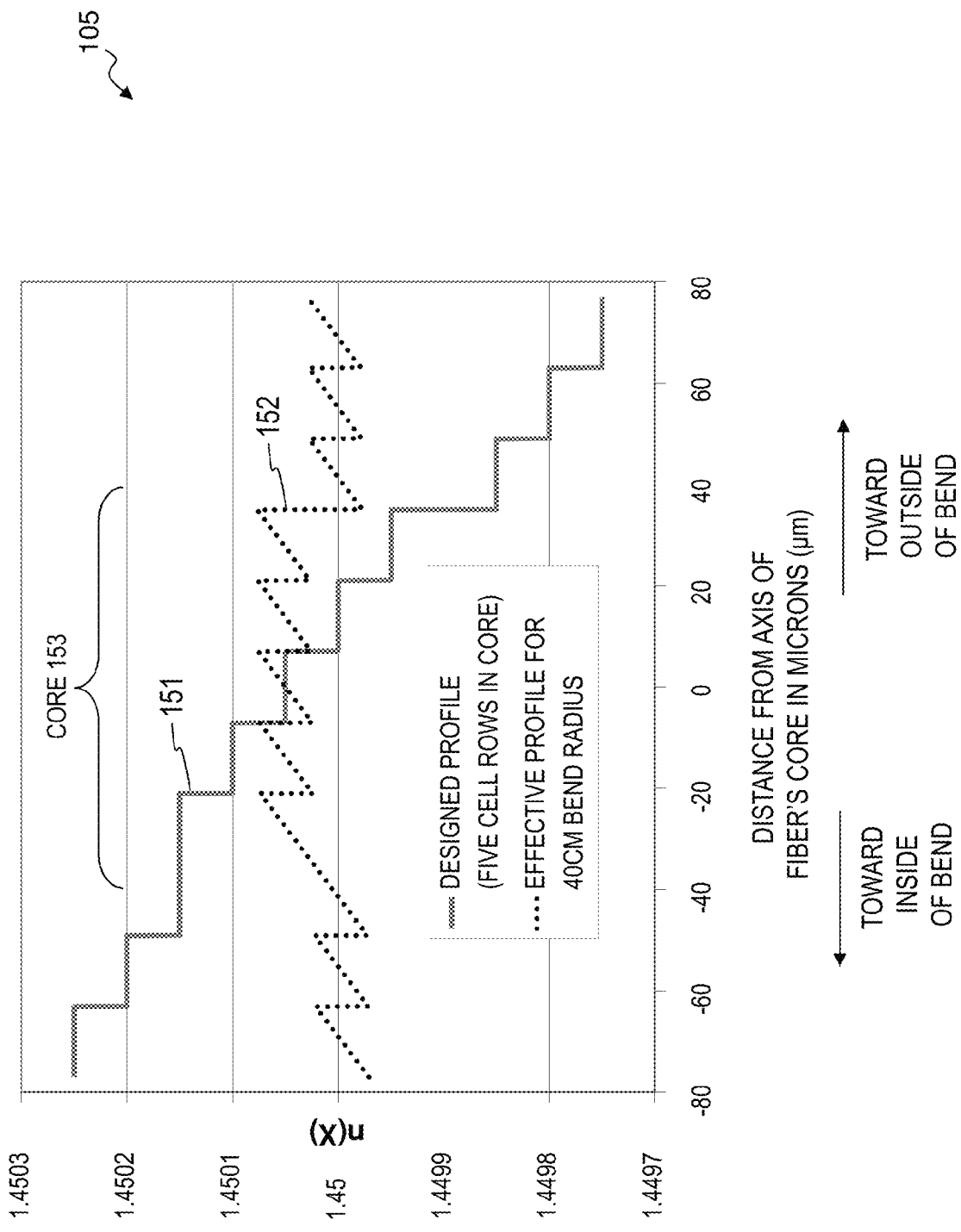
FIG. 1E is a graph 105 showing an as-designed stepped index-of-refraction profile 151 for mitigation of bending in an extreme waveguide design with a core diameter of 70 microns, compared to the effective index-of-refraction 152 this fiber bent to a bend radius of forty centimeters (40 cm).

As another example, calculate the equivalent five-cell (5-cell) profile for a seventy-micron (70-μm) single-mode (SM) core (equivalent to the PCF rod profile with NA=0.015). Assuming five cells with an index step of $5 \times 10^{-5}$ (the practical limit for the technology, in some embodiments), the profile shown in FIG. 1E is constructed. In practice, the idealized linear ramps would actually be a staircase ramp, with the practical issues like reasonable cell size and index control tolerances determining the departure from ideal. Also shown in FIG. 1E is the profile when the staircase profile is subjected to a bend radius of 40 cm. Although the resulting profile has a saw-tooth structure, the scaling length and local index excursion are such that the mode would still "see" an averaged profile which approximates a step.

It may be possible to introduce some second-order grading within a cell, e.g., with air holes or index rod perturbations. If this is the case, then greater cell-to-cell first-order index steps could be increased and tighter design bend radii would be permitted.

Another means by which asymmetry can be introduced is by the shape of the core. With micro-structuring it should be possible to engineer asymmetric shapes such as trapezoidal or egg-shapes. By reducing the core dimension on the outside of the bend relative to the inside, the effective index can be fine tuned. Geometric tapering may be a means of smoothing out the saw-tooth nature of the effective profiles resulting when the stepped profiles are bent.

FIG. 1E shows a graph of an index-of-refraction profile for mitigation of bending in an extreme waveguide design with a core diameter of 70 microns (70 μm). In this case, the practical issue of cell dimensions and tolerance in index step-size is taken into account. The index excursion within a cell is small enough for the mode to "see" the in-the-average index only.

In some embodiments, the above techniques are also applicable to nominally multimode waveguides under single-mode excitation. However, the index ramp required for bend mitigation depends only weakly on absolute core index, so the above scenarios are also representative of these cases.

In some embodiments, the present invention has the following aspects that are combined is various combinations in some embodiments of the invention:

(i) In some embodiments, the present invention provides a micro-structured waveguide amplifier containing a coiled gain section in which the fabricated refractive-index profile across a core is asymmetric.

(ii) The amplifier of paragraph (i) in which the asymmetry is introduced by solid glass refractive index micro-structuring.

(iii) The amplifier of paragraph (i) in which the asymmetry is introduced by holes of varying dimensions.

(iv) The amplifier of paragraph (i) in which the asymmetry is introduced by a combination of air holes and solid glass micro-structuring.

(v) The amplifier of paragraph (i) in which the coiling results in a reduction in the asymmetry of the bent fiber profile with respect to the straight fiber.

(vi) The amplifier of paragraph (i) in which the effective area of the bent asymmetric fiber is better than the equivalent symmetric fiber deployed with the same bend radius.

(vii) The amplifier of paragraph (i) in which the lowest order mode bend-loss of the bent asymmetric fiber is better than the equivalent symmetric fiber deployed with the same bend radius. (See definition of equivalent symmetric fiber above.)

(viii) The amplifier of paragraph (i) in which the coupling from the lowest-order mode of the bent asymmetric fiber to higher-order modes is lower than for the equivalent symmetric fiber deployed with the same bend radius.

(ix) The amplifier of paragraph (i) in which the bent asymmetric fiber is single-moded.

(x) The amplifier of paragraph (i) in which the bent asymmetric fiber is multimode under single-mode excitation.

(xi) The amplifier of paragraph (i) in which the bent asymmetric fiber is multimode with differential bend-loss for higher-order modes when bent beyond the design radius.

(xii) The amplifier of paragraph (i) in which the bent asymmetric fiber is single-polarization at or beyond the design radius.

(xiii) The amplifier of paragraph (i) in which form asymmetry in the cell structure is used to smooth out the effective index profile which results from a step-tapered index profile.

(xiv) A waveguide amplifier containing a coiled gain section in which the fabricated core shape is asymmetric.

(xv) The waveguide amplifier of paragraph (xiv) where the core is smaller towards the outside of the bend.

(xvi) The waveguide amplifier of paragraph (xiv) where the core is micro-structured.

(xvii) The waveguide amplifier off paragraph (xiv) where the core is manufactured by modified chemical vapor deposition (MCVD) with the asymmetry introduced by pre-shaping the substrate tube.

(xviii) The waveguide amplifier of paragraph (xiv) where the asymmetry is introduced by softening and squashing the preform.

(xix) The waveguide amplifier of paragraph (xiv) where the refractive index of the core is uniform.

(xx) The waveguide amplifier of paragraph (xiv) where the refractive index of the core is graded.

(xxi) A micro-structured waveguide amplifier containing a coiled gain section in which the rare-earth dopant is deposited asymmetrically within the waveguide.

(xxii) The amplifier of paragraph (xiii) in which the refractive-index profile is graded.

(xxiii) The amplifier of paragraph (xiii) where the coil is configured with the dopant on the outside of the bend.

In some embodiments, an indicia of the cross-sectional direction of the direction of grading of the index or the offset of index or doping profile is provided, such as a flat (a flat section on the cylindrical outer portion along the length of the fiber on its outer diameter or inner diameter shows the orientation that is to be maintained when winding the fiber around a mandrel). In other embodiments, stress rods, color stripes, grooves, protrusions or other indicia are provided on the fiber to denote its intended orientation that is to be maintained when winding the fiber around the mandrel, in order that the micro-structured graded index of refraction is correctly oriented relative to the bend direction.

FIG. 2A-1 shows a schematic cross-section of a photonic-crystal fiber (PCF) 201 having a core 217 defined by the longitudinal holes 218 or regions of lower index of refraction (rather than by various glasses or doping profiles having different indices of refraction). In some embodiments, PCF 201 has a core 217 whose refractive index is micro-structured by including a plurality of rows (three vertically-oriented rows are shown here, but in other embodiments, a larger or smaller number of rows are used). In the embodiment shown, the left-hand vertical row of cells (indicated by the two hexagonal cells marked $n_0^+$) have a slightly higher index of refraction than the default refractive index $n_0$ that is implemented in the center vertical row of cells (indicated by the three hexagonal cells marked $n_0$), and the right-hand vertical row of cells (indicated by the two hexagonal cells marked $n_0^-$) have a slightly lower index of refraction than the default refractive index $n_0$. This situation is denoted herein as a sloped index of refraction, since the refractive index decreases from the left side of the core 217 (the side of the core facing the inside of the bend of the coiled fiber) to the right side of the core 217 (the side of the core facing the outside of the bend of the coiled fiber). In the embodiment shown here, the core is implemented using seven cells in three rows, and there are three index values: $n_0^+$, $n_0$, and $n_0^-$. This provides two index steps ($n_0^+$ to $n_0$ and $n_0$ to $n_0^-$). In other embodiments, a greater number of cells and/or a greater number of rows are used, permitting a finer granularity (more steps and smaller steps) of refractive-index slope across the core. In some embodiments, the microstructure cells of the core are doped, and in some such embodiments, the doping varies left-to-right and/or top-to-bottom across the core. In some embodiments, the microstructure includes cells of the core, of the inner cladding 212, and/or of the outer cladding 213 of the fiber. In some embodiments, fiber 201 is implemented as a solid micro-structured fiber that is not using photonic-crystal techniques, but instead uses only the micro-structured cells to achieve the desired index and doping profiles. Fiber 201 also illustrates a photonic-crystal implementation of index slope that is achieved by using smaller longitudinal photonic-crystal holes (or areas of lower refractive index) and/or a greater spacing between holes on the side of the fiber toward the inside of the bend and by using larger longitudinal holes (or areas of lower refractive index) and/or a smaller spacing between holes on the opposite side of the fiber (the side toward the outside of the bend). In some embodiments, PCF 201 includes a flat 211 in a side of the fiber outer diameter.

The fiber structure, in some embodiments, is described in terms of cells with dimensions of a few microns (e.g., perhaps 10-micron-diameter cells). These seven cells have been described as having a particular average refractive index for that cell, and the bend mitigation is achieved by stepping down the index of each cell or row of cells from the inside of a bend to the outside. In some embodiments, each of these cells (219, 219', 219'') is further structured with sub-micron (which helps ensure that the typical signal and pump wavelengths of about one micron or more encounter all sub-micron portions) spatial scaling diameters with some sub-regions having higher refractive index and others having a lower refractive index. Typically (though the invention is not restricted to), the high-index regions would include alumino-silicate 214 or germano-silicate plus the active rare-earth doping, while the low-index regions would be fluorosilicate 215 or borosilicate. The submicron scaling ensures that the optical mode effectively experiences the average index and is not perturbed by the index contrast between nano-cells. FIG. 2A-4 is a graph 202 of an actual nano-cell index profile 221 for a core cell 219 to obtain a given effective cell index of $n_0^-$.

Figure 2B:
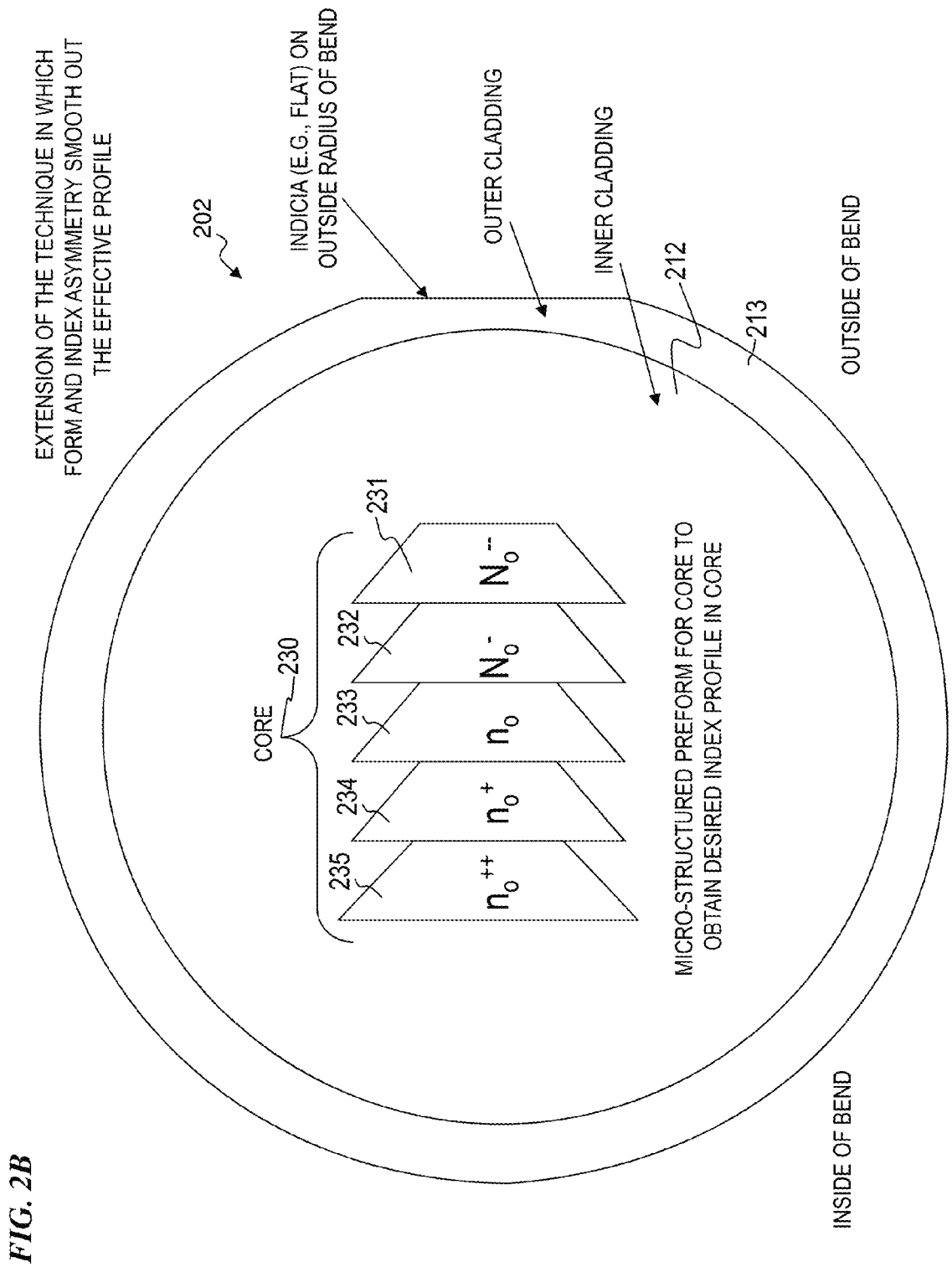
FIG. 2B is a schematic cross-section view of a double-clad fiber 202 having a graded-index core with gradually decreased index of refraction at the outside portions of the bend fabricated by micro-structured trapezoids of different indices of refraction.

FIG. 2B shows a schematic cross-section of a double-clad fiber preform 202 having a graded-index core 230 with gradually decreased index of refraction at the outside portions of the bend fabricated by micro-structured trapezoids of different indices of refraction. In some embodiments, the fiber drawn from the preform 202 has the same proportions and geometry. In the embodiment shown, five rows of cells with one cell per row are provided, with the cell 235 furthest toward the inside of the bend of the coiled fiber having the highest refractive index $n_0^{++}$, the next cell 234 having the next-highest refractive index $n_0^+$, the middle cell 233 having the default core refractive index $n_0$, the next cell 232 having the next-lower refractive index $n_0^-$ and the next cell 231 having the lowest core refractive index $n_0^{--}$. In some embodiments, the inner cladding 212 surrounding this core is also micro-structured to have a compositional or structural refractive-index slope that decreases from left to right (i.e., from the inside of the fiber bend to the outside of the fiber bend). In some embodiments, the inner cladding 212 surrounding this core has a compositional or structural refractive-index slope that decreases from left to right and is defined by photonic-crystal structures that define the index slope from one side to the other of the fiber cross section. In some embodiments, the pump light is launched into the inner cladding 212 and enters the core 230 along its length and the signal is launched into the core and is amplified by rare-earth doping species excited by the pump light.

Figure 2C:
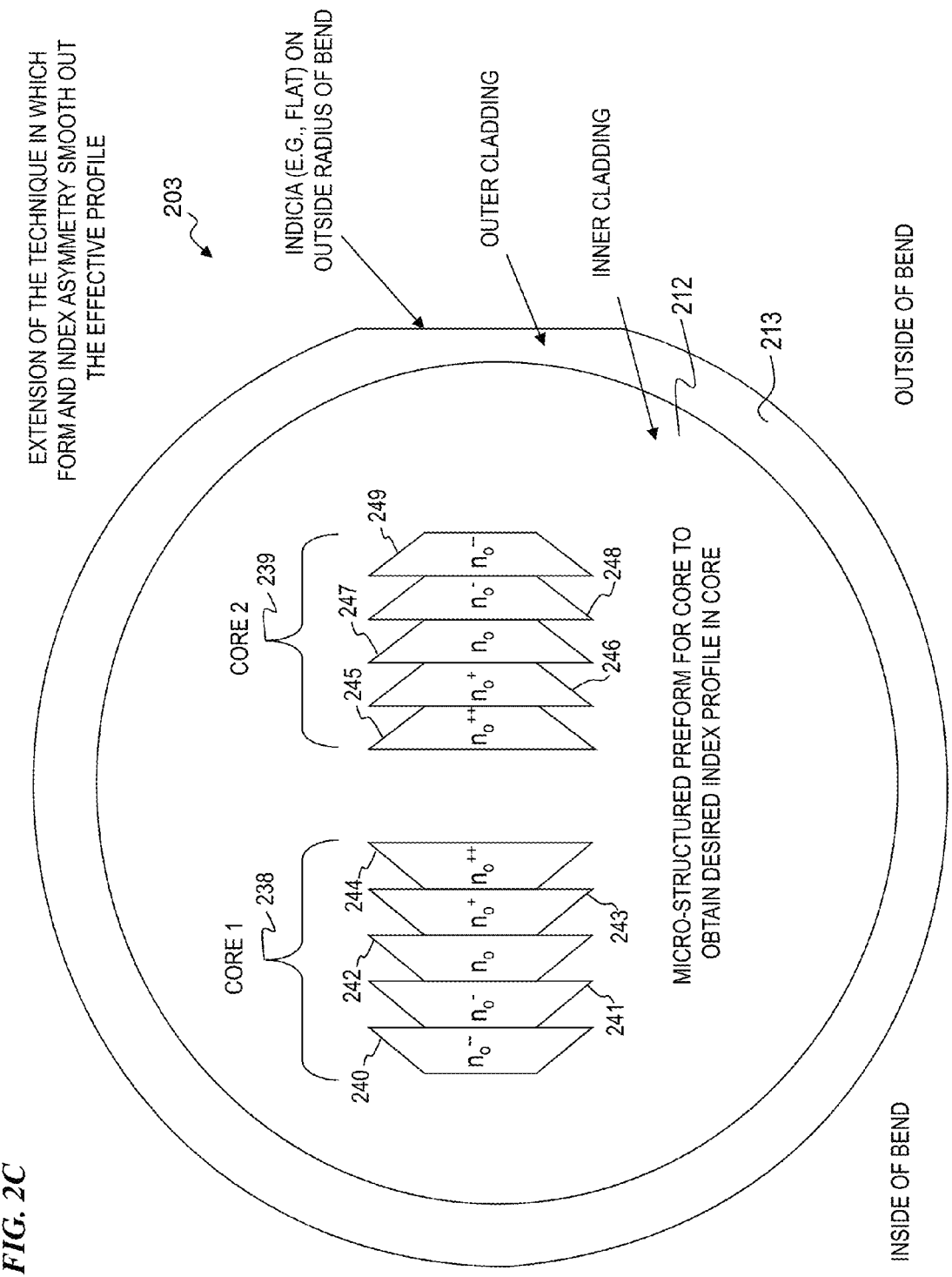
FIG. 2C is a schematic cross-section view of a double-clad fiber 203 having two graded-index cores each made from a preform that used trapezoid-shaped core sections to generate a gradually decreasing index of refraction across the left-hand core from the center to the left, and across the right-hand core from the center to the right.

FIG. 2C is a schematic cross-section view of a double-clad fiber preform 203 having two graded-index cores 238 and 239 each made from a preform that used trapezoid-shaped core sections to generate a gradually decreasing index of refraction across the left-hand core from the center to the left, and a gradually decreasing index of refraction across the right-hand core from the center to the right. In some embodiments, the fiber drawn from the preform 203 has the same proportions and geometry. In the embodiment shown, five rows of cells with one cell per row are provided for each core, wherein the first core 238 includes a plurality of trapezoids with the cell 240 furthest toward the inside of the bend of the coiled fiber having the lowest refractive index $n_0^{--}$, the next cell 241 having the next-lowest refractive index $n_0^-$, the middle cell 242 having the default core refractive index $n_0$, the next cell 243 having the next-higher refractive index $n_0^+$, and the next cell 244 having the highest core refractive index $n_0^{++}$. In some embodiments, the inner cladding 212 surrounding this core is also micro-structured to have a compositional or structural refractive-index slope that increases from left side to a vertical line in the middle (i.e., from the inside of the fiber bend to the center of the fiber bend) and that decreases from the vertical line in the middle to right side (i.e., from the center of the fiber bend to the outside of the fiber bend). In some embodiments, the inner cladding 212 surrounding this core has a compositional or structural refractive-index slope that increases from the left side to a vertical line in the middle and decreases from the vertical line in the middle to the right side and is defined by photonic-crystal structures that define the index slope from one side to the other of the fiber cross section. In the embodiment shown, the second core 239 includes a plurality of trapezoids with the cell 245 furthest toward the inside of the bend of the coiled fiber having the highest refractive index $n_0^{++}$, the next cell 246 having the next-highest refractive index $n_0^+$, the middle cell 247 having the default core refractive index $n_0$, the next cell 248 having the next-lower refractive index $n_0^-$, and the next cell 249 having the lowest core refractive index $n_0^{--}$. In some embodiments, the inner cladding 212 surrounding this core is also micro-structured to have a compositional or structural refractive-index slope that decreases from left to right (i.e., from the inside of the fiber bend to the outside of the fiber bend). In some embodiments, the inner cladding 212 surrounding this core has a compositional or structural refractive-index slope that has a gradually decreasing index of refraction across the left-hand side of cladding 212 from the center to the left, and a gradually decreasing index of refraction across the right-hand side of cladding 212 from the center to the right and this index-of-refraction profile is defined by photonic-crystal structures that define the index slope from one side to the other of the fiber cross section.

In some embodiments, the first core 238 is not doped or is substantially undoped, while the second core 239 is doped by one or more rare-earth doping species that absorb pump light having a pump-light wavelength and amplify signal light having a signal-light wavelength. In some embodiments, the pump light is launched into the inner cladding 212 and enters the cores 238 and 239 along their length and the signal is launched into the first core 238 or into both cores 238 and 239 (e.g., in some embodiments, at the end of a straight section of the fiber or in other embodiments, at the end of a section that curves to the right such that the left-hand side of the FIG. 2C corresponds to the outside of the bend) and, further along the fiber's length, the signal transfers to the second core 239 from the first core 238 as the fiber is bent in the proper direction to its design radius and the signal is amplified by rare-earth doping species excited by the pump light in the second core 239. In some embodiments, the cross-sectional index profile shown in FIG. 6A (and similar to the 3-D index profile 601 of FIGS. 6D, 6E, 6F and 6G) corresponds to the cross-sectional index profile of a dual-core fiber drawn from preform 203 when that fiber is bent to the right (such that the inside of the bend is the right-hand side of FIG. 2C), the cross-sectional index profile shown in FIG. 6B (and similar to the 3-D index profile 602 of FIGS. 6D, 6E, 6F and 6G) corresponds to the cross-sectional index profile of a dual-core fiber drawn from preform 203 when that fiber is straight, and the cross-sectional index profile shown in FIG. 6C (and similar to the 3-D index profile 603 of FIGS. 6D, 6E, 6F and 6G) corresponds to the cross-sectional index profile of a dual-core fiber drawn from preform 203 when that fiber is bent to the left (such that the inside of the bend is the left-hand side of FIG. 2C). In some embodiments, the spacing between core 238 and core 239 is designed such that when the fiber is straight or bent to the right, light of the desired signal wavelength transfers from one core to the other while other wavelengths do not transfer as well, thus providing a filter segment such as described in FIGS. 8A-8D and 9A-9D, while when the fiber is bent in the proper direction to its design radius, the signal is amplified by rare-earth doping species excited by the pump light in the second core 239 thus forming an amplifying segment. In some such embodiments, the filter segments and the amplifier segments are alternated such that the signal is alternately and repeatedly amplified and filtered.

Figure 2D:
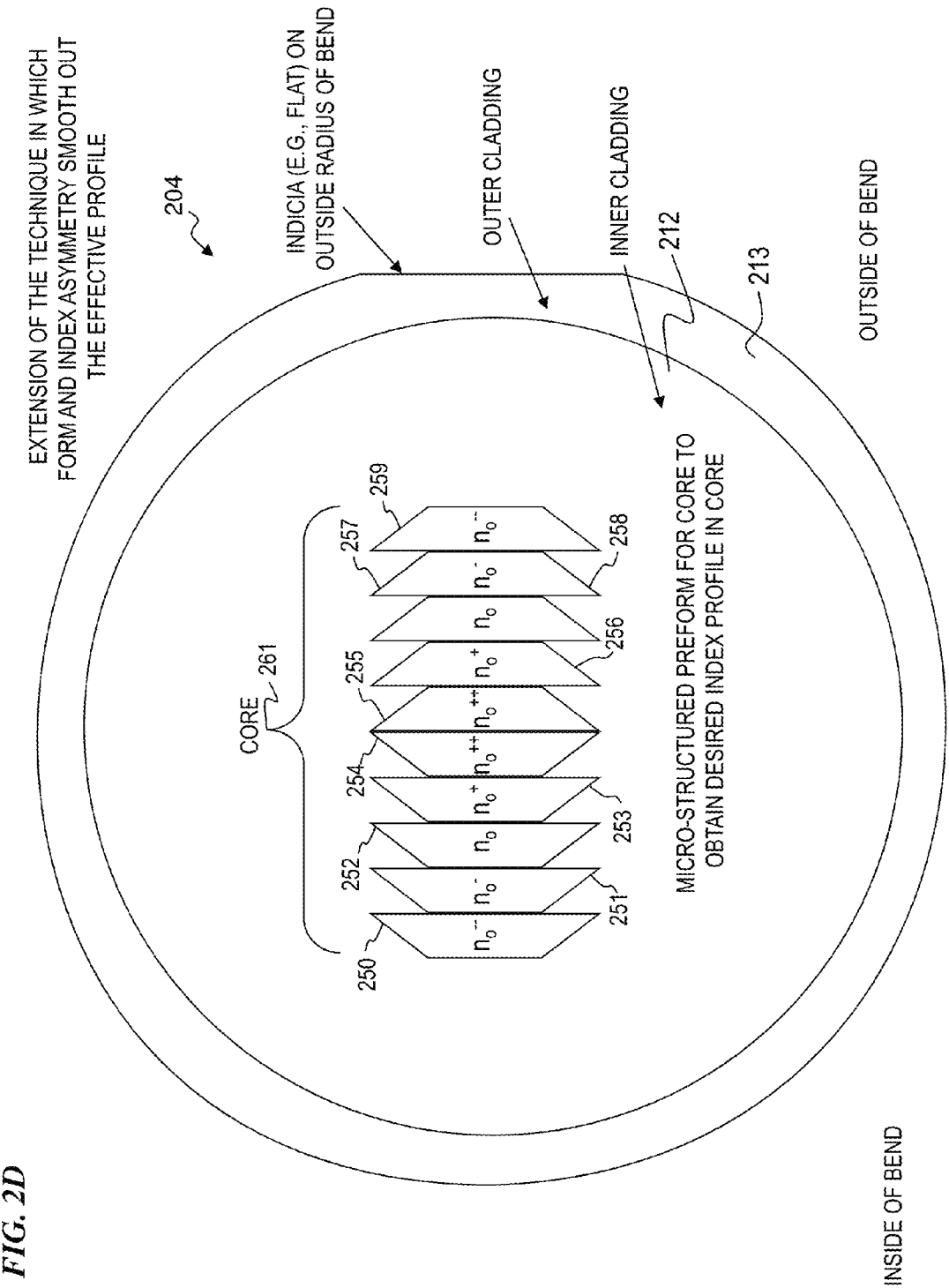
FIG. 2D is a schematic cross-section view of a double-clad fiber 204 having single graded-index core made from a preform that used trapezoid-shaped core sections to generate a gradually decreasing index of refraction across the left-hand-side of the core from the center to the left, and across the right-hand-side of the core from the center to the right.

FIG. 2D is a schematic cross-section view of a double-clad fiber preform 204 having single graded-index core 261 made from a preform that used trapezoid-shaped core sections to generate a gradually decreasing index of refraction across the left-hand-side of the core 261 from the center to the left, and across the right-hand-side of the core from the center to the right. In some embodiments, the fiber drawn from the preform 204 has the same proportions and geometry. In the embodiment shown, five rows of cells with one cell per row are provided for each half of single core 261, wherein the left-half of core 261 includes a plurality of trapezoids with the cell 250 furthest toward the inside of the bend of the coiled fiber having the lowest refractive index $n_0^{--}$, the next cell 251 having the next-lowest refractive index $n_0^-$, the middle cell 252 having the default core refractive index $n_0$, the next cell 253 having the next-higher refractive index $n_0^+$, and the next cell 254 having the highest core refractive index $n_0^{++}$. In the embodiment shown, the right-hand-side of the core 261 includes a plurality of trapezoids with the cell 255 furthest toward the inside of the bend of the coiled fiber having the highest refractive index $n_0^{++}$, the next cell 256 having the next-highest refractive index $n_0^+$, the middle cell 257 having the default core refractive index $n_0$, the next cell 258 having the next-lower refractive index $n_0^-$, and the next cell 259 having the lowest core refractive index $n_0^{--}$.

In some embodiments, the inner cladding 212 surrounding this core is also micro-structured to have a compositional or structural refractive-index slope that gradually increases from the left-hand side of cladding 212 to a vertical line in the middle (i.e., from the inside of the fiber bend to the center of the fiber bend) and that gradually decreases from the vertical line in the middle to the right-hand side of cladding 212 (i.e., from the center of the fiber bend to the outside of the fiber bend). In other embodiments, index profile of the inner cladding 212 is defined by photonic-crystal structures that define the index slope from one side to the other of the fiber cross section.

In some embodiments, the left-hand half of core 261 is not doped or is substantially undoped, while the right-hand half of core 261 is doped by one or more rare-earth doping species that absorb pump light having a pump-light wavelength and amplify signal light having a signal-light wavelength. In some embodiments, the pump light is launched into the inner cladding 212 and enters the core 261 along its length and the signal is launched into the left-hand half of core 261 or into both halves of core 261 (e.g., in some embodiments, at the end of a straight section of the fiber or in other embodiments, at the end of a section that curves to the right such that the left-hand side of the FIG. 2D corresponds to the outside of the bend) and further along the fiber's length the signal transfers to the right-hand half of core 261 from the left-hand half of core 261 as the fiber is bent in the proper direction to its design radius and the signal is amplified by rare-earth doping species excited by the pump light in the right-hand half of core 261. In some embodiments, the cross-sectional index profile 701 shown in FIG. 7A (and similar to the 3-D index profile 701 of FIG. 7D) corresponds to the cross-sectional index profile of a dual-core fiber drawn from preform 204 when that fiber is bent to the right (such that the inside of the bend is the right-hand side of FIG. 2D), the cross-sectional index profile 702 shown in FIG. 7B (and similar to the 3-D index profile 702 of FIG. 7D) corresponds to the cross-sectional index profile of a dual-core fiber drawn from preform 204 when that fiber is straight, and the cross-sectional index profile shown in FIG. 7C (and similar to the 3-D index profile 703 of FIG. 7D) corresponds to the cross-sectional index profile of a dual-core fiber drawn from preform 204 when that fiber is bent to the left (such that the inside of the bend is the left-hand side of FIG. 2D).

FIG. 3A shows a schematic graph 301 of the index of refraction 320 and mode profile 330 across a cross-section of a conventional prior-art fiber having a graded-index core with symmetrical index changes in all directions from the axis of the core when the conventional fiber is in a straight (unbent and uncoiled) state. In some embodiments, the core index and doped region 340 of the conventional prior-art fiber start centered to one another.

FIG. 3B shows a schematic graph 302 of the index of refraction 321 and mode profile 331 across a cross-section of the conventional prior-art fiber when the conventional fiber is in a bent and/or coiled state.

FIG. 4A shows a schematic graph 401 of the index of refraction 420 and mode profile 430 across a cross-section of a fiber according to some embodiments of the invention having a graded-index core with its doped region 440 to the outside of the core with symmetrical index changes in all directions from the axis of the core when the conventional fiber is in a straight (unbent and uncoiled) state.

FIG. 4B shows a schematic graph 402 of the index of refraction 421 and mode profile 431 across a cross-section of the fiber of the invention when the fiber is in a bent and/or coiled state, which forces the mode of the laser light to the outside of the core, thus overlapping the doped region 440.

FIG. 5A shows a schematic perspective view of a fiber 501 of the present invention that includes a curved-fiber portion 510 coiled around a mandrel 513 and spliced to transitional or conventional pigtails 511 and 512 at each end 514 and 513, respectively, in order to transition from an index profile suited for straight runs of fiber to an index profile that is compensated for being bent or coiled.

FIG. 5B shows a schematic perspective view of a fiber 502 of the present invention that includes a curved-fiber portion 510 being drawn and coiled around a mandrel 513 before hardening. In some embodiments, before fiber/rod 510 hardens, air pressure or vacuum to different holes varies their sizes as glass cools to change straight-core profile to curved-core profile and back again. In some embodiments, mandrel 513 includes a start block 521 where fiber 510 starts to wrap around mandrel 513, and mandrel 513 includes an end block 522 where mandrel forming stops.

FIG. 5C shows a schematic perspective view of a fiber 503 of the present invention that includes a curved-fiber portion 510 coiled around a mandrel 513 and spliced to transitional slightly-curved pigtails 533 and 535 at each end, which are then spliced to straight fibers in order to transition from an index profile suited for straight runs of fiber to an index profile that is compensated for being bent or coiled.

FIG. 5D shows a schematic perspective view of a fiber 504 of the present invention, wherein the fiber's holes have been expanded and/or contracted (e.g., by gas pressure and/or vacuum during the heating and drawing of the fiber and or afterward when the fiber is already wrapped around the mandrel) in order to provide a high NA initial section (represented by the uppermost cross-section 541 with identical large holes (which provide low effective index, and thus a larger step down from the core index) surrounding the core (the center location with no hole)). This is transitioned to a section having a very low NA (represented by the mid-upper cross-section 542 with identical small holes (which provide low effective index, and thus a larger step down from the core index) surrounding the core (the center location with no hole)). This is transitioned to a section having a sloped index wrapped or coiled around the mandrel (represented by the mid-lower cross-section 543 with graduated-sized holes (small to the inside of the coil and larger to the outside of the coil (which provide sloped as-drawn index but an even effective index when wrapped on the mandrel) surrounding the core (the center location with no hole)). This is then transitioned to a section having a very low NA (represented by the lower-most cross-section 544 with identical small holes (which provide low effective index, and thus a larger step down from the core index) surrounding the core (the center location with no hole)).

Figure 5E:
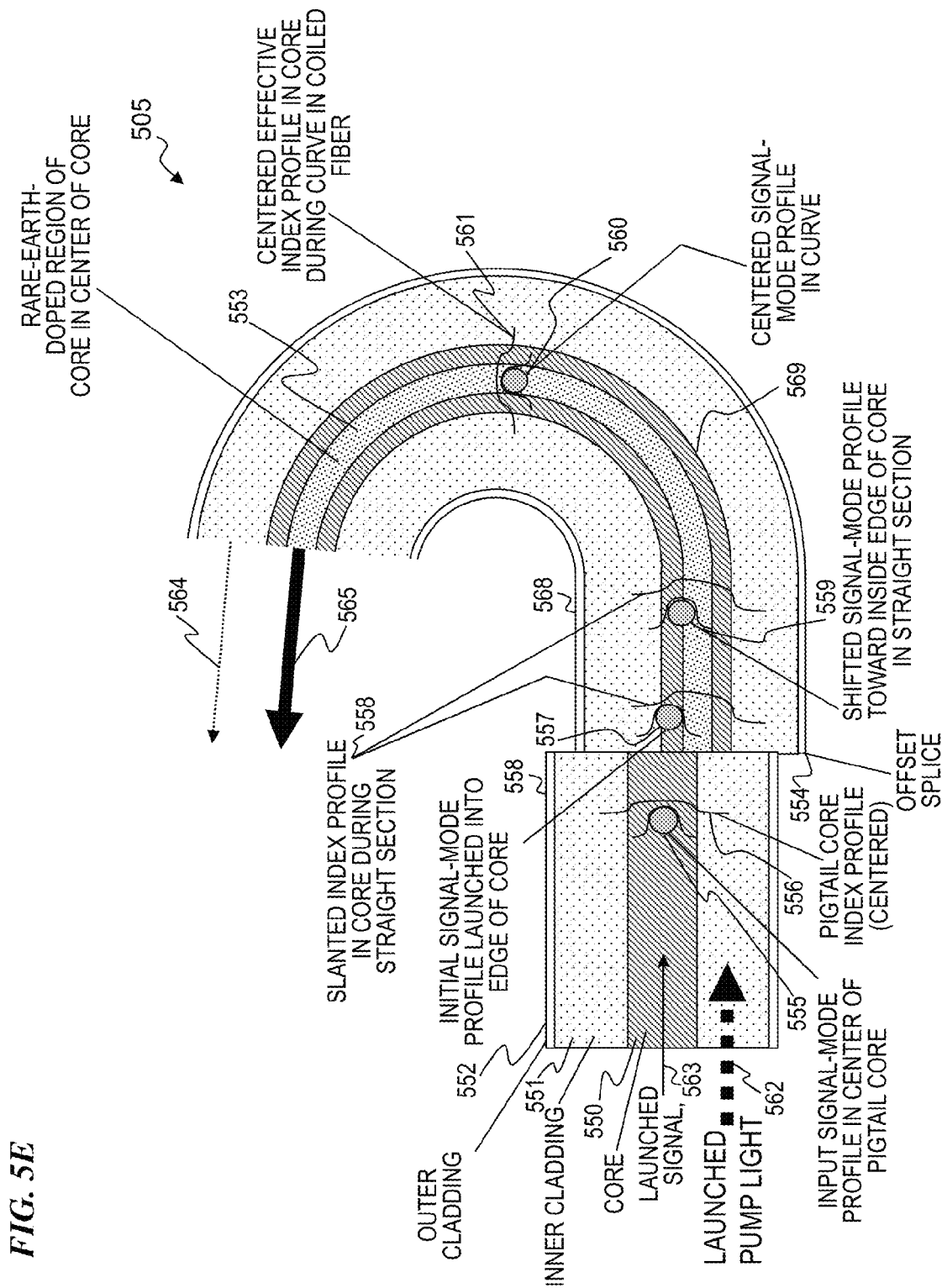
FIG. 5E is a schematic cross-sectional and graph view of a fiber 505 of the present invention coiled or bent in a semicircle with a slanted index profile having a higher index on the inside of the curve, a lower index to the outside of the curve, and offset-spliced to transitional straight or slightly-curved pigtails at each end that launch the signal light from the center mode of the pigtail core to the inside edge of the core that is then bent to its optimal curve to force the mode to the center of the coiled portion, where the dopant is located.

FIG. 5E shows a schematic cross-sectional and graph view of a fiber 505 of the present invention coiled or bent in a semicircle with a slanted index profile having a higher index on the inside of the curve, a lower index to the outside of the curve, and offset-spliced to transitional straight or slightly-curved pigtails at each end that launch the signal light from the center mode of the pigtail core to the inside edge of the core that is then bent to its optimal curve to force the mode to the center of the coiled portion, where the dopant is located.

In some embodiments, pump light (large dotted arrow 562) is launched into the inner cladding 551 of a pigtail 558 that includes a core 550, the inner cladding 551, and an outer cladding 552. In some embodiments, signal light (small solid arrow 563) is launched into core 550 with an input-signal mode profile 555 in the center of the pigtail core 550. In some embodiments, a pigtail core index profile 556 is centered. In some embodiments, the pigtail 558 connects to a fiber section 568 via an offset splice 554, wherein the fiber section 568 includes a core 569 having a rare-earth doped region 553 in the center of the core 569. In some embodiments, during the straight portion of the fiber section 568, core 569 has a slanted index profile 558. In some embodiments, the input-signal mode profile 555 of the pigtail 558 becomes the initial-signal mode profile 557 that goes into the edge of core 569 and shifts toward the edge of rare-earth doped region 553 in the straight section of the fiber to become shifted signal-mode profile 559. In some embodiments, signal-mode profile 560 is centered in rare-earth doped region 553 by effective index profile 561 in the curve of the fiber. In some embodiments, signal light (large solid arrow 565) exits the fiber from the center of core 569 and residual pump light (small dotted arrow 564) exits the fiber from the inner cladding of the fiber section 568.

Figure 5F:
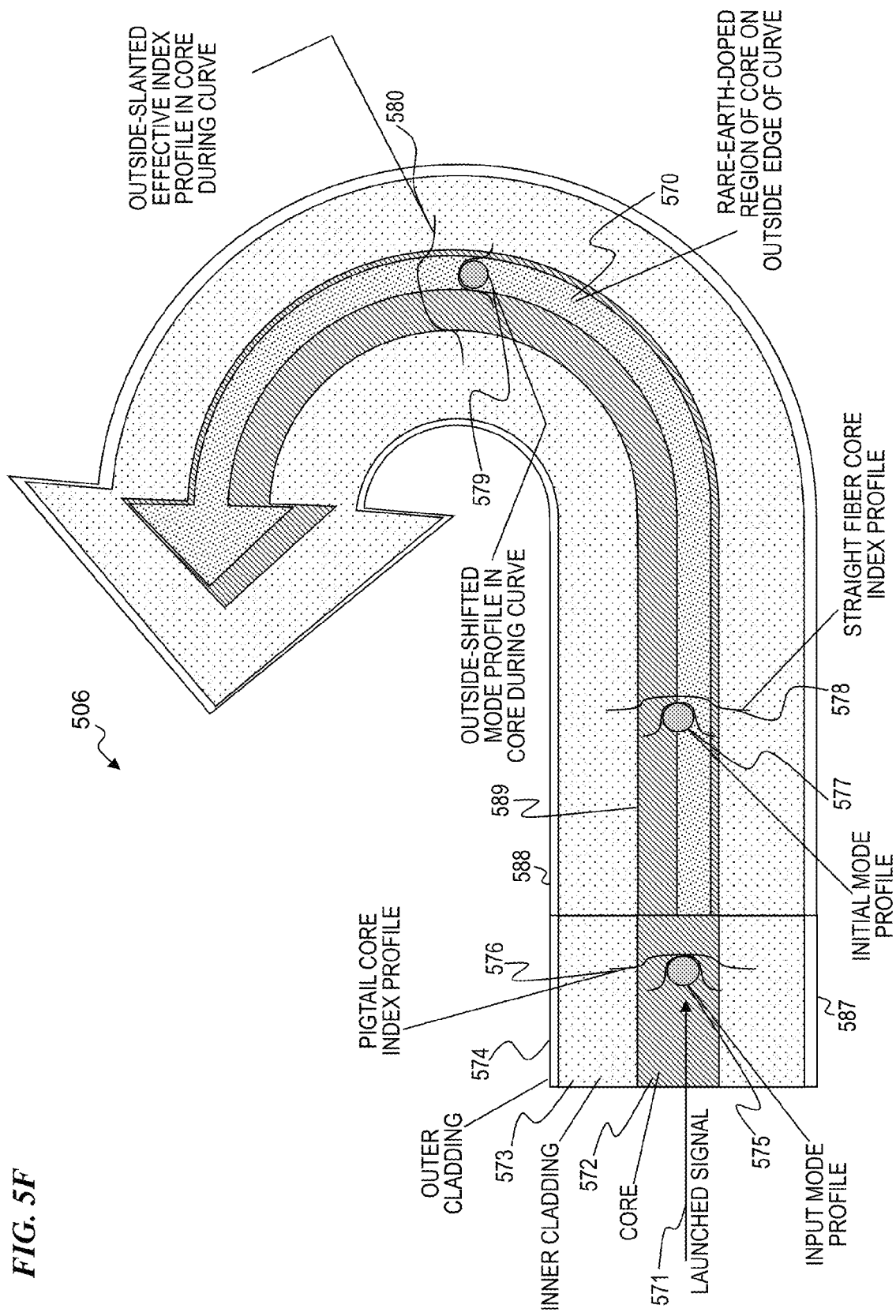
FIG. 5F is a schematic cross-sectional and graph view of a fiber 506 of the present invention coiled or bent in a semicircle with a conventional symmetric index profile but with doping on the outside of the curve, which is spliced to conventional undoped pigtails at each end that launch the signal light from the center mode of the pigtail core to the center of the core that is then bent to a curve that forces the mode to the outside edge of the core, where the dopant is located.

FIG. 5F is a schematic cross-sectional and graph view of a fiber 506 of the present invention coiled or bent in a semicircle with a conventional symmetric index profile but with doping on the outside of the curve, wherein the curved fiber section is spliced to conventional undoped pigtails at each end, wherein the pigtails are used to launch the signal light from the center mode of the pigtail core to the center of the core that is then bent to a curve that forces the mode to the outside edge of the core, where the dopant is located, and after amplification the far end of the fiber is again spliced to a pigtail for delivering the amplified signal.

In some embodiments, signal light (small solid arrow 571) is launched into core 572 of a pigtail 587, wherein signal light 571 has an input mode profile 575. In some embodiments, the pigtail 587 includes an inner cladding 573, an outer cladding 574, and a pigtail-core index profile 576. In some embodiments, signal light 571 enters a fiber section 588 from the pigtail 587 and there has an initial mode profile 577 in the straight portion of the fiber section 588. In some embodiments, the straight portion of fiber section 588 has a core index profile 578. In some embodiments, fiber section 588 includes a rare-earth-doped region 570 to a side of core 589, wherein that side of the core 589 is near the outside edge of the curve of the curved portion of fiber section 588. In some embodiments (because the fiber section 588 has an outside-slanted effective index profile 580 in the fiber core 589 during the curve of the fiber section 588), the mode profile 579 of the signal light shifts to the outer edge of fiber core 589 in the curved portion of fiber section 588 so that it is centered in the rare-earth-doped region 570.

FIG. 6A is a graph 601 (which shows a 2D cross-section of the index of refraction) of an as-designed dual-core index-of-refraction profile of the inner cladding and cores for a dual-core waveguide fiber 600 (shown in FIG. 6D) useful for filtering and/or mitigation of bending loss, wherein this profile corresponds to a straight portion of the fiber 600. In some embodiments, one core (e.g., the left-hand core) would be undoped, and thus would not absorb pump light, and another core (e.g., the right-hand core) would include doping of a laser species (e.g., one or more rare-earth elements), and this would absorb pump light (i.e., light having a wavelength suitable for pump absorption) and amplify signal light (i.e., light having a wavelength suitable for amplification by the lasing species). In some embodiments, the undoped core would guide the signal light and the cladding surrounding the undoped core would guide the pump light and substantially prevent absorption of pump light by the doped core when the fiber is held straight (e.g., when the fiber is not wrapped around a cooling drum, thus preventing overheating of the fiber in locations that are not providing cooling. Then, when the fiber is bent to a design radius (wrapped around a cooling cylinder) that increases the effective index of refraction on the outside of the bend radius (such as shown in FIG. 6C), the signal light and any pump light in the undoped core are automatically transferred to the doped core, and the pump light in the cladding surrounding the undoped core is automatically transferred to the cladding surrounding the doped core, and amplification occurs to absorption of pump light and stimulated amplification of the signal light. At an opposite end of the fiber, the fiber is again held in a straight configuration and light automatically transfers back to the undoped core. In some embodiments, an intermediate bend radius allows filtering of the signal light by allowing escape of amplified spontaneous emission (ASE) light that is not in the primary mode of the signal light. In some embodiments, a plurality of design-radius amplifying sections are alternated with one or more filtering sections having an intermediate bend radius (i.e., a radius between straight and the design radius). As used herein the "design radius" is the radius at which the signal mode is in a desired core generally located to the outside the other core(s) relative to a center of a bend radius equaling the design radius. In some embodiments having three or more cores (e.g., in some embodiments, cores that are in a plane of a circle of the bend radius, such that an inner core (the core that would be innermost when the fiber is bent to some radius) has a highest index of refraction (and thus guides the signal mode) when the fiber is straight, one or more middle cores successively have the highest index when the fiber is bent to a corresponding intermediate radius (two or more middle cores could use two or more corresponding bend radii), and an outer core has a highest index of refraction (and thus guides the signal mode) when the fiber is bent to its smallest bend radius.

For example, in a fiber having two cores, in some embodiments, the index of refraction is slanted (graded) on one side of the fiber (e.g., the right half in FIG. 6A), but relatively normal (i.e., a core having a higher index 612 than the index 611 of the surrounding cladding) on the opposite side (e.g., the left half in FIG. 6A). For example, one half of the fiber (the left half in FIG. 6A) would have one or more undoped cores having higher index 612, wherein the mode of the signal would be substantially centered in the left-hand core. In some embodiments, one or more second right-hand cores having a graded index 614 would be located within a right-hand cladding having a correspondingly graded index 613. In some embodiments, an outer cladding (with a lower index, not shown here, for example an index of 1.44, which is lower than any of the indices shown here, would guide all pump light to remain within the cladding 611 and 613 in this example). When such a fiber is held straight, any signal and/or pump light launched into the left-hand core having index 612 would be guided within the left-hand core, while pump light launched into the cladding having index 611 would stay in an inner cladding that is inside the outer cladding (not shown here), and the pump light would transfer into one of the cores (the core within the inner-cladding portion having the highest cladding index) along a length of the fiber. Any pump light that had launched or been transferred into the undoped core would stay in that core until the fiber started to bend, where upon it would automatically transfer to the doped core and be used to excite the lasing species to amplify the signal light. Any pump light that was launched into the right-hand cladding (the cladding whose index increases from right-to-left) and/or core (whose index also increases from right-to-left) would be transferred leftward into the left-hand cladding and/or core when the fiber is held straight. The pump and signal light would stay in the left-hand cladding and/or core as long as the fiber is held straight, and pump and signal light would automatically shift to the left-hand cladding and/or core when the fiber is bent to its design radius. The left-hand one-third of FIG. 6D, FIG. 6E, FIG. 6F, and FIG. 6G, show perspective views of the index of refraction of fiber 600 when in the straight configuration of FIG. 6A (which shows a 2D cross-section of the center portion of the index of refraction), wherein the mode 615 is in the left-hand core of fiber 600. When in the straight configuration, some embodiments guide substantially all of the signal mode in the left-hand core and substantially none of the signal mode in the right-hand core.

FIG. 6B is a graph 602 of an index-of-refraction profile (which shows a 2D length-wise cross section of the index of refraction values; where the middle one-third of FIG. 6D, FIG. 6E, FIG. 6F, and FIG. 6G, show 3D perspective views of the index of refraction of fiber 600 when in the 40-cm-bend-radius configuration of FIG. 6B) for a dual-core waveguide fiber 600 (shown in FIG. 6D), wherein this profile corresponds to a portion of fiber 600 bent to a bend radius of 40 cm. When fiber 600 is bent to a 40-cm radius, the previously flat cladding index 611 shown in FIG. 6A slants to the graded cladding index 621 of FIG. 6B, the previously flat core index 612 shown in FIG. 6A slants to the graded core index 622 of FIG. 6B, the previously graded cladding index 613 becomes the less-slanted graded cladding index 623, and the previously graded core index 614 becomes the less-slanted graded core index 624. In this 40-cm-bend-radius configuration, the signal mode shifts to the region having the highest index of refraction, this being the right-hand portion of the left-hand core and the left-hand portion of the right-hand core, and perhaps some in the cladding region between the two cores, as shown by mode 625 in the middle one-third graphs of FIG. 6D, FIG. 6E, FIG. 6F, and FIG. 6G. When in the 40-cm-bend-radius configuration, some embodiments guide substantially half of the signal mode in the left-hand core and substantially half of the signal mode in the right-hand core.

FIG. 6C is a graph 603 of an index-of-refraction profile (which shows a 2D length-wise cross section of the index of refraction values; where the right-hand one-third of FIG. 6D, FIG. 6E, FIG. 6F, and FIG. 6G, show 3D perspective views of the index of refraction of fiber 600 when in the 20-cm-bend-radius configuration of FIG. 6B) for a dual-core waveguide fiber 600 (shown in FIG. 6D), wherein this profile corresponds to a portion of fiber 600 bent to a bend radius of 20 cm. When fiber 600 is bent to the 20-cm design radius, the previously slightly-slanted-down-to-the-left cladding index 621 shown in FIG. 6B flattens to the substantially flat cladding index 631 of FIG. 6C, the previously slightly slanted-down-to-the-left core index 622 shown in FIG. 6B flattens to the substantially flat core index 632 of FIG. 6B, the previously slightly slanted-down-to-the-right graded cladding index 623 becomes the substantially flat cladding index 633, and the previously slightly slanted-down-to-the-right graded core index 624 becomes the substantially flat core index 634. In this 20-cm-bend-radius configuration, the signal mode shifts rightward to the region having the highest index of refraction, this being the right-hand core, and substantially none in the left-hand core or in the cladding regions around the two cores, as shown by mode 635 in the right-hand one-third graphs of FIG. 6D, FIG. 6E, FIG. 6F, and FIG. 6G. When in the 20-cm-bend-radius configuration, some embodiments guide substantially none of the signal mode in the undoped left-hand core and substantially all of the signal mode in the doped right-hand core. In this way, only when the fiber 600 is tightly wound to a 20-cm bend radius on its cooling-cylinder heat sink, are the signal and pump light in the right-half cladding and core. In some embodiments, two or three (or more) cooling cylinders are provided such that the fiber can alternate between a 20-cm bend-radius configuration around a 20-cm-radius heat-sink cylinder wherein the signal is being amplified and a 40-cm bend-radius configuration around a 40-cm-radius heat-sink cylinder wherein the signal is being filtered to remove ASE that may have been introduced in a prior amplifying section, and shown and described in the fiber-amplifier-filter block diagrams of FIG. 8A, FIG. 8B, FIG. 8C, and FIG. 8D, and in the plan views of the fiber in FIG. 9A, FIG. 9B, FIG. 9C, and FIG. 9D.

FIG. 6D is a 3-D side perspective-view graph 604 of the indices-of-refraction profiles and schematic mode profiles for a dual-core waveguide fiber 600 useful for filtering and/or mitigation of bending loss, wherein left-hand profile 601 corresponds to a straight portion of the fiber 600 (a cross-section of which is shown in two dimensions in FIG. 6A), middle profile 602 corresponds to a portion of fiber 600 bent to a bend radius of 40 cm (a cross-section of which is shown in two dimensions in FIG. 6B), and right-hand profile 603 corresponds to a portion of fiber 600 bent to a bend radius of 20 cm (a cross-section of which is shown in two dimensions in FIG. 6C). These depictions are of cross sections perpendicular to the direction of propagation. Note however that these figures are depictions of graphs of the index of refraction of a fiber 600, wherein higher index is upward in the graph, front-to-back is one dimension of the variation in index of refraction in a front-to-back direction across cross-section of fiber 600, and left-to-right is a perpendicular dimension of the variation in index of refraction in a left-to-right direction across a cross-section of fiber 600. Also shown is a depiction of the mode profile 615 for the straight section of fiber, mode profile 625 for the 40-cm-bend-radius section of fiber, and mode profile 635 for the 40-cm-bend-radius section of fiber, each exaggerated in the vertical direction.

FIG. 6E is a 3-D side-view graph 605 of the indices-of-refraction profiles and schematic mode profiles for dual-core waveguide fiber 600. These three graphs are just another perspective of the corresponding three graphs of FIG. 6D (i.e., they are the same graphs viewed from another direction).

FIG. 6F is a 3-D end-side-perspective-view graph 606 of the indices-of-refraction profiles and schematic mode profiles for dual-core waveguide fiber 600. These three graphs are just yet another perspective of the corresponding three graphs of FIG. 6D.

FIG. 6G is a 3-D end-view graph 607 of the indices-of-refraction profiles and schematic mode profiles for dual-core waveguide fiber 600. These three graphs are just yet another perspective of the corresponding three graphs of FIG. 6D.

FIG. 6H is a plan-view schematic of an exemplary fiber 600 having straight, radius=40-cm, radius=20-cm sections connected to one another.

Figure 7A:
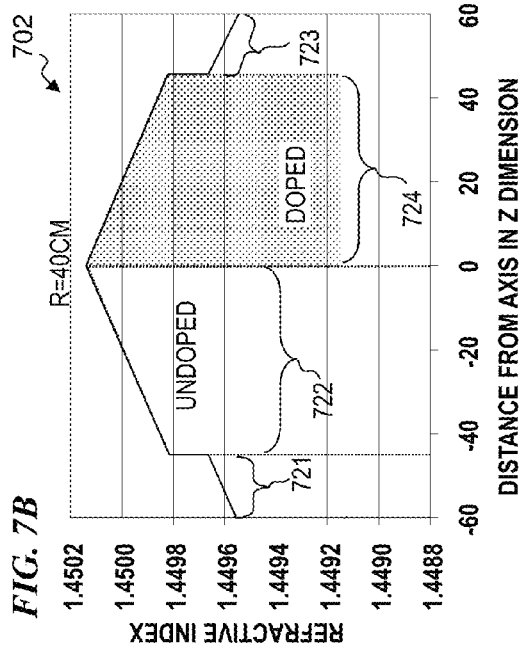
FIG. 7A is a lateral-cross-section graph 701 of an as-designed two-part single-core index-of-refraction profile for a partially undoped, partially doped single-core waveguide fiber 700 (shown in FIG. 7E) useful for filtering and/or mitigation of bending loss, wherein this profile corresponds to a cross-section of a straight portion of the fiber 700.
Figure 7B:
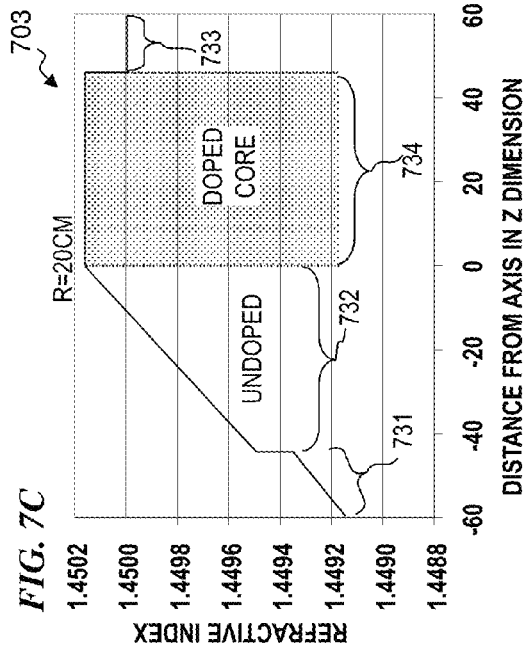
FIG. 7B is a lateral-cross-section graph 702 of an index-of-refraction profile for two-part single-core waveguide fiber 700 (shown in FIG. 7E), wherein this profile corresponds to a cross-section of a portion of fiber 700 bent to a bend radius of 40 cm.
Figure 7C:
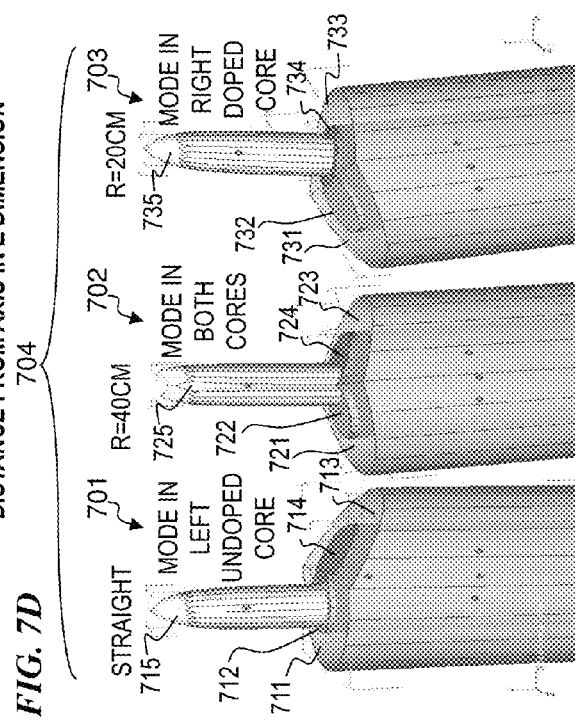
FIG. 7C is a lateral-cross-section graph 703 of an index-of-refraction profile for two-part single-core waveguide fiber 700 (shown in FIG. 7E), wherein this profile corresponds to a cross-section of a portion of fiber 700 bent to a bend radius of 20 cm.
Figure 7D:
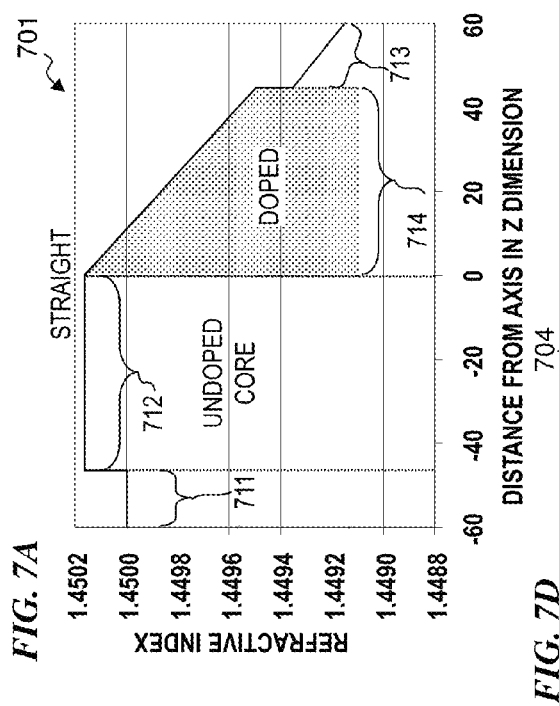
FIG. 7D is a 3-D side perspective-view graph 704 of the indices-of-refraction profiles and schematic mode profiles for a dual-core waveguide fiber 700 useful for filtering and/or mitigation of bending loss, wherein profile 701 corresponds to a straight portion of the fiber 700, profile 702 corresponds to a portion of fiber 700 bent to a bend radius of 40 cm, and profile 703 corresponds to a portion of fiber 700 bent to a bend radius of 20 cm.

FIG. 7A is a graph 701 of an as-designed two-part single-core index-of-refraction profile for a partially undoped, partially doped single-core waveguide fiber 700 (a 3-D side perspective-view diagram of the index profile 701 of FIG. 7A is shown as graph 701 in FIG. 7D) useful for filtering and/or mitigation of bending loss, wherein this profile corresponds to a straight portion of the fiber 700 (a plan-view of fiber 700, with straight section, radius=40 cm curve section, and radius=20-cm curve section, is shown in FIG. 7E). In some embodiments, fiber 700 is similar to fiber 600 described in FIG. 6A-FIG. 6G, except that the two cores overlap one another in the center. As shown in graphs 701 of FIG. 7A and FIG. 7D, the single-core index-of-refraction profile of graph 701 includes a first-side cladding having a higher flat index profile 711, an undoped core part having a flat index profile 712 that touches a doped core part having a slanted-down index profile 714, and a second-side cladding having a slanted-down index profile 713.

FIG. 7B is a graph 702 of an index-of-refraction profile for two-part single-core waveguide fiber 700 (a 3-D side perspective-view diagram of the index profile 702 of FIG. 7B is shown as graph 702 in FIG. 7D), wherein this profile corresponds to a portion of fiber 700 bent to a bend radius of 40 cm. As shown in graphs 702 of FIG. 7B and FIG. 7D, the single-core index-of-refraction profile of graph 702 includes a first-side cladding having a moderately slanted-up index profile 721, an undoped core part having a higher moderately slanted-up index profile 722 that touches a doped core part having a moderately slanted-down index profile 724, and a second-side cladding having a lower moderately slanted-down index profile 723.

FIG. 7C is a graph 703 of an index-of-refraction profile for two-part single-core waveguide fiber 700 (a 3-D side perspective-view diagram of the index profile 703 of FIG. 7C is shown as graph 703 in FIG. 7D), wherein this profile corresponds to a portion of fiber 700 bent to a bend radius of 20 cm. As shown in graphs 703 of FIG. 7C and FIG. 7D, the single-core index-of-refraction profile of graph 703 includes a first-side cladding having a slanted-up index profile 731, an undoped core part having a higher slanted-up index profile 732 that touches a doped core part having a flat index profile 734, and a second-side cladding having a lower flat index profile 733.

FIG. 7D is a 3-D side perspective-view graph 704 of the indices-of-refraction profiles and schematic mode profiles for a dual-core waveguide fiber 700 useful for filtering and/or mitigation of bending loss, wherein profile 701 corresponds to a straight portion of the fiber 700, profile 702 corresponds to a portion of fiber 700 bent to a bend radius of 40 cm, and profile 703 corresponds to a portion of fiber 700 bent to a bend radius of 20 cm. In some embodiments, signal mode 715 is located in the undoped core part in the straight portion of fiber 700 having flat index profile 712 of straight profile 701. In some embodiments, in the radius=40-cm curved portion, signal mode 725 is located partly in undoped core part having the moderately slanted-up core index profile 722 and partly in the doped core part having the moderately slanted-down index profile 724. In some embodiments, in the radius=20-cm curved portion, signal mode 735 is located in the doped core part having the flat index profile 734.

FIG. 8A is a block functional diagram 801 of a distributed-gain-filtering optical fiber 901 (see FIG. 9A) having medium-length filter segments. In some embodiments, input signal 98 enters fiber 901 at gain segment 811, which is followed consecutively by filter segment 812, gain segment 813, and filter segment 814. In some embodiments, fiber 901 further includes filter segment 816 and gain segment 817. In some embodiments, signal output 99 exits fiber 901 from gain segment 817.

FIG. 8B is a block functional diagram 802 of a distributed-gain-filtering optical fiber 902 (see FIG. 9B) having short-length filter segments. In some embodiments, fiber 902 includes gain segment 821, which is followed consecutively by filter segment 822, gain segment 823, and filter segment 824. In some embodiments, fiber 902 further includes filter segment 826 and gain segment 827. In some embodiments, signal output exits fiber 902 from gain segment 827.

FIG. 8C is a block functional diagram 803 of a distributed-gain-filtering optical fiber 903 (see FIG. 9C) having very-short-length filter segments. In some embodiments, fiber 903 includes gain segment 831, which is followed consecutively by filter 832, and gain segment 833. In some embodiments, fiber 903 further includes filter 836 and gain segment 837. In some embodiments, signal output exits fiber 903 from gain segment 837.

FIG. 8D is a block functional diagram 804 of a distributed-gain-filtering optical fiber 904 (see FIG. 9D) having long-length filter segments. In some embodiments, fiber 904 includes gain segment 841, filter segment 842, filter segment 846, and gain segment 847. In some embodiments, signal output exits fiber 904 from gain segment 847.

Figure 9B:
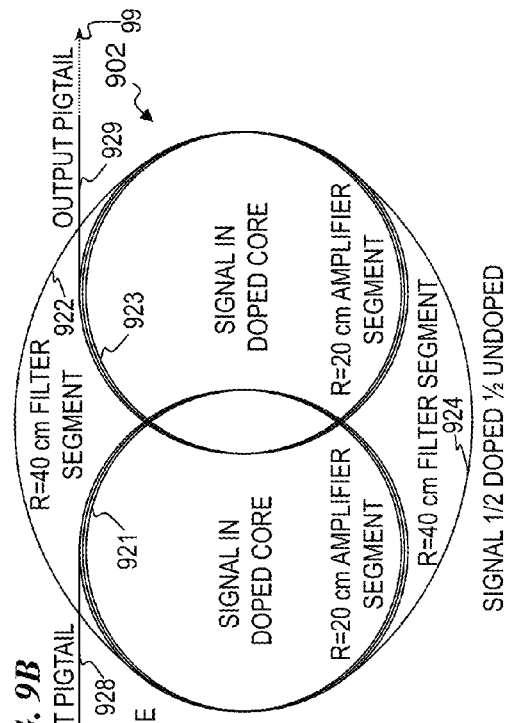
FIG. 9B is a plan-view diagram of a distributed-gain-filtering optical fiber 902 having short-length filter segments.
Figure 9D:
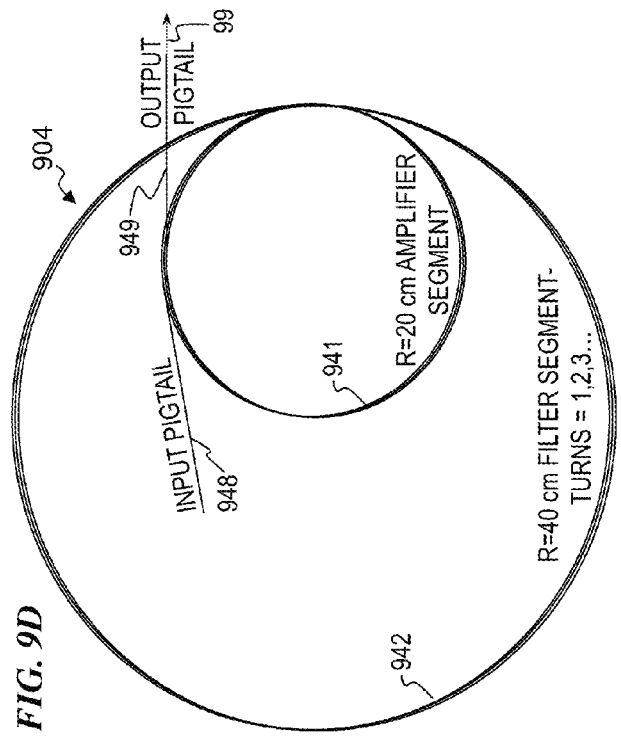
FIG. 9D is a plan-view diagram of a distributed-gain-filtering optical fiber 904 having long-length filter segments.
Figure 9A:
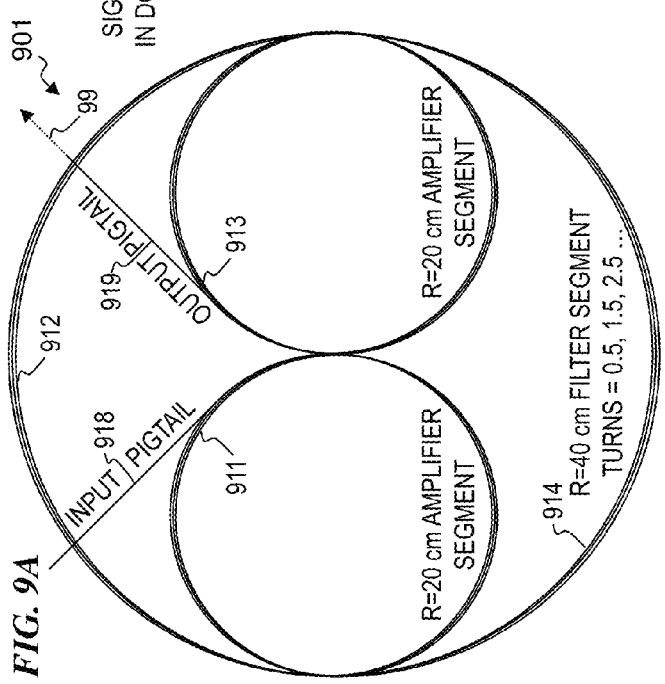
FIG. 9A is a plan-view diagram of a distributed-gain-filtering optical fiber 901 having medium-length filter segments.

FIG. 9A is a plan-view diagram of a distributed-gain-filtering optical fiber 901 having medium-length filter segments, which corresponds to the block diagram of FIG. 8A. In some embodiments, a plurality of gain sections 911 and 913 (which are each formed by bending the fiber 901 to a 20-cm bend radius, to force the signal light to the outer core that has been doped with a rare-earth gain dopant, and which thus amplifies the signal light) are alternated with a plurality of medium-length filter sections 912 and 914 (which are each formed by bending the fiber 901 to a 40-cm bend radius, in order to allow higher-order-mode amplified-spontaneous-emission (ASE) light to disperse from the core region). In some embodiments, input pigtail 918 connects to a gain section 911 and output light 99 exits output pigtail 919 that is connected to a gain section 913.

FIG. 9B is a plan-view diagram of a distributed-gain-filtering optical fiber 902 having short-length filter segments. In some embodiments, a plurality of gain sections 921 and 923 (which are each formed by bending the fiber 902 to a 20-cm bend radius, to force the signal light to the outer core that has been doped with a rare-earth gain dopant, and which thus amplifies the signal light) are alternated with a plurality of short-length filter sections 922 and 924 (which are each formed by bending the fiber 902 to a 40-cm bend radius, in order to allow higher-order-mode amplified-spontaneous-emission (ASE) light to disperse from the core region). In some embodiments, input pigtail 928 connects to a gain section 921 and output light 99 exits output pigtail 929 that is connected to a gain section 923.

Figure 9C:
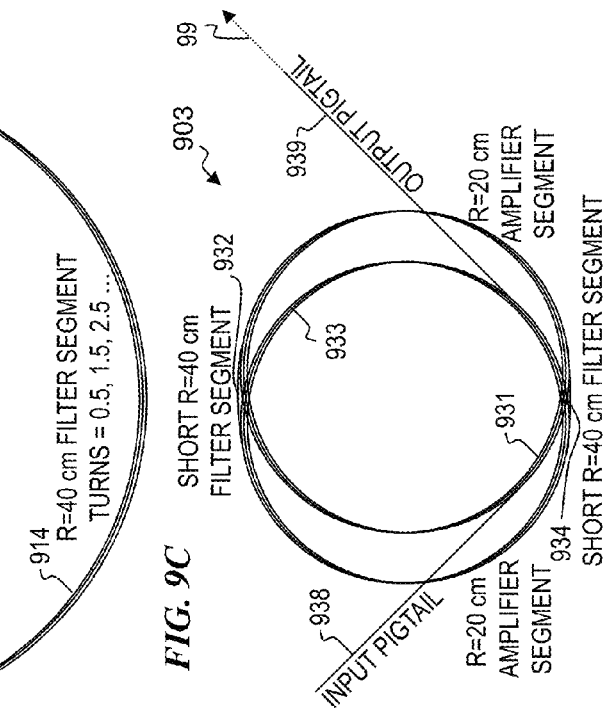
FIG. 9C is a plan-view diagram of a distributed-gain-filtering optical fiber 903 having very-short-length filter segments.

FIG. 9C is a plan-view diagram of a distributed-gain-filtering optical fiber 903 having very-short-length filter segments. In some embodiments, a plurality of gain sections 931 and 933 (which are each formed by bending the fiber 903 to a 20-cm bend radius, to force the signal light to the outer core that has been doped with a rare-earth gain dopant, and which thus amplifies the signal light) are alternated with a plurality of very-short-length filter sections 932 and 934 (which are each formed by bending the fiber 903 to a 40-cm bend radius, in order to allow higher-order-mode amplified-spontaneous-emission (ASE) light to disperse from the core region). In some embodiments, input pigtail 938 connects to a gain section 931 and output light 99 exits output pigtail 939 that is connected to a gain section 933.

FIG. 9D is a plan-view diagram of a distributed-gain-filtering optical fiber 904 having long-length filter segments. In some embodiments, a plurality of gain sections 941 (which are each formed by bending the fiber 904 to a 20-cm bend radius, to force the signal light to the outer core that has been doped with a rare-earth gain dopant, and which thus amplifies the signal light) are alternated with a plurality of relatively long-length filter sections 942 (which are each formed by bending the fiber 904 to a 40-cm bend radius, in order to allow higher-order-mode amplified-spontaneous-emission (ASE) light to disperse from the core region). In some embodiments, input pigtail 948 connects to a gain section 941 and output light 99 exits output pigtail 949 that is connected to another gain section 941.

In some embodiments, a sloped-profile fiber is fabricated with a plurality of cores having a plurality of purposes, such as one or more cores that are optimized for launching signal and/or pump light into the cores (e.g., similar to the undoped core 612 of FIG. 6A), one or more cores having one or more species of rare-earth doping for absorbing pump light and/or amplifying signal light, and/or one or more cores designed for filtering the signal mode (e.g., to reduce higher-order modes or ASE light).

Figure 10A:
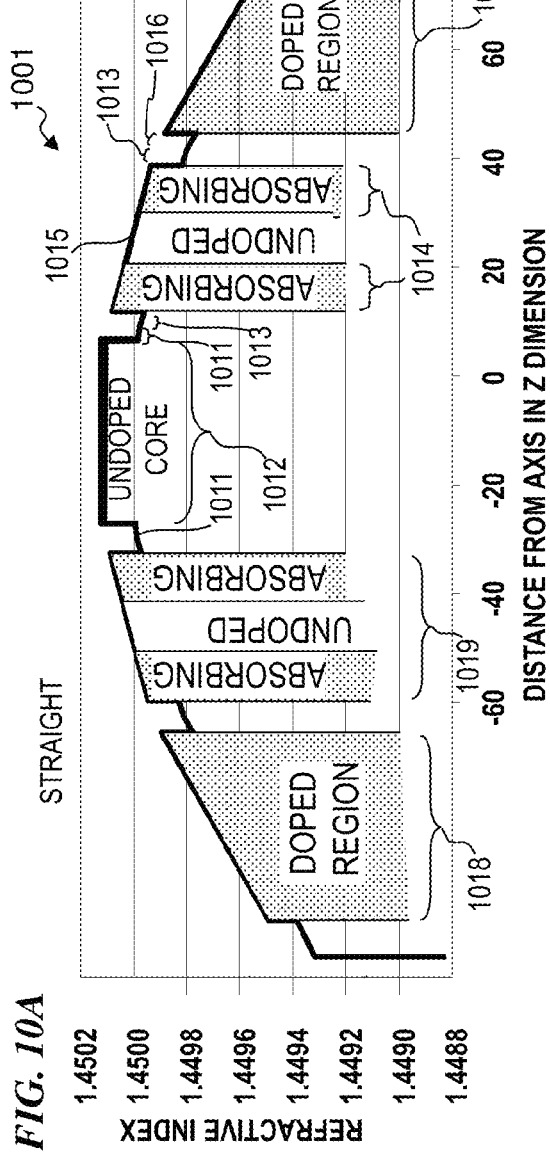
FIG. 10A is a lateral-cross-section graph 1001 of an as-designed dual-core index-of-refraction profile for a dual-core waveguide fiber 1000 (shown in FIG. 10D) useful for filtering and/or mitigation of bending loss, wherein this profile corresponds to a cross-section of a straight portion of the fiber 1000.

FIG. 10A is a lateral-cross-section graph 1001 of an as-designed dual-core index-of-refraction profile for a dual-core waveguide fiber 1000 (shown in FIG. 10D) useful for launching, amplifying, filtering and/or mitigation of bending loss, wherein this profile corresponds to a cross-section of a straight portion of the fiber 1000. In some embodiments, fiber 1000 includes a plurality of cores (in this embodiment example, five core regions are provided), wherein when fiber 1000 is straight, the signal light can be launched and guided in undoped center core 1012 within center cladding 1011. On either side of center core 1012 are an undoped region 1015 surrounded by absorbing regions 1014 within sloped-index cladding 1013, and a similar structure 1019 on the opposite side. Since the index of refraction of these side regions is sloped upward towards the middle, light in these regions will tend move to the center region, such that the signal light is guided only in the center core. Further to the outside on both sides are doped regions 1017 and 1018, each in a respective cladding 1016. Only when fiber 1000 is bent to one or another of the designed bend radii will the signal slight be shifted to a filtering core (on one or the other adjacent sides of the center core) at a first bend radius (e.g., plus or minus 30 cm), or to an amplifying core (on one or the other far sides of the center core) at a second bend radius (e.g., plus or minus 15 cm, in some embodiments). In some embodiments, pump light is launched into one or more of the cladding regions. In some embodiments, pump light is launched into one or more of the core regions. See FIGS. 10E, 10F, 10G, and 10H for other depictions of this same index and doping profile 1001 for straight sections of fiber 1000.

Note that the same fiber 1000 is used and configured to each of the different cross-section profiles and different core configurations of FIGS. 10A, 10B, and 10C, and 10E, 10F, 10G, and 10H, simply by straightening or bending to different bend radii. Thus the light is guided to one of the plurality of cores simply by winding the fiber onto different-radius cylinders, and each core can have a different guiding, filtering, and amplifying characteristics, different doping concentrations, and different numerical apertures (or other variations). Further, the cladding surrounding each core can be configured for different pump-light guiding properties such that the pump light can be guided into an amplifying core further down the fiber if desired.

Figure 10B:
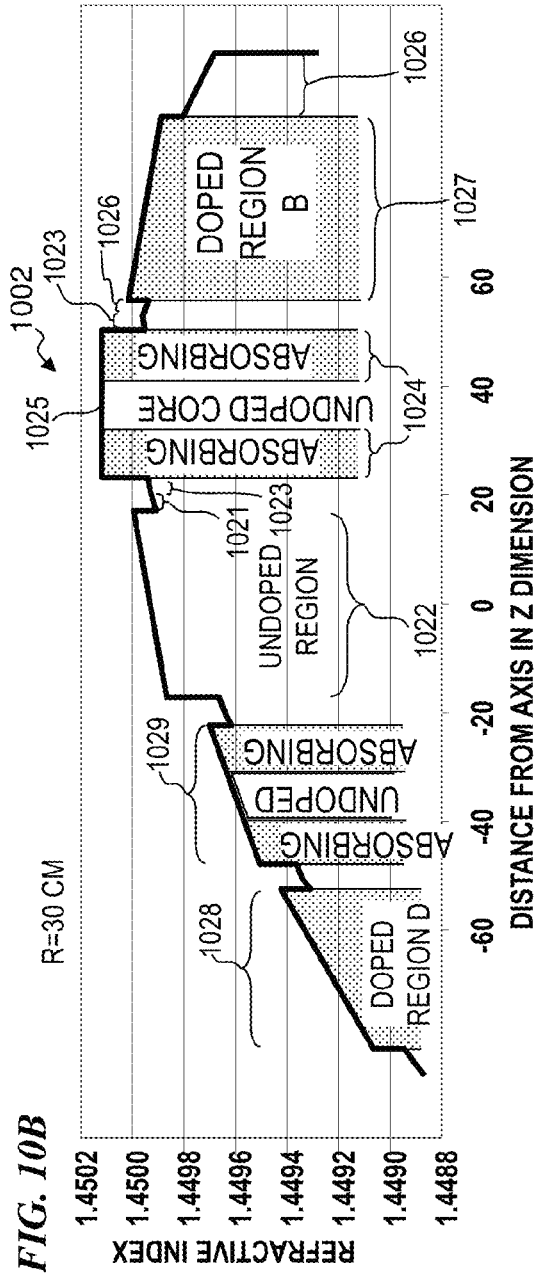
FIG. 10B is a lateral-cross-section graph 1002 of an index-of-refraction profile for a dual-core waveguide fiber 1000 (shown in FIG. 10D), wherein this profile corresponds to a cross-section of a portion of fiber 1000 bent to a bend radius of 30 cm.

FIG. 10B is a lateral-cross-section graph 1002 of an index-of-refraction profile for a dual-core waveguide fiber 1000 (shown in FIG. 10D), wherein this profile corresponds to a cross-section of a portion of fiber 1000 bent to a bend radius of 30 cm. When bent to this radius, undoped core 1012 of FIG. 10A becomes slanted undoped region 1022 in FIG. 10B, while side regions 1014 and 1015 of FIG. 10A become the guiding core in FIG. 10B. In some embodiments, a signal-absorbing region is to the outside of an undoped core 1025 and its absorbing regions 1025 (also having their index raised by the bend) which have the highest index when fiber 1000 is slightly bent (e.g., to a bend radius of 30 cm) such that the sloped index of the straight fiber is tilted by the bend to raise the relative index of the fiber to the outside of the bend and lower the relative index of the fiber to the inside of the bend. Note that the index of the entire fiber is tilted relative to the index 1001 of the straight fiber shown in FIG. 10A. This allows the particular bend radius to guide the signal light in the selected core and not in any of the other cores. Note also that the opposite bend radius would move the signal light to the filtering core 1029 on the opposite side of center undoped core 1022.

Figure 10C:
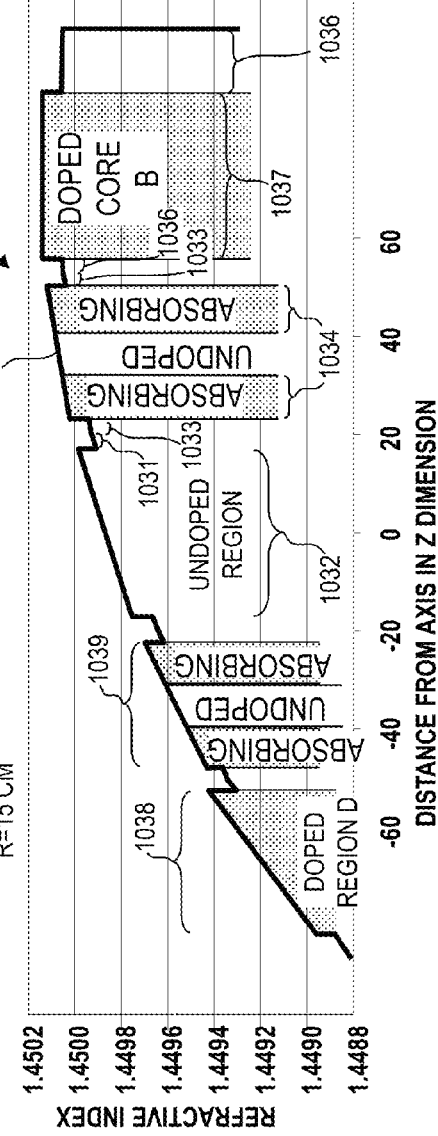
FIG. 10C is a lateral-cross-section graph 1003 of an index-of-refraction profile for a dual-core waveguide fiber 1000 (shown in FIG. 10D), wherein this profile corresponds to a portion of fiber 1000 bent to a bend radius of 15 cm.

FIG. 10C is a lateral-cross-section graph 1003 of an index-of-refraction profile for a dual-core waveguide fiber 1000 (shown in FIG. 10D), wherein this profile corresponds to a portion of fiber 1000 bent to a bend radius of 15 cm. When bent to this radius, the index tilts further such that undoped core 1012 of FIG. 10A becomes slanted undoped region 1032 in FIG. 10C, while doped side region 1017 of FIG. 10A becomes the guiding amplifying core 1037 in FIG. 10C. In some embodiments, a signal-amplifying core 1037 is to the far outside of in-between undoped region 1035 and its absorbing regions 1034 (also having their index tilted further by the sharper bend) such that core 1037 has the highest index when fiber 1000 is further bent (e.g., to a bend radius of 15 cm) such that the sloped index of the straight fiber is tilted by the bend to raise the relative index of the fiber to the outside of the bend and lower the relative index of the fiber to the inside of the bend. Note that the index of the entire fiber cross section here is tilted relative to the index 1001 of the straight fiber shown in FIG. 10A. This allows the particular bend radius to guide the signal light in the selected outermost core 1037 and not in any of the other core regions. Note also that the opposite bend radius would move the signal light to the amplifying core 1018/1038 on the opposite side of center undoped core 1012/1032. In this discussion, the core region having the highest effective index is generally called the guiding core for the signal light, and the other core regions (each having a lower effective index of refraction) are generally called regions rather than cores since signal light will shift toward the highest-index "core."

Figure 10D:
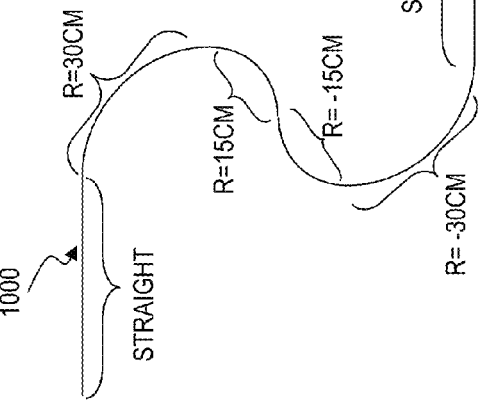
FIG. 10D is a plan-view diagram of a dual-core waveguide fiber 1000 useful for filtering and/or mitigation of bending loss, wherein profile 1001 corresponds to a straight portion of the fiber 1000, profile 1002 corresponds to a portion of fiber 1000 bent to a bend radius of 30 cm, and profile 1003 corresponds to a portion of fiber 1000 bent to a bend radius of 15 cm. Also shown are sections in which the bend radius is the opposite direction, denoted as minus 15 cm when doped region 1018 becomes the outermost core (relative to the center of the bend radius of the coiled fiber 1000), and minus 30 cm when the intermediate core 1019 becomes the guiding core (in some embodiments, a core having absorbing region at the periphery of the core and an undoped center portion of the core as described in U.S. Pat. No. 7,400,807 on Jul. 15, 2008, which is incorporated herein by reference in its entirety.

FIG. 10D is a plan-view diagram of a dual-core waveguide fiber 1000 useful for filtering and/or mitigation of bending loss, wherein profile 1001 corresponds to a straight portion of the fiber 1000, profile 1002 corresponds to a portion of fiber 1000 bent to a bend radius of 30 cm, and profile 1003 corresponds to a portion of fiber 1000 bent to a bend radius of 15 cm. Also shown are sections in which the bend radius is the opposite direction, denoted as −15 cm when doped region 1018 becomes the outermost core, and −30 cm when the core having absorbing region and undoped center 1019 becomes the guiding core.

Figure 10F:
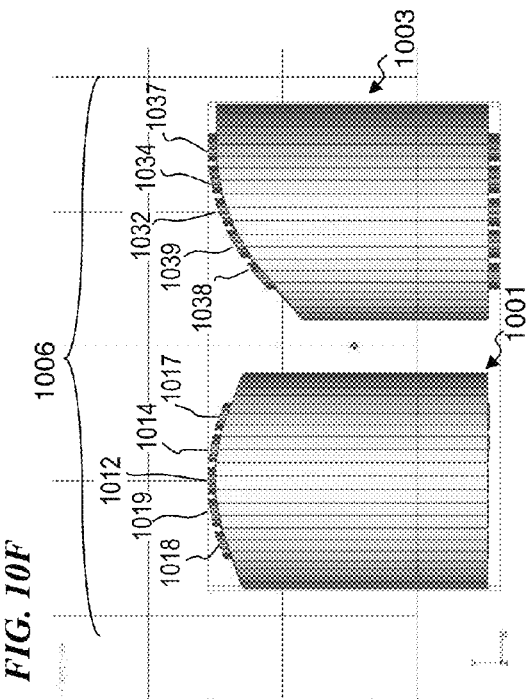
FIG. 10F is a 3-D end-side-perspective-view graph 1006 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm.
Figure 10H:
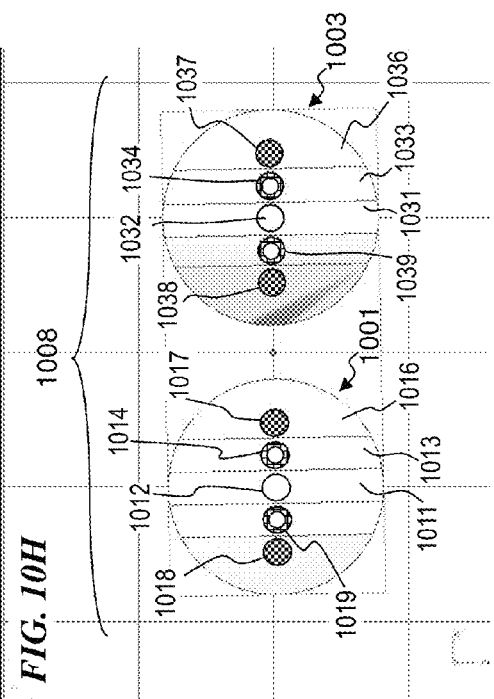
FIG. 10H is a 3-D end-view graph 1008 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm.
Figure 10E:
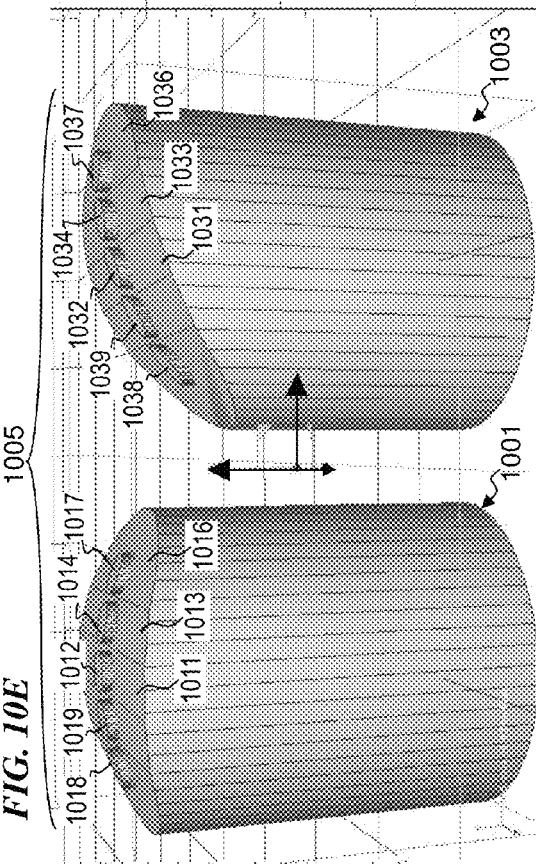
FIG. 10E is a 3-D side-view perspective-view graph 1005 of the indices-of-refraction profiles and schematic mode profiles for dual-core waveguide fiber 1000 useful for launching, amplifying, filtering and/or mitigation of bending loss in the signal light, wherein profile 1001 corresponds to a straight portion of the fiber 1000, and profile 1003 corresponds to a portion of fiber 1000 bent to a bend radius of 15 cm.

FIG. 10E is a 3-D side-view perspective-view graph 1005 of the indices-of-refraction profiles and schematic mode profiles for dual-core waveguide fiber 1000 useful for launching, amplifying, filtering and/or mitigation of bending loss in the signal light, wherein profile 1001 corresponds to a straight portion of the fiber 1000, and profile 1003 corresponds to a portion of fiber 1000 bent to a bend radius of 15 cm. The 3-D side-view perspective-view graph 1001 corresponds to the cross section of FIG. 10A, while the 3-D side-view perspective-view graph 1003 corresponds to the cross section of FIG. 10C.

FIG. 10F is a 3-D end-side-perspective-view graph 1006 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm. The 3-D end-side-perspective-view graph 1001 corresponds to the cross section of FIG. 10A, while the 3-D end-side-perspective-view graph 1003 corresponds to the cross section of FIG. 10C.

Figure 10G:
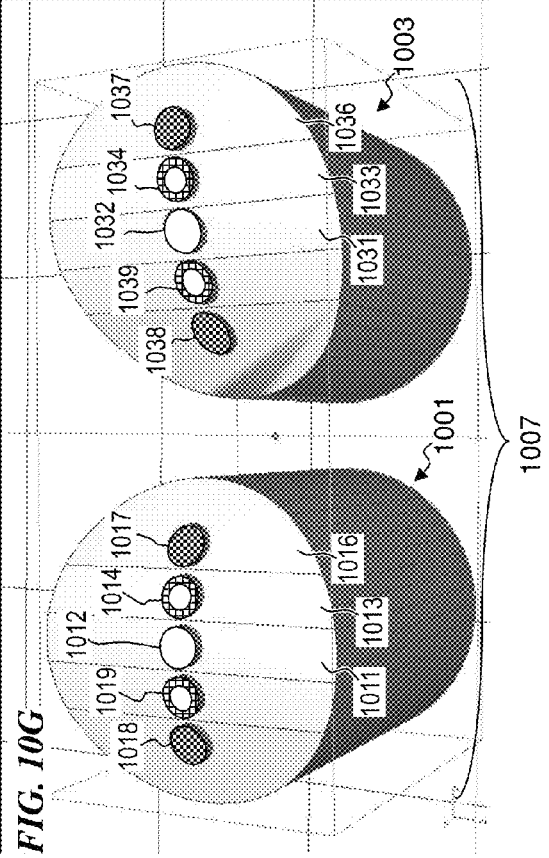
FIG. 10G is a 3-D end-view graph 1007 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm.

FIG. 10G is a 3-D end-view graph 1007 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm.

FIG. 10H is a 3-D end-view graph 1008 of the indices-of-refraction profiles and schematic mode profiles for dual-core waveguide fiber 1000 useful for filtering and/or mitigation of bending loss, wherein profile 1001 corresponds to a straight portion of the fiber 1000, and profile 1003 corresponds to a portion of fiber 1000 bent to a bend radius of 15 cm. Note that in other embodiments, further core regions can be provided to the upper and lower sides of center core 1015 of graph 1001, and that the slope of the cladding indices and cores indices can vary in two directions (up-to-down as well as left-to-right), rather than varying only in the single left-to-right direction depicted in FIG. 10A-10H. Thus, different directions of bends can be used to select one of a great many cores to different sides of the center core using different bend directions and/or different bend radii.

Figure 11:
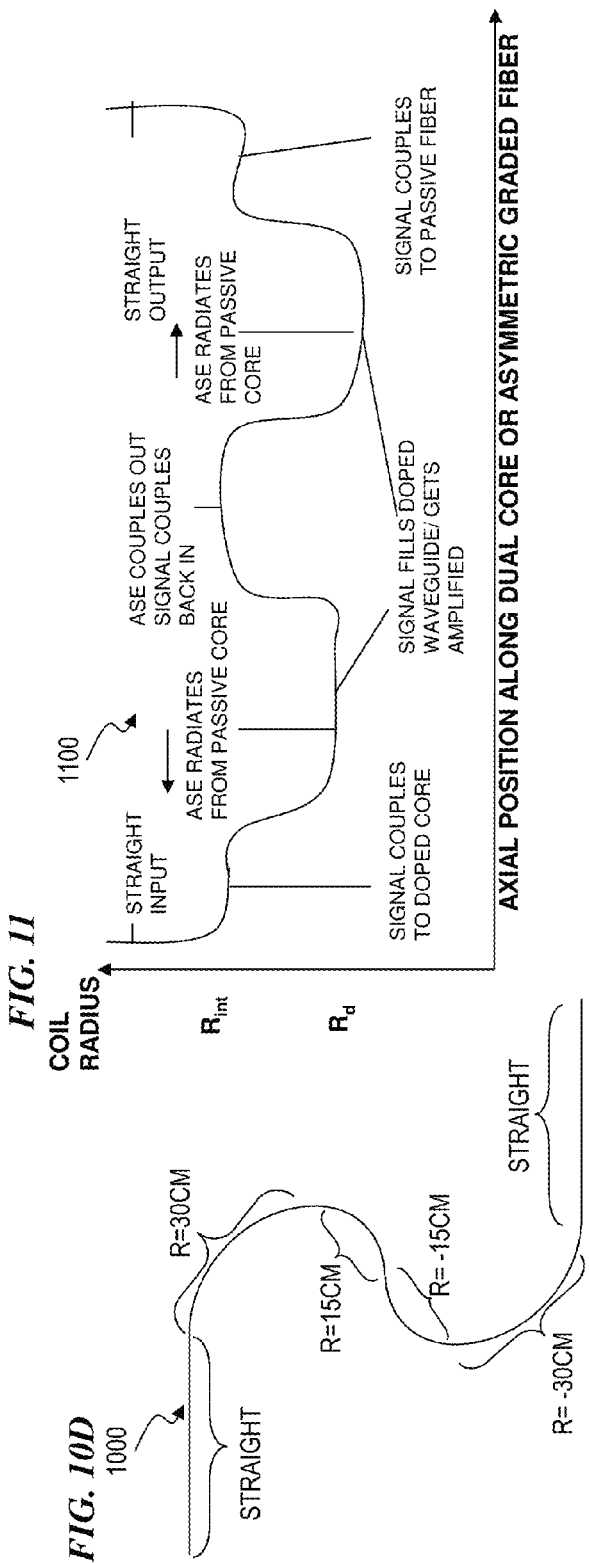
FIG. 11 is a plan-view diagram of a plurality-of-cores waveguide fiber 1100 useful for filtering and/or mitigation of bending loss, wherein this deployment concept introduces ASE filtering to the dual core or asymmetric graded fibers described above.

FIG. 11 is a plan-view diagram of a plurality-of-cores waveguide fiber 1100 useful for filtering and/or mitigation of bending loss, wherein this deployment concept introduces ASE filtering to the dual core or asymmetric graded fibers described above. The coil radius increases upward in the figure, wherein an intermediate radius $R_{int}$ is used for filtering, and a design radius $R_d$ is used for amplifying. At the design radius, ASE light will radiate from the undoped core (which guides signal light when the fiber is straight), and the signal light will be amplified in the other core. At the intermediate radius, the signal couples one or the other direction between the undoped core and the doped core.

Figure 12C:
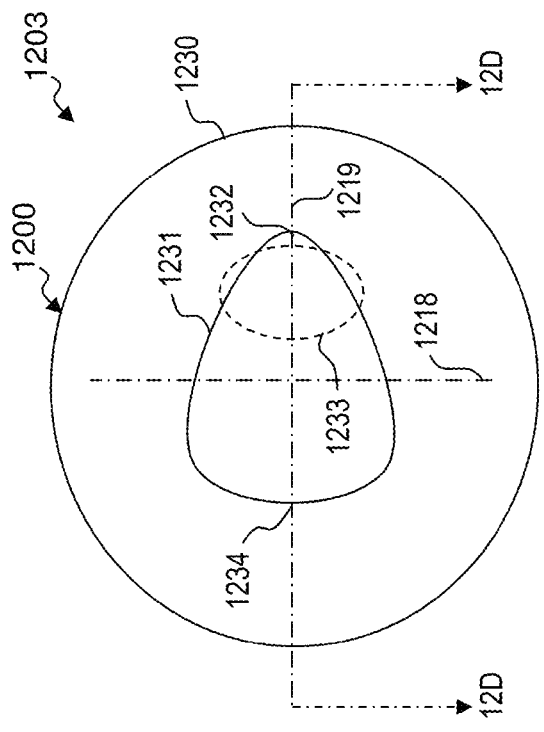
FIG. 12C is a transverse cross-section-view index-of-refraction diagram 1203 of a curved section of the asymmetric-core fiber 1200 of FIG. 12A.
Figure 12D:
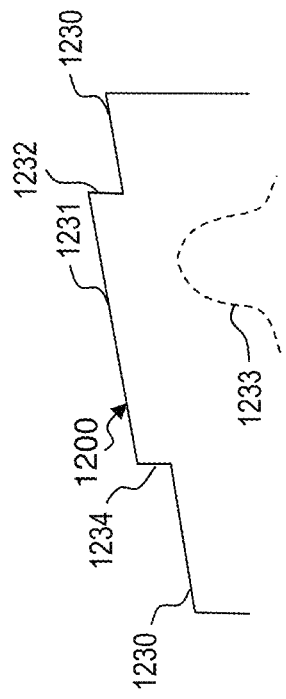
FIG. 12D is a longitudinal cross-section-view index-of-refraction diagram 1204 of the curved section of the asymmetric-core fiber 1200 of FIG. 12A.
Figure 12A:
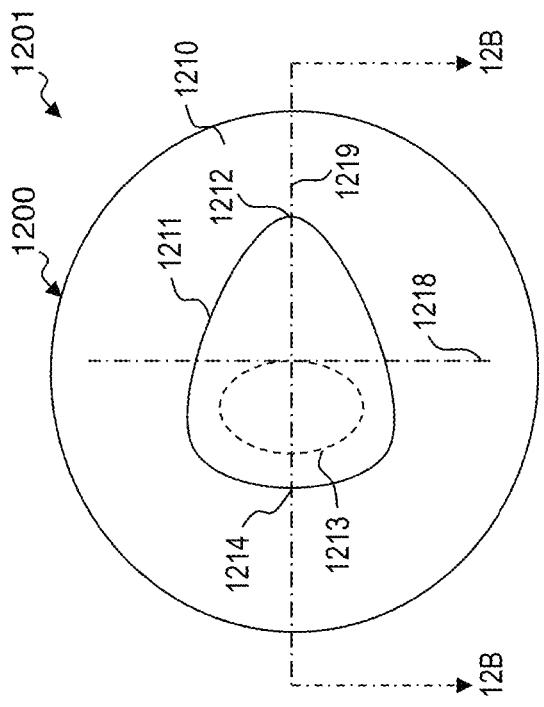
FIG. 12A is a transverse cross-section-view index-of-refraction diagram 1201 of a straight section of an asymmetric-core fiber 1200 useful for filtering and/or mitigation of bending loss, wherein deployment in a straight and curved configuration introduces amplification and/or ASE filtering to signal light propagating in the core.

FIG. 12A is a transverse cross-section-view index-of-refraction diagram 1201 of a straight section of an asymmetric-core fiber 1200 useful for filtering and/or mitigation of bending loss, wherein deployment in a straight and curved configuration introduces amplification and/or ASE filtering to signal light propagating in the core. In some embodiments, core region 1211 (surrounded by cladding region 1210) is asymmetric relative to reflection about diameter direction 1218 (i.e., the portion to the left of line 1218 is not a mirror reflection of the portion to the right of line 1218), and is symmetric relative to reflection about the perpendicular diameter direction 1219 (i.e., the portion to above line 1219 is a mirror reflection of the portion below line 1219). When fiber 1200 is straight, the single or primary mode 1213 is situated toward the left, flatter, broader portion 1214 of core 1211, and not toward the narrower portion 1212. The left-right extension of diameter line 1219 shows this is the section line for the longitudinal index profile of FIG. 12B. Note that the upward direction in FIG. 12A shows one dimension across fiber 1200, while the left-right direction is a perpendicular width dimension of the cladding of the fiber 1200.

Figure 12B:
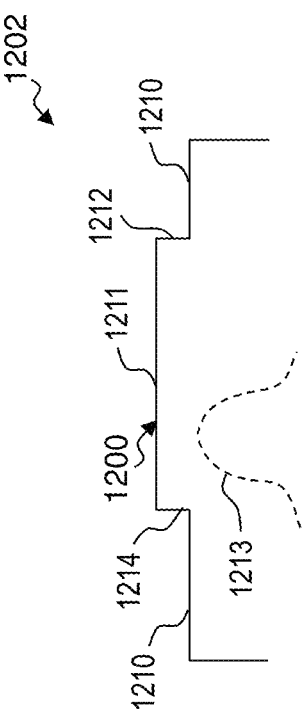
FIG. 12B is a longitudinal cross-section-view index-of-refraction diagram 1202 of the straight section of the asymmetric-core fiber 1200 of FIG. 12A.

FIG. 12B is a longitudinal cross-section-view index-of-refraction diagram 1202 of the straight section of the asymmetric-core fiber 1200 of FIG. 12A. This shows that when fiber 1200 is straight, the index profile is substantially constant across the area of core 1211 and the index profile is substantially constant at a slightly lower index of refraction across the area of cladding 1210. Note that the upward direction in FIG. 12B shows increased index of refraction for the index and increased intensity for the core mode, while the left-right direction is a width of the cladding of the fiber 1200.

FIG. 12C is a transverse cross-section-view index-of-refraction diagram 1203 of a curved section of the asymmetric-core fiber 1200 of FIG. 12A. When fiber 1200 is curved to a designed bend radius (e.g., a radius of 10 cm or less to 50 cm or more), the index is raised to the outside of the curved bend radius and lowered to the inside of the bend radius. The mode shifts to position 1233 toward the small end 1232 of core 1231 (note that this is the same core as 1211 of FIG. 12A, but the index is now slanted upward to the outside of the curve). Index 1234 represents the large end of the ovoid core 1231.

FIG. 12D is a longitudinal cross-section-view index-of-refraction diagram 1204 of the curved section of the asymmetric-core fiber 1200 of FIG. 12A. This shows the slanted index of the cladding 1230 and core 1231. Note that the upward direction in FIG. 12D shows increased index of refraction for the index and increased intensity for the core mode, while the left-right direction is a width of the cladding of the fiber 1200.

Note relative to FIG. 6A: if the input field matches the waveguide 612 on the left of the fiber axis when launched into a straight section (exhibiting profile 601 in FIG. 6A) and further along the fiber 600 is coiled to 40 cm then the effective profile 602 (shown in FIG. 6B) becomes symmetric and power would flow to the right. Further coiling to 20 cm results in the effective profile 603 (shown in FIG. 6C), which traps the coupled signal power in the waveguide 634 on the right in FIG. 6C. In some embodiments, a similar reverse transition is used on the output.

While the FIG. 6A shows two distinguishable waveguides it should be clear that a composite asymmetric waveguide such as shown in FIG. 7A is viable in other embodiments.

Removing the central dip would have little effect. An offset launch to the left of the composite waveguide would transition to the right as the fiber moved into the bend. Of course the rare earth doping would need to be on the right (toward the outside of bend).

Thus, in some embodiments, the present invention provides an asymmetric waveguide with generally higher refractive index undoped waveguide or waveguide portion as fabricated on a side that becomes the inside of the bend when the fiber is coiled and a generally slanted lower index fabricated on a second side of the fiber that becomes the outside of a bend with rare-earth doping on the second side waveguide such that power flows from undoped inside waveguide to amplifying outside waveguide as the fiber transitions from straight to a design bend radius. In some embodiments, the present invention provides a twin-core fiber in which a waveguide on the inside of an intended bend supports a large mode area when straight, an amplifying waveguide on the outside of the bend which supports a similar large mode area when coiled to a design bend radius and at some intermediate bend radius the two waveguides are resonant. In some embodiments, the present invention provides an optical-fiber amplifier containing the fibers of these two embodiments with an input and output mode confined predominantly to the waveguide or part of waveguide on the inside of the bend, a transition region where power couples progressively to the outside an amplifier section where the power is confined to the outside and an output transition where power couples back to the inside.

While in our first-described single-waveguide designs, where our goal was to effectively generate a symmetric step index at the bend diameter, our other fiber designs have lower index on the outside to compensate for index changes due to bend radius curving of the fiber. In the coupled waveguide concepts discussed here, the same line of reasoning was followed and the designs arranged for the mode to move into the bend and locate in the doped waveguide on the outside of the bend. In some embodiments, of the twin-core or asymmetric doping/asymmetric profile cases the present invention designs the reverse such that the input waveguide is on the outside and the bend mitigated waveguide on the inside of the bend. This may be easier to engineer in practice since rare-earth doping generally raises the index.

Note that in some embodiments, the width and depth of the central dip are such that tunneling from low-index to high index is minimal.

Extension of this Technique to Provide ASE Filtering.

In some scenarios above, a dual-core or asymmetric graded structure is described that guides in one or the other of the two cores when either straight or coiled to a design radius. At an intermediate radius the waveguides are essentially identical and therefore cross-coupling can occur. By periodically transitioning between the design bend radius and the intermediate radius for coupling it is possible to introduce some wavelength and/or mode filtering.

For example, in an Yb doped amplifier if the coupling region length is such that 1030 nm (or 1120 nm depending on the amplifier inversion) couples out of the doped core to the passive fiber and 1080 nm is coupled back to the gain fiber then effective ASE filtering can be achieved. The filtering can be repeated several times if necessary because the passive core does not guide at the design radius for gain. This is important because ASE coupled out at one coupler would otherwise couple back into the doped core at the next one.

In some embodiments, a deployment scenario for filtering is shown in FIG. 11.

Thus, in some embodiments, the present invention provides an optical amplifier using one of the above-described fibers is used in which the amplification is partitioned into one or more stages (as described for FIGS. 8A-8D and 9A-9D by partially uncoiling from the design radius to the intermediate coupling radius and controlling the length of said coupling region such that the peak ASE wavelength couples out and the signal wavelength couples back into the gain fiber.

Some embodiment provide a multicore fiber amplifier in which the individual cores have index profiles designed so that they are resonant (i.e., the signal mode is guided partially in both waveguides) when the fiber is coiled to an intermediate design diameter.

In some embodiments, the present invention provides a first method that includes forming a waveguide amplifier having a gain section that includes a coiled waveguide, the forming of the waveguide amplifier including forming an asymmetry in a refractive-index profile across the waveguide.

In some embodiments of the first method, the forming of the asymmetry includes micro-structuring a solid-glass refractive-index profile.

In some embodiments of the method, the forming of the asymmetry includes introducing an asymmetric pattern of holes, wherein at least one of a dimension of the holes and a spacing of the holes is varied based on a radial direction from a central axis of the waveguide.

In some embodiments of the first method, the forming of the asymmetry includes introducing a combination of air holes and solid-glass micro-structuring.

In some embodiments of the first method, the forming of the waveguide amplifier includes forming an optical fiber having a straight fiber section and a coiled fiber section, and wherein coiling of the coiled section results in a reduction in the asymmetry of the coiled fiber section with respect to the straight fiber section.

In some embodiments of the first method, the forming of the asymmetry includes forming an effective area of the waveguide amplifier in the coiled fiber section of the asymmetric-index-profile fiber that provides improved light guidance relative to an equivalent symmetric-index-profile fiber deployed with an equal bend radius.

In some embodiments of the first method, the forming of the asymmetry includes forming a lowest-order mode bend-loss of the waveguide amplifier in the coiled fiber section that provides improved light guidance relative to the equivalent symmetric fiber deployed with the same bend radius.

In some embodiments of the first method, a coupling of light from a lowest-order mode of the bent asymmetric fiber to one or more higher-order modes is lower than would occur for an otherwise equivalent symmetric fiber deployed with the same bend radius.

In some embodiments of the first method, the forming of the asymmetry results in a bent asymmetric fiber that propagates substantially only a single mode in the bend.

In some embodiments of the first method, the forming of the bent asymmetric fiber results in a fiber that is multimode in the bend under single-mode excitation.

In some embodiments of the first method, the forming of the bent asymmetric fiber results in a fiber that is multimode in the bend but with an increased differential bend-loss for higher-order modes as compared to lower-order modes when bent beyond a design radius.

In some embodiments of the first method, the forming of the bent asymmetric fiber results in a fiber that exhibits single-polarization propagation in the bend when bent at or beyond a design radius.

In some embodiments of the first method, the forming creates form asymmetry in a cell structure of the fiber that smoothes out an effective index profile resulting from a step-tapered index profile.

In other embodiments, the present invention provides a second method that includes forming a waveguide amplifier containing a coiled fiber gain section having a core, the fiber having a first diameter in a radial direction relative to a center of the coiled fiber gain section (the first diameter is from a side of the fiber that becomes an inner diameter of the coil to an opposite side of the fiber that becomes an outer diameter of the coil), and a second diameter in a direction perpendicular to the first diameter, the forming including fabricating the core to have a cross-section shape that is substantially symmetric relative to the first diameter and asymmetric relative to the second diameter.

In some embodiments of the second method, the fabricating of the core includes fabricating a dimension of the core to be smaller toward a side of the fiber that becomes an outside of the coiled gain section.

In some embodiments of the second method, the fabricating of the core includes fabricating the core to be micro-structured.

In some embodiments of the second method, the fabricating of the core includes using modified chemical vapor deposition (MCVD), and introducing the asymmetry by pre-shaping a substrate tube used to generate a preform that is used to draw the fiber.

In some embodiments of the second method, the fabricating of the core includes introducing the asymmetry by softening and squashing a preform used to draw the fiber.

In some embodiments of the second method, the fabricating of the core includes making a refractive index of the core uniform.

In some embodiments of the second method, the fabricating of the core includes making the core such that its refractive index is graded.

In other embodiments, the present invention provides a third method that includes forming a fiber gain section for a coiled micro-structured waveguide amplifier, the gain section having a waveguide, wherein a rare-earth dopant is deposited asymmetrically within the waveguide relative to a center of the waveguide.

In some embodiments of the third method, the forming of the fiber gain section includes making the fiber gain section such that its refractive-index profile is graded.

In some embodiments of the third method, the forming of the fiber gain section includes configuring the coiled micro-structured waveguide amplifier with the dopant primarily on an outside of a bend of the fiber gain section.

In other embodiments, the present invention provides a first apparatus that includes a micro-structured waveguide amplifier having a coiled waveguide gain section in which a refractive-index profile across a waveguide as fabricated is asymmetric.

In some embodiments of the first apparatus, the asymmetry of the refractive-index profile includes a solid-glass fiber having a microstructured refractive index.

In some embodiments of the first apparatus, the asymmetry of the refractive-index profile is, at least in part, introduced by holes of varying dimensions in a fiber.

In some embodiments of the first apparatus, the asymmetry is introduced by a combination of air holes and solid-glass micro-structuring.

In some embodiments of the first apparatus, the waveguide amplifier includes an optical fiber having a straight fiber section and a coiled fiber section, and wherein coiling of the coiled section results in a reduction in the asymmetry of the coiled fiber section with respect to the straight fiber section.

In some embodiments of the first apparatus, an effective area of the waveguide amplifier in the coiled fiber section of the asymmetric-index-profile fiber is better than an equivalent symmetric-index-profile fiber deployed with an equal bend radius.

In some embodiments of the first apparatus, a lowest-order mode bend-loss of the waveguide amplifier in the coiled fiber section is better than the equivalent symmetric fiber deployed with the same bend radius.

In some embodiments of the first apparatus, the coupling from the lowest-order mode of the bent asymmetric fiber to higher-order modes is lower than for the equivalent symmetric fiber deployed with the same bend radius.

In some embodiments of the first apparatus, the bent asymmetric fiber is a single-mode fiber at least in the bend.

In some embodiments of the first apparatus, the bent asymmetric fiber is multimode under single-mode excitation.

In some embodiments of the first apparatus, the bent asymmetric fiber is multimode with differential bend-loss for higher-order modes when bent beyond the design radius.

In some embodiments of the first apparatus, the bent asymmetric fiber is single-polarization at or beyond the design radius.

In some embodiments of the first apparatus, form asymmetry in the cell structure is used to smooth out the effective index profile which results from a step-tapered index profile.

In other embodiments, the present invention provides a second apparatus that includes a waveguide amplifier containing a coiled gain section having a core, wherein a shape of the core as fabricated is asymmetric.

In some embodiments of the second apparatus, the core is smaller towards a side of the fiber toward an outside of the coiled gain section.

In some embodiments of the second apparatus, the core is micro-structured.

In some embodiments of the second apparatus, the core is manufactured by modified chemical vapor deposition (MCVD) with the asymmetry introduced by pre-shaping the substrate tube.

In some embodiments of the second apparatus, the asymmetry is introduced by softening and squashing the preform.

In some embodiments of the second apparatus, the refractive index of the core is uniform.

In some embodiments of the second apparatus, the refractive index of the core is graded.

In other embodiments, the present invention provides a third apparatus that includes a micro-structured waveguide amplifier having a coiled gain section, the coiled gain section having a waveguide, wherein a rare-earth dopant is deposited asymmetrically within the waveguide.

In some embodiments of the third apparatus, the refractive-index profile is graded.

In some embodiments of the third apparatus, the coiled gain section is configured with the dopant primarily on the outside of a bend of the coiled gain section.

In other embodiments, the present invention provides a fourth apparatus that includes fiber structure (twin core or composite waveguide) having a guided mode substantially confined to a low index region when deployed straight and to a high index region when bent to a specific diameter such that the mode evolves or power flows from the outside to the inside of the bend.

In some embodiments of the fourth apparatus, a rare earth dopant is deployed on the inside of the bend.

In other embodiments, the present invention provides a fifth apparatus that includes fiber structure (twin core or composite waveguide) having a guided mode substantially confined to a central-core higher-index region when deployed straight and to a first to-the-side-core higher-index region when bent to a specific diameter such that the mode evolves or power flows from the central core to the to-the-side-core when the fiber is bent to a first design radius.

In some embodiments of the fourth apparatus, a rare-earth amplifying dopant is deployed in the first to-the-side-core.

In some embodiments, a plurality of three or more core regions are provided in a slanted-index cladding fiber, wherein when the fiber is in a first-radius configuration the signal light is guided in a first core, when the fiber is in a second-radius configuration the signal light is guided in a second core, and when the fiber is in a third-radius configuration the signal light is guided in a third core. In some such embodiments, the first-radius configuration is a straight-fiber configuration (substantially infinite radius), the second-radius configuration is a large-radius-fiber configuration (slightly-bent large radius), and the third-radius configuration is a small-radius-fiber configuration (further-bent smaller radius).

Some embodiments provide an optical amplifier in which the fiber is deployed such that the input and output straight sections have the power confined to an undoped core region while the gain section has the power confined to the doped-core region, and the transition region between enables power flow from one to the other of the core regions.

In some embodiments, the present invention provides a method for transitioning into and out of bend mitigation fiber. In particular it deals with the practical issue of transitioning into and out of a gain fiber which supports a large mode area when deployed at or near a design bend radius but which conversely would either suffer strong leakage loss or mode distortion when bent.

The concept uses the same principal as the main invention but extends the idea to a dual core which provides LMA wave-guiding when straight as well as when coiled at the design radius and a resonant coupler between the two waveguides when bent to an intermediate diameter. If the fiber is designed such that the waveguide on the outside of the bend when bent to the design radius matches the waveguide on the inside of the bend when straight then the two waveguides are essentially resonant when bent to a diameter twice that of the design.

In some embodiments, the present invention provides a fifth apparatus that includes an optical fiber having a plurality of core regions including a first core region and a second core region, wherein the first core region has a first graded index profile that primarily guides a signal when the fiber is curved to a first bend radius, and the second core region has a second graded index profile that is different than the first graded index profile and that primarily guides a signal when the fiber is not curved to the first bend radius.

In some embodiments of the fifth apparatus, the signal is guided in the second core when the fiber is substantially straight.

In some embodiments of the fifth apparatus, the signal is guided in the second core when the fiber is curved to a second non-straight bend radius that is different than the first bend radius.

In some embodiments of the fifth apparatus, the second core region (e.g., core region 611) is substantially undoped and the first core region (e.g., core region 614) is doped with a rare-earth dopant, such as shown in FIG. 6F. In some such embodiments, the fiber is configured to have a straight section wherein signal light is launched into the second undoped core, and the fiber is configured to transition to the first bend radius in a manner that transfers the signal light to the first core region, such as shown in FIG. 6F.

In some embodiments of the fifth apparatus, the second core region is contiguous with the first core region, such as shown in FIG. 7D.

In some embodiments of the fifth apparatus, the second core region is separated from the first core region by a cladding region, such as shown in FIG. 6D.

In some embodiments of the fifth apparatus, the fiber includes at least one additional core region (i.e., a third core region), such as shown in FIG. 10E. In some embodiments of the fifth apparatus, the second core region (e.g., core region 1012) is substantially undoped and the first core region (e.g., core region 1017) is doped with a rare-earth dopant, such as shown in FIG. 10E, and the third core has a different doping profile. In some such embodiments, the fiber is configured to have a straight section wherein signal light is launched into the second undoped core, and the fiber is configured to transition to a third bend radius in a manner that transfers the signal light to the third core region, and then to the first bend radius in a manner that transfers the signal light to the first core region, such as shown in FIG. 10E. In some such embodiments of the fifth apparatus, the second core region is separated from the third core region by a cladding region, and the third core region is separated from the first core region by a cladding region, such as shown in FIG. 10E.

In some embodiments of the fifth apparatus, the second core region has a different size than the first core region.

In some embodiments of the fifth apparatus, the second core region has a different shape than the first core region.

In some embodiments of the fifth apparatus, the second core region has a different doping profile than the first core region.

In some embodiments of the fifth apparatus, the second core region has substantially flat index profile and the first core region has sloped index profile when the fiber is straight and the first core region has substantially flat index profile and the second core region has sloped index profile when the fiber is curved to the first bend radius.

In some embodiments, the present invention provides a sixth apparatus that includes an optical fiber having a first core cross-section profile shape that is asymmetric relative to reflection about a first diameter direction but is symmetric relative to reflection about a second diameter direction perpendicular to the first diameter direction, wherein the first core has a substantially flat index profile across the first core region.

In some embodiments, for each apparatus described herein, other embodiments of the present invention also provide a corresponding method for fabricating the apparatus and a corresponding method of operation of the apparatus. Further, for each method described herein, other embodiments of the present invention also provide a corresponding apparatus.

In some embodiments, the first core cross-section profile is ovoid in shape, with a wider portion toward the inside of a curve radius of the fiber and a narrower portion toward the outside of a curve radius of the fiber.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
    an optical fiber that includes:
        a plurality of successive contiguous segments including a first segment, a second segment, and third segment, wherein the first segment includes a waveguide that amplifies a signal light, wherein the second segment includes a waveguide that receives and mode filters the amplified signal light from the first segment, and wherein the third segment includes a waveguide that receives and further amplifies the mode-filtered signal light from the second segment,
        a first cladding layer, wherein the waveguides in each segment are within the first cladding layer, and
        a second cladding layer surrounding the first cladding layer.

2. The apparatus of claim 1, wherein a length of the first segment is curved at a first bend radius, and wherein a length of the second segment is curved at a second bend radius that is different than the first bend radius, and wherein a length of the third segment is curved at the first bend radius.

3. The apparatus of claim 1, wherein the optical fiber has a waveguide that is asymmetric relative to reflection about diameter direction such that the waveguide is narrower on a first side and wider on a second side, and wherein the second segment guides the signal light to the narrower first side to mode filter the signal light.

4. The apparatus of claim 1, wherein the second segment radiates amplified spontaneous emission (ASE) from a core region to mode filter the signal light.

5. The apparatus of claim 1,
    wherein each one of the plurality of segments includes a plurality of parallel core regions, including a first core region and a second core region, wherein the first core region is doped with a rare-earth element to amplify signal light, wherein the second core region has a composition and geometry that acts as a mode filter, wherein the signal light is guided into the first core region in the first segment, wherein the signal light is guided into the second core region in the second segment, and wherein the signal light is guided into the first core region in the third segment.

6. The apparatus of claim 5, wherein the second core region has an undoped center portion and a surrounding portion that absorbs signal light such that higher-order spatial modes are attenuated.

7. The apparatus of claim 5, wherein the plurality of parallel core regions further includes a third core region, a fourth core region and a fifth core region, wherein the third core region is undoped, wherein the fourth core region has an undoped center portion and a surrounding portion that absorbs signal light such that higher-order spatial modes are attenuated, and wherein the fifth core region is doped with a rare-earth element to amplify signal light.

8. The apparatus of claim 5, wherein a length of the first segment is curved at a first bend radius to guide the signal light in the first core region of the first segment, wherein a length of the second segment is curved at a second bend radius that is different than the first bend radius to guide the signal light in the second core region of the second segment, and wherein a length of the third segment is curved at the first bend radius to guide the signal light in the first core region of the third segment.

9. A method comprising:
    forming an optical fiber that includes:
        a plurality of successive contiguous segments including a first segment, a second segment, and third segment, wherein each respective one of the plurality of segments includes:
            a waveguide,
            a first cladding layer that surrounds the waveguide of the respective one of the plurality of segments, and
            a second cladding layer surrounding the first cladding layer;
    amplifying a signal light in the first segment;
    mode filtering the amplified signal light in the second segment; and
    further amplifying the mode-filtered signal light.

10. The method of claim 9, further comprising:
    curving a length of the first segment at a first bend radius;
    curving a length of the second segment at a second bend radius that is different than the first bend radius; and
    curving a length of the third segment at the first bend radius.

11. The method of claim 9, wherein the optical fiber has a waveguide that is asymmetric relative to reflection about diameter direction such that the waveguide is narrower on a first side and wider on a second side, wherein the mode filtering of the amplified signal light in the second segment includes guiding the signal light to the narrower first side of the second segment.

12. The method of claim 9, wherein the mode filtering of the amplified signal light in the second segment includes radiating amplified spontaneous emission (ASE) from a core region of the second segment.

13. The method of claim 9, wherein each one of the plurality of segments includes a plurality of parallel core regions, including a first core region and a second core region, the method further comprising:
    doping the first core region with a rare-earth element;
    forming the second core region such that the second core region has a composition and geometry that acts as a mode filter;
    guiding the signal light into the first core region in the first segment;
    guiding the signal light into the second core region in the second segment; and
    guiding the signal light into the first core region in the third segment.

14. The method of claim 13, wherein the second core region includes an undoped center portion, the method further comprising surrounding the undoped center portion with an absorbing portion configured to attenuate higher-order spatial modes.

15. The method of claim 13, wherein the plurality of parallel core regions includes a third core region, a fourth core region and a fifth core region, wherein the third core region is undoped, wherein the fourth core region includes an undoped center portion, the method further comprising:
    surrounding the undoped center portion of the fourth core region with an absorbing portion configured to attenuate higher-order spatial modes; and
    doping the fifth core region with a rare-earth element.

16. The method of claim 13, further comprising:
curving a length of the first segment at a first bend radius to guide the signal light in the first core region of the first segment;
curving a length of the second segment at a second bend radius that is different than the first bend radius to guide the signal light in the second core region of the second segment; and
curving a length of the third segment at the first bend radius to guide the signal light in the first core region of the third segment.

17. An apparatus comprising:
an optical fiber that includes:
a plurality of successive contiguous segments including a first segment, a second segment, and third segment, wherein each respective one of the plurality of segments includes:
a waveguide,
a first cladding layer that surrounds the waveguide of the respective one of the plurality of segments, and
a second cladding layer surrounding the first cladding layer;
means for amplifying a signal light in the first segment;
means for mode filtering the amplified signal light in the second segment; and
means for further amplifying the mode-filtered signal light.

18. The apparatus of claim 17, wherein the means for mode filtering the amplified signal light in the second segment includes means for radiating amplified spontaneous emission (ASE) from a core region of the second segment.

19. The apparatus of claim 17, wherein each one of the plurality of segments includes a plurality of parallel core regions, including a first core region and a second core region, the apparatus further comprising:
means for guiding the signal light into the first core region in the first segment;
means for guiding the signal light into the second core region in the second segment; and
means for guiding the signal light into the first core region in the third segment.

20. The apparatus of claim 18, wherein the second core region includes an undoped center portion surrounded by an absorbing portion configured to attenuate higher-order spatial modes.

* * * * *